(12) United States Patent
Suzuki et al.

(10) Patent No.: US 9,726,101 B2
(45) Date of Patent: Aug. 8, 2017

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Kazuya Suzuki, Susono (JP); Yuji Yamaguchi, Susono (JP); Hiroyuki Hokuto, Numazu (JP); Yuji Miyoshi, Susono (JP); Koichi Hoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/066,140

(22) Filed: Mar. 10, 2016

(65) Prior Publication Data

US 2016/0265466 A1 Sep. 15, 2016

(30) Foreign Application Priority Data

Mar. 12, 2015 (JP) ................. 2015-050016

(51) Int. Cl.
*F01N 3/20* (2006.01)
*F02D 41/24* (2006.01)
(Continued)

(52) U.S. Cl.
CPC ........... *F02D 41/2461* (2013.01); *F01N 3/10* (2013.01); *F01N 11/007* (2013.01);
(Continued)

(58) Field of Classification Search
CPC .... F01N 3/0864; F01N 3/0885; F01N 3/2033; F01N 2430/06; F02D 41/008;
(Continued)

(56) References Cited

U.S. PATENT DOCUMENTS

| 5,265,416 A | 11/1993 | Hamburg et al. |
| 6,543,219 B1 | 4/2003 | Surnilla |
| 7,421,836 B2 | 9/2008 | Pallett et al. |

(Continued)

FOREIGN PATENT DOCUMENTS

| EP | 2952716 A1 | 12/2015 |
| JP | 2008-223644 A | 9/2008 |

(Continued)

*Primary Examiner* — Jonathan Matthias
(74) *Attorney, Agent, or Firm* — Andrews Kurth Kenyon LLP

(57) ABSTRACT

An exhaust purification system of an internal combustion engine which has a plurality of cylinders is comprised of an exhaust purification catalyst, a downstream side air-fuel ratio sensor, and a control device which controls the average air-fuel ratio of the exhaust gas and the combustion air-fuel ratios of the cylinders. The control device performs average air-fuel ratio control where it alternately controls the average air-fuel ratio between the rich air-fuel ratio and the lean air-fuel ratio and inter-cylinder air-fuel ratio control where it controls the combustion air-fuel ratios of the cylinders so that the combustion air-fuel ratio becomes the rich air-fuel ratio at least at one cylinder among the plurality of cylinders even when the average air-fuel ratio is controlled to the lean air-fuel ratio by average air-fuel ratio control. In average air-fuel ratio control, the average air-fuel ratio is controlled so that the lean shift amount when controlling the average air-fuel ratio to the lean air-fuel ratio becomes smaller than the rich shift amount when controlling the average air-fuel ratio to the rich air-fuel ratio.

22 Claims, 31 Drawing Sheets

(51) Int. Cl.
    *F01N 3/10*        (2006.01)
    *F01N 11/00*      (2006.01)
    *F02D 41/02*      (2006.01)
    *F02D 41/14*      (2006.01)
    *F02D 41/00*      (2006.01)

(52) U.S. Cl.
    CPC ....... *F02D 41/025* (2013.01); *F02D 41/0295* (2013.01); *F02D 41/1408* (2013.01); *F02D 41/1441* (2013.01); *F02D 41/1454* (2013.01); *F02D 41/1475* (2013.01); *F01N 2550/02* (2013.01); *F01N 2560/025* (2013.01); *F02D 41/008* (2013.01); *F02D 2200/0814* (2013.01); *Y02T 10/26* (2013.01)

(58) Field of Classification Search
    CPC ............. F02D 41/0082; F02D 41/0085; F02D 41/028; F02D 41/0295; F02D 41/1475
    See application file for complete search history.

(56) References Cited

U.S. PATENT DOCUMENTS

| | | | |
|---|---|---|---|
| 7,469,693 | B2 | 12/2008 | Graves et al. |
| 2004/0187479 | A1* | 9/2004 | Surnilla ................ F01N 3/0814 60/285 |

FOREIGN PATENT DOCUMENTS

| | | |
|---|---|---|
| WO | 2007/023380 A1 | 3/2007 |
| WO | 2008/056826 A1 | 5/2008 |
| WO | 2014/118889 A1 | 8/2014 |

\* cited by examiner

EXHAUST PURIFICATION SYSTEM OF INTERNAL COMBUSTION ENGINE

CROSS-REFERENCE TO RELATED APPLICATION

This application claims priority based on Japanese Patent Application No. 2015-050016 filed with the Japan Patent Office on Mar. 12, 2015, the entire contents of which are incorporated into the present specification by reference.

TECHNICAL FIELD

Embodiments of the present invention relate to an exhaust purification system of an internal combustion engine.

BACKGROUND ART

Known in the past has been an exhaust purification system of an internal combustion engine which arranges an air-fuel ratio sensor or oxygen sensor at each of an upstream side and downstream side of an exhaust purification catalyst in a direction of flow of exhaust (for example, Japanese Patent Publication No. 2008-223644A and International Patent Publication No. 2014/118889A). In such an exhaust purification system, the output of the upstream side sensor is used as the basis for main feedback control of the fuel injection amount so that the air-fuel ratio of the exhaust gas which flows into the exhaust purification catalyst matches the target air-fuel ratio. In addition, the output of the downstream side sensor is used as the basis for correction of the target air-fuel ratio in the main feedback control.

In addition, in the exhaust purification system which is described in the 2008-223644A application, at the time of engine cold start or otherwise when the temperature of the exhaust purification catalyst is low, the air-fuel ratio of the exhaust gas which flows into the exhaust purification catalyst is made to alternately change between the rich air-fuel ratio and lean air-fuel ratio every certain time interval. According to the 2008-223644A application, due to this, the exhaust purification catalyst can be quickly raised in temperature.

SUMMARY

In this regard, exhaust gas which is discharged from a combustion chamber contains sulfur content. Such sulfur content is adsorbed or stored on the surface of the catalyst precious metal which is carried on the carrier of the exhaust purification catalyst under certain conditions and covers the surface of the catalyst precious metal. As a result, the catalyst precious metal falls in activity, absorption and release of oxygen become difficult, and therefore the exhaust purification catalyst falls in oxygen storage ability. Further, this invites a drop in the ability to remove unburned HC, CO, $NO_X$, etc. in the exhaust gas which flows into the exhaust purification catalyst.

Therefore, in consideration of the above problem, an object of embodiments of the present invention is to provide an exhaust purification system of an internal combustion engine which can suppress a drop in activity of a catalyst precious metal due to sulfur content and which can suppress a drop in oxygen storage ability of an exhaust purification catalyst.

To solve the above problem, in a first aspect of the invention, there is provided an exhaust purification system of an internal combustion engine which has a plurality of cylinders including an exhaust purification catalyst which is arranged in an engine exhaust passage and which can store oxygen; a downstream side air-fuel ratio sensor which is arranged at a downstream side of the exhaust purification catalyst in a direction of flow of exhaust; and a control device which controls combustion air-fuel ratios when combustion is performed in the cylinders. The control device is configured to: perform average air-fuel ratio control which alternately controls an average air-fuel ratio of an average of the combustion air-fuel ratios of all cylinders between a rich air-fuel ratio which is richer than a stoichiometric air-fuel ratio and a lean air-fuel ratio which is leaner than the stoichiometric air-fuel ratio and inter-cylinder air-fuel ratio control which controls the combustion air-fuel ratios of the cylinders so that the combustion air-fuel ratio becomes the rich air-fuel ratio at least at one cylinder among the plurality of cylinders even if the average air-fuel ratio is controlled to the lean air-fuel ratio by the average air-fuel ratio control; and control the average air-fuel ratio in the average air-fuel ratio control so that a lean shift amount of a difference between the average air-fuel ratio and stoichiometric air-fuel ratio when controlling the average air-fuel ratio to a lean air-fuel ratio becomes smaller than a rich shift amount of a difference between the average air-fuel ratio and stoichiometric air-fuel ratio when controlling the average air-fuel ratio to a rich air-fuel ratio.

In a second aspect of the invention, there is provided the first aspect above, wherein the control device is further configured to control the combustion air-fuel ratios of the cylinders in the inter-cylinder air-fuel ratio control even when the average air-fuel ratio is controlled to the rich air-fuel ratio by the average air-fuel ratio control, so that the combustion air-fuel ratio becomes the lean air-fuel ratio at least at one cylinder among the plurality of cylinders.

In a third aspect of the invention, there is provided the first aspect above, wherein the control device is further configured to control the combustion air-fuel ratios of the cylinders without performing the inter-cylinder air-fuel ratio control when the average air-fuel ratio is controlled to the rich air-fuel ratio, so that the combustion air-fuel ratios become the rich air-fuel ratio at all of the plurality of cylinders.

In a fourth aspect of the invention, there is provided the first aspect above, wherein the control device is further configured to control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders, and wherein a difference between the combustion air-fuel ratio of a cylinder which is made richer than the average air-fuel ratio and the average air-fuel ratio is equal to a difference between the combustion air-fuel ratio of a cylinder which is made leaner than the average air-fuel ratio and the average air-fuel ratio.

In a fifth aspect of the invention, there is provided the first aspect above, wherein the control device is further configured to control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders. Also, a difference in the average air-fuel ratio control between a combustion air-fuel ratio of a cylinder which is made richer than the average air-fuel ratio and a combustion air-fuel ratio of a cylinder which is made leaner than the average air-fuel ratio when the inter-cylinder air-fuel ratio control is performed is larger than a total value of the rich shift amount and the lean shift amount.

In a sixth aspect of the invention, there is provided the first aspect above, wherein the control device is further configured to control the combustion air-fuel ratios of the cylinders without performing the inter-cylinder air-fuel ratio control when the temperature of the exhaust purification catalyst is lower than an activation temperature of the exhaust purification catalyst, so that the combustion air-fuel ratios become equal at all of the plurality of cylinder.

In a seventh aspect of the invention, there is provided the first aspect above, wherein the control device is further configured to control the combustion air-fuel ratios of the cylinders without performing the inter-cylinder air-fuel ratio control when the temperature of the exhaust purification catalyst is higher than a predetermined upper limit temperature, so that the combustion air-fuel ratios become equal at all of the plurality of cylinders, and wherein the upper limit temperature is higher than an activation temperature of the exhaust purification catalyst.

In an eighth aspect of the invention, there is provided the seventh aspect above, wherein the control device is further configured to: control the combustion air-fuel ratios of the cylinders without performing the inter-cylinder air-fuel ratio control even if the temperature of the exhaust purification catalyst becomes the upper limit temperature or less until reaching the predetermined switching temperature when the temperature of the exhaust purification catalyst falls from a temperature higher than the upper limit temperature, so that the combustion air-fuel ratios become equal at all of the plurality of cylinders. Also, the control device is to perform the inter-cylinder air-fuel ratio control when the temperature of the exhaust purification catalyst becomes the switching temperature or less, and wherein the switching temperature is lower than the upper limit temperature and higher than the activation temperature.

In a ninth aspect of the invention, there is provided the first aspect above, wherein the control device is further configured to: control the combustion air-fuel ratios of the cylinders in the inter-cylinder air-fuel ratio control so that the combustion air-fuel ratio becomes leaner than the average air-fuel ratio at the first cylinder right after the average air-fuel ratio is switched from the rich air-fuel ratio to the lean air-fuel ratio by the average air-fuel ratio control; and control the air-fuel ratios of the cylinders in the inter-cylinder air-fuel ratio control so that the combustion air-fuel ratio becomes richer than the average air-fuel ratio at the first cylinder right after the average air-fuel ratio is switched from the lean air-fuel ratio to the rich air-fuel ratio.

In a tenth aspect of the invention, there is provided the first aspect above, wherein the control device is further configured to: control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders; and control the combustion air-fuel ratios of the cylinders so as to become richer than the average air-fuel ratio in the cylinder at which fuel is fed first after start when starting the inter-cylinder air-fuel ratio control.

In an eleventh aspect of the invention, there is provided the tenth aspect above, wherein the control device is further configured to control the combustion air-fuel ratio so as to become leaner than the average air-fuel ratio at the cylinder where fuel is fed first after start when having performed control right before starting the inter-cylinder air-fuel ratio control, so that the air-fuel ratio of the exhaust gas which flows out from the exhaust purification catalyst becomes the rich air-fuel ratio, even when starting the inter-cylinder air-fuel ratio control.

In a twelfth aspect of the invention, there is provided the first aspect above, wherein the control device is further configured to: switch the average air-fuel ratio to the lean air-fuel ratio in the average air-fuel ratio control if the output air-fuel ratio of the downstream side air-fuel ratio sensor becomes a rich judged air-fuel ratio richer than the stoichiometric air-fuel ratio or becomes less when controlling the average air-fuel ratio to the rich air-fuel ratio; and switch the average air-fuel ratio to the rich air-fuel ratio in the average air-fuel ratio control if the output air-fuel ratio of the downstream side air-fuel ratio sensor becomes a lean judged air-fuel ratio leaner than the stoichiometric air-fuel ratio or becomes more when controlling the average air-fuel ratio to the lean air-fuel ratio.

In a thirteenth aspect of the invention, there is provided the first aspect above, wherein the control device is further configured to: switch the average air-fuel ratio to the lean air-fuel ratio in the average air-fuel ratio control if the output air-fuel ratio of the downstream side air-fuel ratio sensor becomes a rich judged air-fuel ratio richer than the stoichiometric air-fuel ratio or becomes less when controlling the average air-fuel ratio to the rich air-fuel ratio; and switch the average air-fuel ratio to the rich air-fuel ratio in the average air-fuel ratio control if the oxygen storage amount of the exhaust purification catalyst from when starting control of the average air-fuel ratio to the lean air-fuel ratio reaches a predetermined switching reference storage amount smaller than the maximum storage oxygen amount of the exhaust purification catalyst.

In a fourteenth aspect of the invention, there is provided the first aspect above, wherein the control device is further configured to control the average air-fuel ratio to a lean air-fuel ratio with a larger lean degree than when the output air-fuel ratio is larger than the rich judged air-fuel ratio in the average air-fuel ratio control, at least when the output air-fuel ratio of the downstream side air-fuel ratio sensor is a rich judged air-fuel ratio which is richer than the stoichiometric air-fuel ratio or is less.

In a fifteenth aspect of the invention, there is provided the fourteenth aspect above, wherein the control device is further configured to control the combustion air-fuel ratios of the cylinders without performing the inter-cylinder air-fuel ratio control when the output air-fuel ratio of the downstream side air-fuel ratio sensor is the rich judged air-fuel ratio or less, so that the combustion air-fuel ratios become equal at all cylinders.

In a sixteenth aspect of the invention, there is provided the first aspect above, wherein the control device is further configured to control the average air-fuel ratio to a rich air-fuel ratio with a larger rich degree than when the output air-fuel ratio is smaller than the lean judged air-fuel ratio in the average air-fuel ratio control, at least when the output air-fuel ratio of the downstream side air-fuel ratio sensor is a lean judged air-fuel ratio which is leaner than the stoichiometric air-fuel ratio or is more.

In a seventeenth aspect of the invention, there is provided the sixteenth aspect above, wherein the control device is further configured to control the combustion air-fuel ratios of the cylinders without performing the inter-cylinder air-fuel ratio control when the output air-fuel ratio of the downstream side air-fuel ratio sensor is the lean judged air-fuel ratio or more, so that the combustion air-fuel ratios become equal at all cylinders.

In an eighteenth aspect of the invention, there is provided the first aspect above, wherein the control device is further configured to: control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the degree of deterioration of the exhaust purification catalyst increases.

In a nineteenth aspect of the invention, there is provided the first aspect above, wherein the control device is further configured to decrease the rich shift amount and the lean shift amount in the average air-fuel ratio control as the degree of deterioration of the exhaust purification catalyst increases.

In a twentieth aspect of the invention, there is provided the first aspect above, wherein the control device is further configured to: control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the amount of intake air which is fed to a combustion chamber increases.

In a twenty-first aspect of the invention, there is provided the first aspect above, wherein the control device is further configured to decrease the rich shift amount and the lean shift amount in the average air-fuel ratio control as the amount of intake air which is supplied to a combustion chamber increases.

In a twenty-second aspect of the invention, there is provided the first aspect above, wherein the control device is further configured to: control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the temperature of the exhaust purification catalyst increases.

According to embodiments of the present invention, there is provided an exhaust purification system of an internal combustion engine which can suppress the drop in activation of a catalyst precious metal due to sulfur content and which can suppress a drop in the oxygen storage ability of an exhaust purification catalyst.

DESCRIPTION OF EMBODIMENTS

Figure 1:
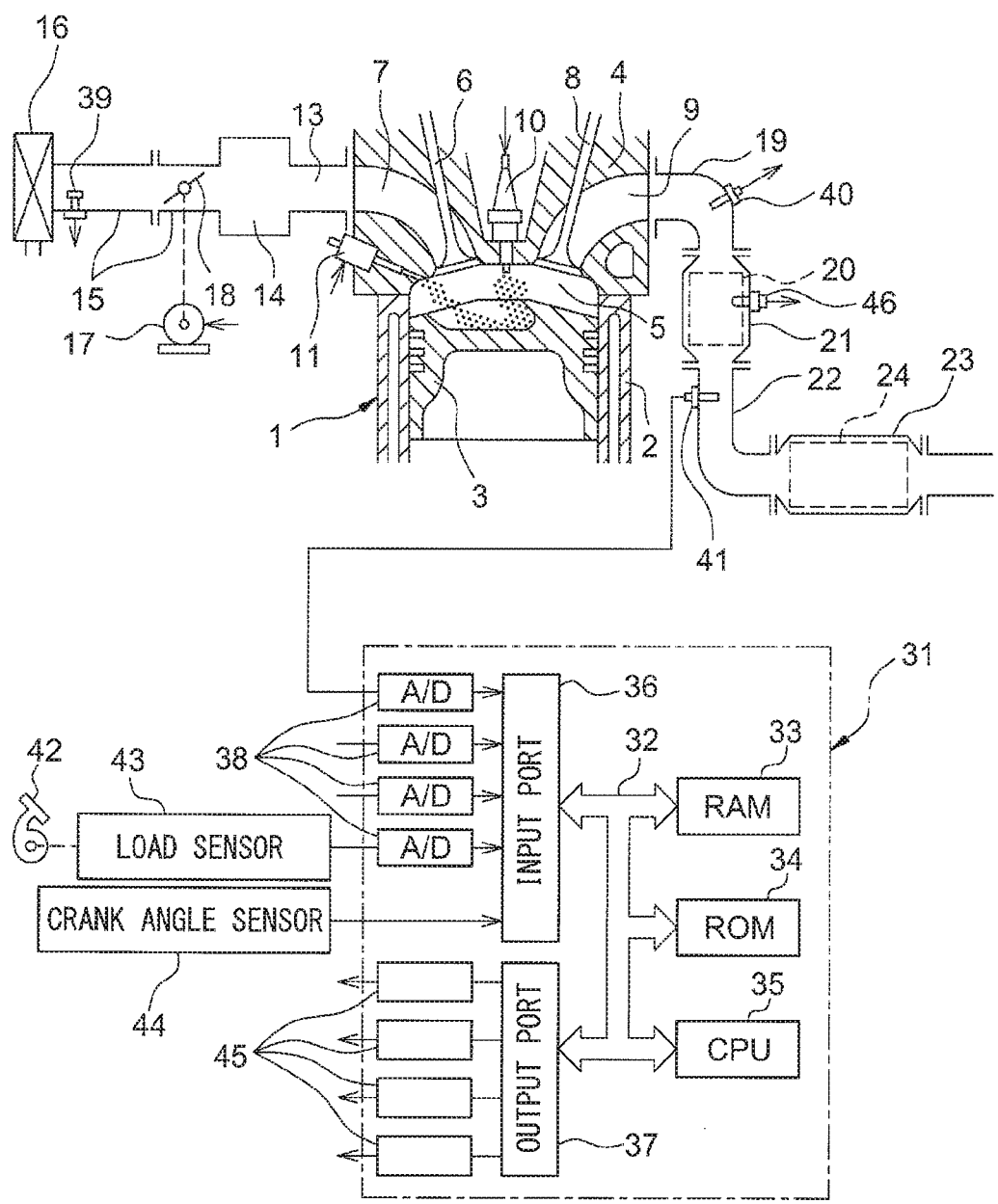
FIG. 1 is a view which schematically shows an internal combustion engine in which a control device of the present invention is used.

Below, referring to the drawings, embodiments of the present invention will be explained in detail. Note that, in the following explanation, similar components are assigned the same reference numerals.

<Explanation of Internal Combustion Engine as a Whole>

FIG. 1 is a view which schematically shows an internal combustion engine in which an exhaust purification system according to the present invention is used. Referring to FIG. 1, 1 indicates an engine body, 2 indicates a cylinder block, 3 indicates a piston which reciprocates in the cylinder block 2, 4 indicates a cylinder head which is fastened to the cylinder block 2, 5 indicates a combustion chamber which is formed between the piston 3 and the cylinder head 4, 6 indicates an intake valve, 7 indicates an intake port, 8 indicates an exhaust valve, and 9 indicates an exhaust port. The intake valve 6 opens and closes the intake port 7, while the exhaust valve 8 opens and closes the exhaust port 9. The internal combustion engine according to the present embodiment is an in-line four cylinder internal combustion engine. Therefore, the engine body 1 comprises four combustion chambers 5. However, the internal combustion engine is not limited this constitution as long as the internal combustion engine which has a plurality of cylinders. For example, the internal combustion engine may be other types of internal combustion engines such as a six cylinder internal combustion engine or a V-type internal combustion engine.

As shown in FIG. 1, a spark plug 10 is arranged at a center part of an inside wall surface of the cylinder head 4, while a fuel injector 11 is arranged at a peripheral part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine of the present embodiment may also use another kind of fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a collected part at which these runners are collected. The collected part of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an airflow meter 39 is arranged for detecting the flow rate of air flowing through the intake pipe 15. The output of this airflow meter 39 is input through a corresponding AD (analog-to-digital) converter 38 to the input port 36. Further, at the collected part of the exhaust manifold 19, an upstream side air-fuel ratio sensor 40 is arranged which detects the air-fuel ratio of the exhaust gas flowing through the inside of the exhaust manifold 19 (that is, the exhaust gas flowing into the upstream side exhaust purification catalyst 20). In addition, in the exhaust pipe 22, a downstream side air-fuel ratio sensor 41 is arranged which detects the air-fuel ratio of the exhaust gas flowing through the inside of the exhaust pipe 22 (that is, the exhaust gas flowing out from the upstream side exhaust purification catalyst 20 and flowing into the downstream side exhaust purification catalyst 24). The outputs of these air-fuel ratio sensors 40 and 41 are also input through the corresponding AD converters 38 to the input port 36. In addition, at the upstream side exhaust purification catalyst 20, a temperature sensor 46 is arranged which detects the temperature of the upstream side exhaust purification catalyst 20. The output of this temperature sensor 46 is also input through a corresponding AD converter 38 to the input port 36.

Further, an accelerator pedal 42 is connected to a load sensor 43 generating an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that the ECU 31 functions as a control device for controlling the internal combustion engine and the exhaust purification system.

Note that, the internal combustion engine according to the present embodiment is a non-supercharged internal combustion engine which is fueled by gasoline, but the internal combustion engine according to embodiments of the present invention is not limited to the above configuration. For example, the internal combustion engine according to embodiments of the present invention may have cylinder array, state of injection of fuel, configuration of intake and exhaust systems, configuration of valve mechanism, presence of supercharger, and/or supercharged state, etc. which are different from the above internal combustion engine.

<Explanation of Exhaust Purification Catalysts>

The upstream side exhaust purification catalyst 20 and downstream side exhaust purification catalyst 24 both have similar configurations. The exhaust purification catalysts 20 and 24 are three-way catalysts which have oxygen storage abilities. Specifically, the exhaust purification catalysts 20 and 24 are three-way catalysts comprised of carriers made of ceramics on which precious metals which have catalytic actions (for example, platinum (Pt)) and substances which have oxygen storage abilities (for example, ceria ($CeO_2$), below, also referred to as "oxygen storing substances") are carried. Three-way catalysts have the functions of simultaneously removing unburned HC, CO, and $NO_X$ if the air-fuel ratio of the exhaust gas which flows into the three-way catalysts is maintained at the stoichiometric air-fuel ratio. In addition, when the exhaust purification catalysts 20 and 24 have oxygen storage abilities, unburned HC, CO, and $NO_X$ are simultaneously removed even if the air-fuel ratio of the exhaust gas which flows into the exhaust purification catalysts 20 and 24 deviates somewhat to the rich side or lean side from the stoichiometric air-fuel ratio.

That is, since such three-way catalysts have oxygen storage abilities, they store excess oxygen which is contained in exhaust gas when the air-fuel ratio of the exhaust gas which flows into the exhaust purification catalysts 20 and 24 becomes an air-fuel ratio leaner than the stoichiometric air-fuel ratio (below, simply referred to as the "lean air-fuel ratio"). Due to this, the surfaces of the exhaust purification catalysts 20 and 24 are maintained at the stoichiometric air-fuel ratio and unburned HC, CO, and $NO_X$ are simultaneously removed at the surfaces of the exhaust purification catalysts 20 and 24. At this time, the air-fuel ratio of the exhaust gas which is discharged from the exhaust purification catalysts 20 and 24 becomes the stoichiometric air-fuel ratio. However, three-way catalysts can no longer store any further oxygen if the oxygen storage amounts reach the maximum value of the storable oxygen amount, that is, the maximum storable oxygen amount Cmax. Therefore, if, in the state where the oxygen storage amounts of the three-way catalyst reach substantially the maximum storable oxygen amount Cmax, the air-fuel ratio of the exhaust gas which flows into the exhaust purification catalysts 20 and 24 becomes the lean air-fuel ratio, the exhaust purification catalysts 20 and 24 soon can no longer be maintained at the stoichiometric air-fuel ratio on their surfaces. For this reason, in this case, the air-fuel ratio of the exhaust gas which is discharged from the exhaust purification catalysts 20 and 24 becomes the lean air-fuel ratio.

On the other hand, in such three-way catalysts, when the air-fuel ratio of the exhaust gas which flows into the exhaust purification catalysts 20 and 24 becomes an air-fuel ratio richer than the stoichiometric air-fuel ratio (below, simply referred to as the "rich air-fuel ratio"), oxygen which is insufficient for reducing the unburned HC, CO which are contained in the exhaust gas is released from the exhaust purification catalysts 20 and 24. In this case as well, the surfaces of the exhaust purification catalysts 20 and 24 are maintained at the stoichiometric air-fuel ratio and the unburned HC, CO, and $NO_X$ are simultaneously removed at the surfaces of the exhaust purification catalysts 20 and 24. At this time, the air-fuel ratio of the exhaust gas which is discharged from the exhaust purification catalysts 20 and 24 becomes a stoichiometric air-fuel ratio. However, the three-way catalysts can no longer release any further oxygen if the oxygen storage amounts reach zero. Therefore, if, in the state where the oxygen storage amounts of the three-way catalysts reach substantially zero, the air-fuel ratio of the exhaust gas which flows into the exhaust purification catalysts 20 and 24 becomes the rich air-fuel ratio, the exhaust purification catalysts 20 and 24 soon can no longer maintain their surfaces at the stoichiometric air-fuel ratio. For this reason, in this case, the air-fuel ratio of the exhaust gas which is discharged from the exhaust purification catalysts 20 and 24 becomes a rich air-fuel ratio.

In the above way, according to the exhaust purification catalysts 20 and 24 which are used in the present embodiment, the characteristics of removal of the unburned HC, CO, and $NO_X$ in the exhaust gas changes according to the air-fuel ratio of the exhaust gas which flows into the exhaust purification catalysts 20 and 24 and the oxygen storage amounts.

<Output Characteristic of Air-Fuel Ratio Sensor>

Figure 2:
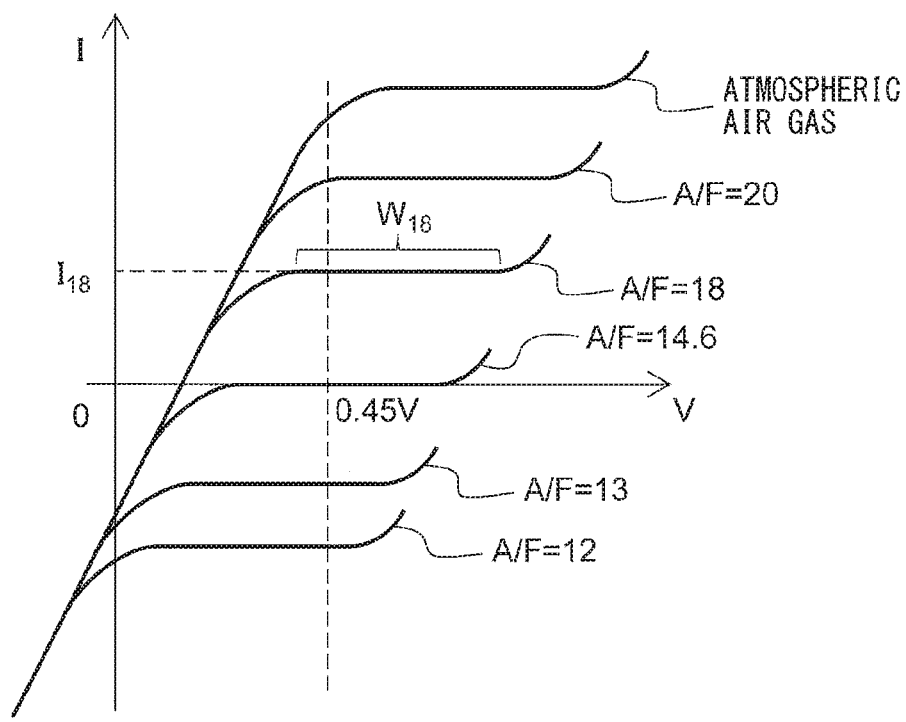
FIG. 2 is a view which shows the relationship between a sensor applied voltage and output current at each exhaust air-fuel ratio.
Figure 3:
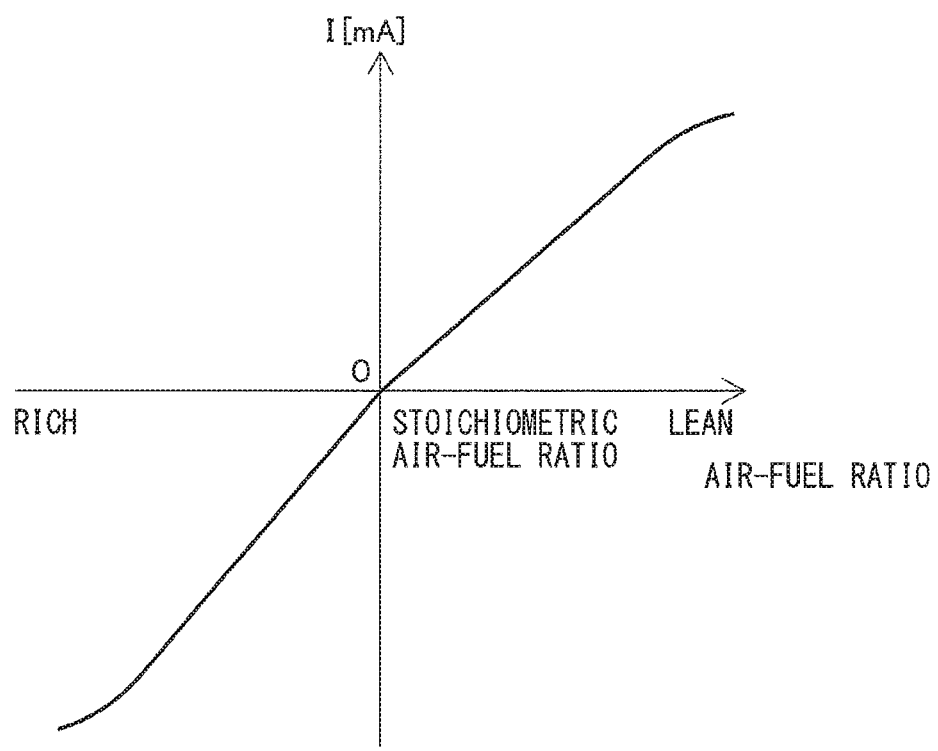
FIG. 3 is a view which shows the relationship of an exhaust air-fuel ratio and output current when making the sensor applied voltage constant.

Next, referring to FIGS. 2 and 3, the output characteristic of air-fuel ratio sensors 40 and 41 in the present embodiment will be explained. FIG. 2 is a view showing the voltage-current (V-I) characteristic of the air-fuel ratio sensors 40 and 41 of the present embodiment. FIG. 3 is a view showing the relationship between air-fuel ratio of the exhaust gas (below, referred to as "exhaust air-fuel ratio") flowing around the air-fuel ratio sensors 40 and 41 and output current I, when making the supplied voltage constant. Note that, in this embodiment, the air-fuel ratio sensor having the same configurations is used as both air-fuel ratio sensors 40 and 41.

As will be understood from FIG. 2, in the air-fuel ratio sensors 40 and 41 of the present embodiment, the output current I becomes larger the higher (the leaner) the exhaust air-fuel ratio. Further, the line V-I of each exhaust air-fuel ratio has a region substantially parallel to the V axis, that is, a region where the output current does not change much at all even if the supplied voltage of the sensor changes. This voltage region is called the "limit current region". The current at this time is called the "limit current". In FIG. 2, the limit current region and limit current when the exhaust air-fuel ratio is 18 are shown by $W_{18}$ and $I_{18}$, respectively. Therefore, the air-fuel ratio sensors 40 and 41 can be referred to as "limit current type air-fuel ratio sensors".

FIG. 3 is a view which shows the relationship between the exhaust air-fuel ratio and the output current I when making the supplied voltage constant at about 0.45V. As will be understood from FIG. 3, in the air-fuel ratio sensors 40 and 41, the output current I varies linearly (proportionally) with respect to the exhaust air-fuel ratio such that the higher (that is, the leaner) the exhaust air-fuel ratio, the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio.

Note that, in the above example, as the air-fuel ratio sensors 40 and 41, limit current type air-fuel ratio sensors are used. However, as the air-fuel ratio sensors 40 and 41, it is also possible to use an air-fuel ratio sensor that is not a limit current type sensor or any other air-fuel ratio sensor, as long as the output current varies linearly with respect to the exhaust air-fuel ratio. Further, the air-fuel ratio sensors 40 and 41 may have structures different from each other. In addition, as the downstream side air-fuel ratio sensor 41, it is also possible to use a sensor where the output current does not change linearly with respect to the exhaust air-fuel ratio. Specifically, as the downstream side air-fuel ratio sensor 41, for example, it is also possible to use an oxygen sensor with an output value which greatly changes near the stoichiometric air-fuel ratio etc.

<Summary of Air-Fuel Ratio Control>

Next, a summary of the air-fuel ratio control in the exhaust purification system of the present embodiment will be given. In the present embodiment, the output air-fuel ratio of the upstream side air-fuel ratio sensor 40 is used as the basis for feedback control which controls the amounts of fuel injection from the fuel injectors 11 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor.

Here, as explained later, in the present embodiment, sometimes the fuel injection amounts from the fuel injectors 11 are made to differ between cylinders. In this case, the output air-fuel ratio of the upstream side air-fuel ratio sensor 40 fluctuates somewhat during one cycle. In such a case as well, in the present embodiment, the fuel injection amounts from the fuel injectors are controlled so that the average value of the output air-fuel ratio of the upstream side air-fuel ratio sensor 40 (below, referred to as the "average output air-fuel ratio") matches the average value of the target air-fuel ratios which differ between cylinders, that is, the target average air-fuel ratio.

In addition, in the air-fuel ratio control of the present embodiment, average air-fuel ratio control and inter-cylinder air-fuel ratio control (dither control) are performed. Average air-fuel ratio control is control which uses the output air-fuel ratio of the downstream side air-fuel ratio sensor 41 as the basis to set the target average air-fuel ratio. Therefore, the average air-fuel ratio control can be said to control the average value for all cylinders of the air-fuel ratios of the air-fuel mixtures when combustion is performed at the cylinders (below, referred to as "combustion air-fuel ratio", corresponding to air-fuel ratio of air-fuel mixture which is fed to each cylinder) (value of total of combustion air-fuel ratios of cylinders in one cycle divided by number of cylinders), that is, the average combustion air-fuel ratio. In other words, it can be said that the average exhaust air-fuel ratio of the exhaust gas which flows into the upstream side exhaust purification catalyst 20 is controlled. On the other hand, the inter-cylinder air-fuel ratio control is control which sets a different target air-fuel ratio for each cylinder. In other words, it controls the combustion air-fuel ratio at each cylinder.

<Average Air-Fuel Ratio Control>

First, average air-fuel ratio control will be explained. In average air-fuel ratio control, first, if, in the state where the target average air-fuel ratio is set to the later explained rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average combustion air-fuel ratio and average exhaust air-fuel ratio (below, these will be referred to all together as the "average air-fuel ratio") change to the lean set air-fuel ratio. Here, in the present embodiment, when the output air-fuel ratio of the downstream side air-fuel ratio sensor 41 becomes a rich judged air-fuel ratio which is slightly richer than the stoichiometric air-fuel ratio (for example, 14.55) or becomes less, it is judged that the output air-fuel ratio of the downstream side air-fuel ratio sensor 41 has become the rich air-fuel ratio. Therefore, in average air-fuel ratio control, when the average air-fuel ratio is controlled to the rich air-fuel ratio, the average air-fuel ratio is switched to the lean air-fuel ratio when the output air-fuel ratio of the downstream side air-fuel ratio sensor 41 becomes the rich judged air-fuel ratio or less. Further, the lean set air-fuel ratio is made a predetermined air-fuel ratio which is slightly leaner than the stoichiometric air-fuel ratio (air-fuel ratio becoming control center), for example, 14.7 or so.

On the other hand, in average air-fuel ratio control, if, in the state where the target average air-fuel ratio is set to the lean set air-fuel ratio, it is judged that the output air-fuel ratio of the downstream side air-fuel ratio sensor 41 has become the lean air-fuel ratio, the target average air-fuel ratio is switched to the rich set air-fuel ratio. Due to this, the average air-fuel ratio changes to the rich set air-fuel ratio. Here, in the present embodiment, when the output air-fuel ratio of the downstream side air-fuel ratio sensor 41 becomes a lean judged air-fuel ratio (for example, 14.65) which is slightly leaner than the stoichiometric air-fuel ratio or becomes more, it is judged that the output air-fuel ratio of the downstream side air-fuel ratio sensor 41 has become the lean air-fuel ratio. Therefore, in average air-fuel ratio control, when controlling the average air-fuel ratio to the lean air-fuel ratio, the average air-fuel ratio is switched to the rich air-fuel ratio when the output air-fuel ratio of the downstream side air-fuel ratio sensor 41 becomes the lean judged air-fuel ratio or more. Further, the rich set air-fuel ratio is made a predetermined air-fuel ratio which is richer to a certain extent than the stoichiometric air-fuel ratio (air-fuel ratio becoming control center), for example, 14.4 or so. Note that, the difference between the lean set air-fuel ratio and the stoichiometric air-fuel ratio (below, also referred to as the "lean shift amount") is smaller than the difference between the rich set air-fuel ratio and the stoichiometric air-fuel ratio (below, also referred to as the "rich shift amount").

As a result, in average air-fuel ratio control, the target average air-fuel ratio is alternately set to the rich air-fuel ratio and the lean air-fuel ratio. Due to this, the average air-fuel ratio of the exhaust gas which flows into the upstream side exhaust purification catalyst 20 is alternately controlled to the rich air-fuel ratio and the lean air-fuel ratio.

Note that, the rich judged air-fuel ratio and lean judged air-fuel ratio are made air-fuel ratios within 1% of the stoichiometric air-fuel ratio, preferably within 0.5%, more preferably within 0.35%. Therefore, the differences of the rich judged air-fuel ratio and lean judged air-fuel ratio from the stoichiometric air-fuel ratio when the stoichiometric air-fuel ratio is 14.6 are made 0.15 or less, preferably 0.073 or less, more preferably 0.051 or less. Further, the set air-fuel ratio at the target average air-fuel ratio (for example, rich set air-fuel ratio or lean set air-fuel ratio) is set so that the difference from the stoichiometric air-fuel ratio becomes larger than the above-mentioned difference.

Figure 4:
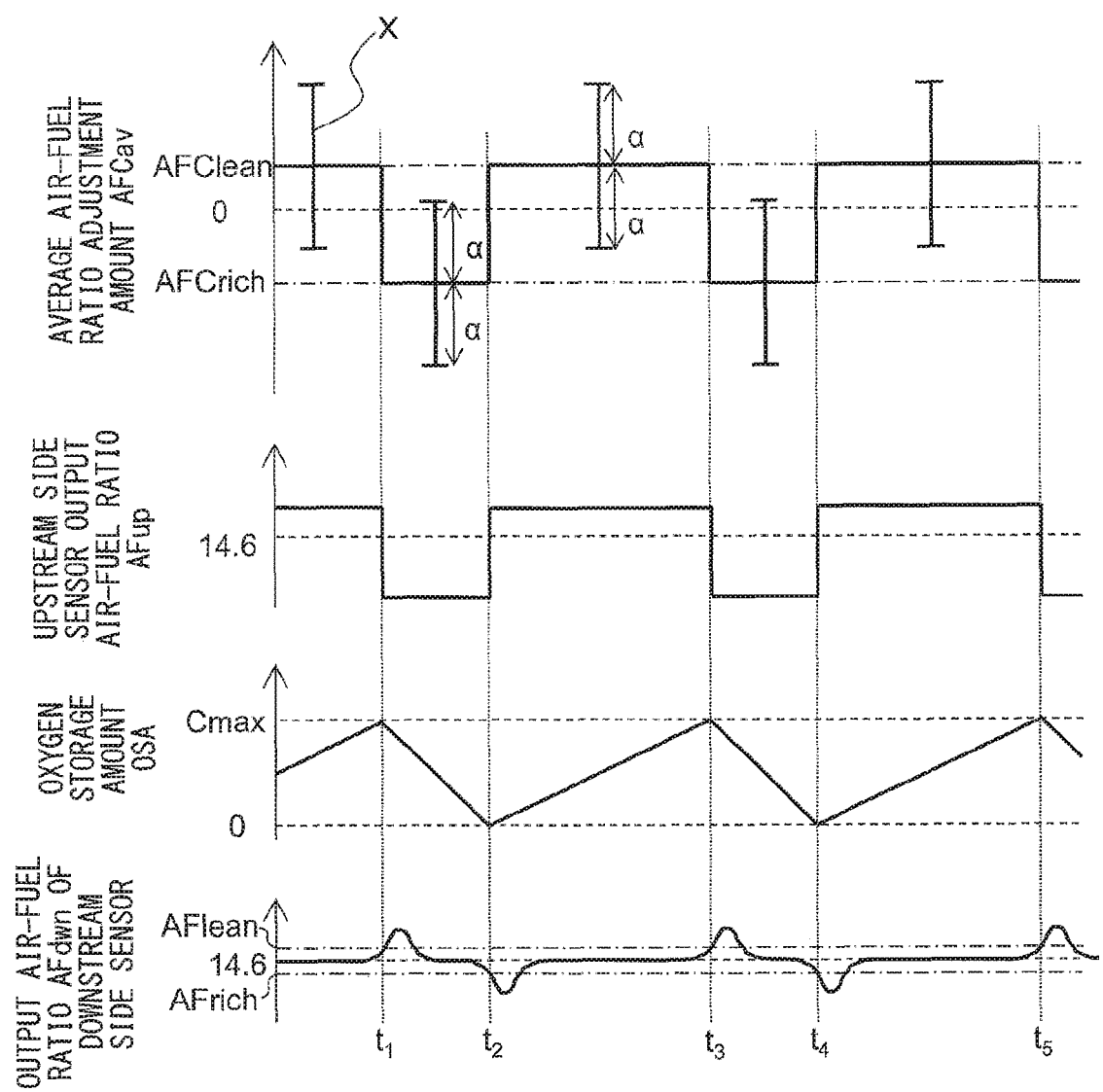
FIG. 4 is a time chart of an average air-fuel ratio correction amount etc. in the case of performing air-fuel ratio control by the exhaust purification system according to the present embodiment.

Referring to FIG. 4, the average air-fuel ratio control will be specifically explained. FIG. 4 is a time chart of the average air-fuel ratio correction amount AFCav, output air-fuel ratio AFup of the upstream side air-fuel ratio sensor 40, oxygen storage amount OSA of the upstream side exhaust purification catalyst 20, and output air-fuel ratio AFdwn of the downstream side air-fuel ratio sensor 41 when performing air-fuel ratio control according to an exhaust purification system according to the present embodiment.

Note that, the average air-fuel ratio correction amount AFCav is a correction amount which corresponds to the target average air-fuel ratio of the exhaust gas which flows into the upstream side exhaust purification catalyst 20. When the average air-fuel ratio correction amount AFCav is 0, it means that the target average air-fuel ratio is an air-fuel ratio equal to the air-fuel ratio becoming the control center (below, referred to as the "control center air-fuel ratio") (in the present embodiment, basically stoichiometric air-fuel ratio). Further, when the average air-fuel ratio correction amount AFCav is a positive value, it means that the target average air-fuel ratio is an air-fuel ratio leaner than the control center air-fuel ratio (in the present embodiment, lean air-fuel ratio). Further, the absolute value of the average air-fuel ratio correction amount AFCav at this time corresponds to the difference of the target average air-fuel ratio and the control center air-fuel ratio or the difference between the average air-fuel ratio and the control center air-fuel ratio, constituting the "lean shift amount". Note that, "control center air-fuel ratio" means the air-fuel ratio to which the average air-fuel ratio correction amount AFCav is added according to the engine operating state, that is, the air-fuel ratio which becomes the reference when changing the target average air-fuel ratio in accordance with the average air-fuel ratio correction amount AFCav.

Similarly, when the average air-fuel ratio correction amount AFCav is a negative value, it means the target average air-fuel ratio is an air-fuel ratio which is richer than the control center air-fuel ratio (in the present embodiment, rich air-fuel ratio). Further, the absolute value of the average air-fuel ratio correction amount AFCav at this time corresponds to the difference of the target average air-fuel ratio and the control center air-fuel ratio or the difference between the average air-fuel ratio and the control center air-fuel ratio, constituting the "rich shift amount".

In the example which is shown in FIG. 4, in the state before the time $t_1$, the average air-fuel ratio correction amount AFCav is set to the lean set correction amount AFClean (corresponding to lean set air-fuel ratio). That is, the target average air-fuel ratio is made the lean air-fuel ratio. Along with this, the output air-fuel ratio AFup of the upstream side air-fuel ratio sensor 40, that is, the air-fuel ratio of the exhaust gas which flows into the upstream side exhaust purification catalyst 20, becomes a lean air-fuel ratio. The excess oxygen which is contained in the exhaust gas which flows into the upstream side exhaust purification catalyst 20 is stored in the upstream side exhaust purification catalyst 20. Along with this, the oxygen storage amount OSA of the upstream side exhaust purification catalyst 20 gradually increases. On the other hand, the upstream side exhaust purification catalyst 20 stores the oxygen, therefore the exhaust gas which flows out from the upstream side exhaust purification catalyst 20 does not contain oxygen, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually increases, finally, the oxygen storage amount OSA approaches the maximum storable oxygen amount Cmax. Along with this, part of the oxygen which flows into the upstream side exhaust purification catalyst 20 starts to flow out without being stored at the upstream side exhaust purification catalyst 20. Due to this, the output air-fuel ratio AFdwn of the downstream side air-fuel ratio sensor 41 gradually rises. At the time $t_1$, it reaches the lean judged air-fuel ratio AFlean.

In the present embodiment, if the output air-fuel ratio AFdwn of the downstream side air-fuel ratio sensor 41 becomes the lean judged air-fuel ratio AFlean or more, the oxygen storage amount OSA is made to decrease by switching the average air-fuel ratio correction amount AFCav to the rich set correction amount AFCrich (corresponding to the rich set air-fuel ratio). Therefore, the target average air-fuel ratio is switched to the rich air-fuel ratio.

Note that, in the present embodiment, rather than right after the output air-fuel ratio AFdwn of the downstream side air-fuel ratio sensor 41 changes from the stoichiometric air-fuel ratio to the rich air-fuel ratio, the average air-fuel ratio correction amount AFCav is switched after the rich judged air-fuel ratio AFrich is reached. This is because even if the oxygen storage amount OSA of the upstream side exhaust purification catalyst 20 is sufficient, the air-fuel ratio of the exhaust gas which flows out from the upstream side exhaust purification catalyst 20 sometimes ends up deviating very slightly from the stoichiometric air-fuel ratio. Conversely speaking, the rich judged air-fuel ratio is made an air-fuel ratio which the air-fuel ratio of the exhaust gas which flows out from the upstream side exhaust purification catalyst 20 does not usually reach when the oxygen storage amount OSA of the upstream side exhaust purification catalyst 20 is sufficient. Note that, the same can be said for the above-mentioned lean judged air-fuel ratio.

If, at the time $t_1$, the target average air-fuel ratio is switched to the rich air-fuel ratio, along with this, the output air-fuel ratio AFup of the upstream side air-fuel ratio sensor 40, that is, the average air-fuel ratio, changes to the rich air-fuel ratio. The excess unburned HC and CO which is contained in the exhaust gas which flows into the upstream side exhaust purification catalyst 20 are removed at the upstream side exhaust purification catalyst 20. Along with this, the oxygen storage amount OSA of the upstream side exhaust purification catalyst 20 gradually decreases. On the other hand, the upstream side exhaust purification catalyst 20 removes the unburned HC and CO, therefore the exhaust gas which flows out from the upstream side exhaust purification catalyst 20 does not contain unburned HC and CO, therefore the output air-fuel ratio AFdwn of the downstream side air-fuel ratio sensor 41 becomes substantially the stoichiometric air-fuel ratio.

If the oxygen storage amount OSA of the upstream side exhaust purification catalyst 20 gradually decreases, finally the oxygen storage amount OSA approaches zero. Along with this, part of the unburned HC and CO which flows into the upstream side exhaust purification catalyst 20 starts to flow out without being removed at the upstream side exhaust purification catalyst 20. Due to this, the output air-fuel ratio AFdwn of the downstream side air-fuel ratio sensor 41 gradually falls. At the time $t_2$, it reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target air-fuel ratio is switched to the lean air-fuel ratio. After that, at the time $t_3$ on, an operation similar to the above-mentioned operation is repeated.

Further, in the average air-fuel ratio control of the present embodiment, the absolute value of the lean set correction amount AFClean is made a value smaller than the absolute value of the rich set correction amount AFCrich. Therefore, the difference between the average air-fuel ratio and control center air-fuel ratio (stoichiometric air-fuel ratio) when controlling the average air-fuel ratio to the lean air-fuel ratio, constituting the "lean shift amount", is made smaller than the difference between the average air-fuel ratio and control center air-fuel ratio when controlling the average air-fuel ratio to the rich air-fuel ratio, constituting the "rich shift amount". Due to this, the time period in which the target average air-fuel ratio is set to the lean set correction amount AFClean (for example, times $t_2$ to $t_3$) is made longer than the time period in which the target air-fuel ratio is set to the rich set correction amount AFCrich (for example, times $t_1$ to $t_2$).

<Inter-Cylinder Air-Fuel Ratio Control>

Next, inter-cylinder air-fuel ratio control will be explained. In inter-cylinder air-fuel ratio control, the fuel injection amounts from the fuel injectors 11 are controlled so that the combustion air-fuel ratios becomes different air-fuel ratios at least partially between the cylinders. In particular, in the present embodiment, in part of the cylinders, the combustion air-fuel ratio is made richer than the target average air-fuel ratio, while at the remaining cylinders, the combustion air-fuel ratio is made leaner than the target air-fuel ratio.

Figure 5:
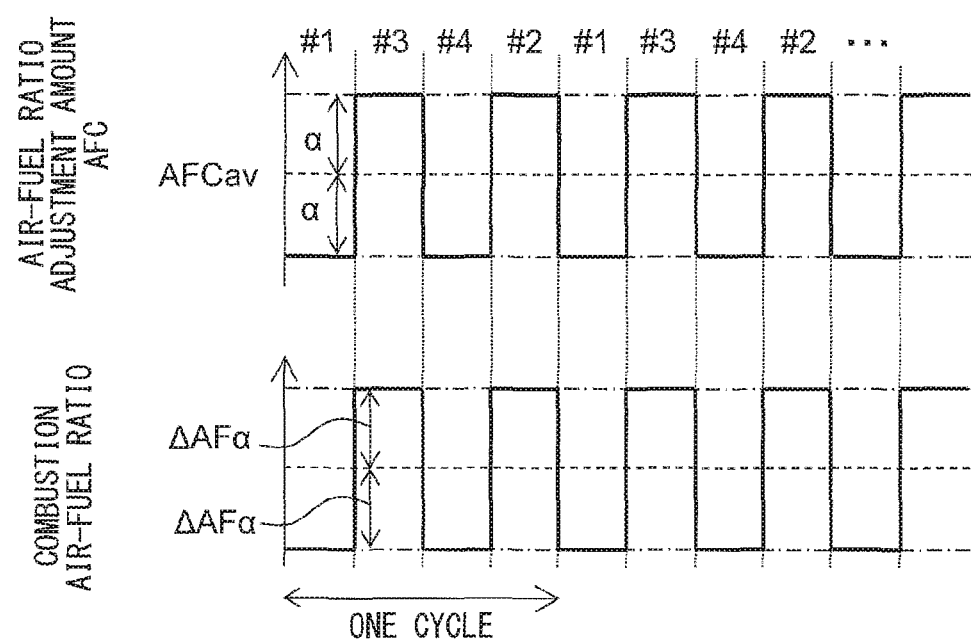
FIG. 5 is a time chart of an air-fuel ratio correction amount and combustion air-fuel ratio.

FIG. 5 is a time chart of the air-fuel ratio correction amount AFC and combustion air-fuel ratios of the cylinders. In the present embodiment, the internal combustion engine is an in-line four-cylinder internal combustion engine, therefore the air-fuel mixture is burned in the combustion chambers 5 in the order of the #1 cylinder, #3 cylinder, #4 cylinder, and #2 cylinder. In the example which is shown in FIG. 5, in the #1 cylinder where combustion is first performed in one cycle, the air-fuel ratio correction amount AFC in the cylinder is decreased by the average air-fuel ratio correction amount AFCav. That is, in the #1 cylinder, the air-fuel ratio of the air-fuel mixture which is fed to the combustion chamber 5 is made richer than the average target air-fuel ratio. Therefore, in the #1 cylinder, the combustion air-fuel ratio is made an air-fuel ratio richer than the average air-fuel ratio.

Further, at the #3 cylinder at which combustion is next performed, the air-fuel ratio correction amount AFC of the cylinder is increased by the average air-fuel ratio correction amount AFCav. As a result, at the #3 cylinder, the combustion air-fuel ratio is made an air-fuel ratio leaner than the average air-fuel ratio. Further, at the #4 cylinder at which combustion is next performed, the combustion air-fuel ratio is made an air-fuel ratio richer than the average air-fuel ratio, while at the #2 cylinder at which combustion is next performed, the combustion air-fuel ratio is made an air-fuel ratio which is leaner than the average air-fuel ratio.

Further, in the present embodiment, the amounts of change from the average air-fuel ratio correction amount AFCav in the inter-cylinder air-fuel ratio control are made the same between cylinders made richer than the average air-fuel ratio (in the figure, #1 cylinder and #4 cylinder, below, also referred to as "rich side cylinders"). In the example which is shown in FIG. 5, the amounts of change of the air-fuel ratio correction amounts in the #1 cylinder and #4 cylinder both become α. As a result, the combustion air-fuel ratios in these cylinders are made air-fuel ratios richer than the average air-fuel ratio by exactly ΔAFα (corresponding to amount of change α). Similarly, in the present embodiment, the amounts of change from the average air-fuel ratio correction amount AFCav in the inter-cylinder air-fuel ratio control are made the same between cylinders made leaner than the average air-fuel ratio (in the figure, #2 cylinder and #3 cylinder, below, also referred to as "lean side cylinders"). In the example which is shown in FIG. 5, the amounts of change of the air-fuel ratio correction amounts in the #2 cylinder and #3 cylinder both become α. As a result, the combustion air-fuel ratios in these cylinders are made air-fuel ratios leaner than the average air-fuel ratio by exactly ΔAFα (corresponding to amount of change α).

Furthermore, in the present embodiment, between the rich side cylinders and the lean side cylinders as well, the amounts of change from the average air-fuel ratio correction amount AFCav are made the same α. As a result, the difference between the combustion air-fuel ratio and average air-fuel ratio of a cylinder which is made richer than the average air-fuel ratio becomes equal to the difference between the combustion air-fuel ratio and average air-fuel ratio of a cylinder which is made leaner than the average air-fuel ratio.

In FIG. 4, X indicates the amounts of change of combustion air-fuel ratios from the average air-fuel ratio correction amount AFCav in inter-cylinder air-fuel ratio control. As will be understood from FIG. 4, at the times $t_1$ to $t_2$ when the average air-fuel ratio correction amount AFCav is set to the rich set correction amount AFCrich, at the rich side cylinders (#1 cylinder, #4 cylinder), the air-fuel ratio correction amounts AFC of the cylinders become the rich set correction amount AFCrich minus the amount of change α (AFCrich−α). As a result, at the rich side cylinders, the combustion air-fuel ratios are made air-fuel ratios richer than the average air-fuel ratio by exactly ΔAFα (corresponding to amount of change α). Further, at the times $t_1$ to $t_2$, at the lean side cylinders, the air-fuel ratio correction amounts AFC of the cylinders become the rich set correction amount AFCrich plus the amount of change α (AFCrich+α). As a result, at the lean side cylinders, the combustion air-fuel ratios are made air-fuel ratios leaner than the average air-fuel ratio by exactly ΔAFα (corresponding to amount of change α). In addition, the amount of change α is made a value larger than the absolute value of the rich set correction amount AFCrich. For this reason, at the lean side cylinders, the combustion air-fuel ratios are controlled so that the combustion air-fuel ratios become lean air-fuel ratios.

Similarly, at the times $t_2$ to $t_3$ where the average air-fuel ratio correction amount AFCav is set to the lean set correction amount AFlean, at the lean side cylinders (#2 cylinder, #3 cylinder), the air-fuel ratio correction amounts AFC of the cylinders become the lean set correction amount AFClean plus the amount of change α (AFClean+α). As a result, at the lean side cylinders, the combustion air-fuel ratios are made air-fuel ratios leaner than the average air-fuel ratio by exactly ΔAFα (corresponding to amount of change α). Further, at the times $t_2$ to $t_3$, at the rich side cylinders, the air-fuel ratio correction amounts AFC of the cylinders become the lean set correction amount AFClean minus the amount of change α (AFClean−α). As a result, at the rich side cylinders, the combustion air-fuel ratios are made air-fuel ratios richer than the average air-fuel ratio by exactly ΔAFα (corresponding to amount of change α). In addition, the amount of change α is made a value larger than the absolute value of the lean set correction amount AFClean. For this reason, at the rich side cylinders, the combustion air-fuel ratios are controlled so that the combustion air-fuel ratios become rich air-fuel ratios.

Note that, the amount of change α is larger than the absolute values of the rich set correction amount AFCrich and lean set correction amount AFClean. For this reason, in inter-cylinder air-fuel ratio control, the difference between the combustion air-fuel ratio of a cylinder which is made richer than the average air-fuel ratio and the combustion air-fuel ratio of a cylinder which is made leaner than the average air-fuel ratio (that is, amplitude in inter-cylinder air-fuel ratio control) is larger than the difference between the rich set air-fuel ratio and lean set air-fuel ratio at the average air-fuel ratio control (that is, amplitude of air-fuel ratio in average air-fuel ratio control).

<Switching of Average Target Air-Fuel Ratio and Inter-cylinder Air-Fuel Ratio Control>

As explained above, in average air-fuel ratio control, if the output air-fuel ratio AFdwn of the downstream side air-fuel ratio sensor 41 becomes the rich judged air-fuel ratio AFrich or less, the target average air-fuel ratio is switched from the rich set air-fuel ratio to the lean set air-fuel ratio. Due to this, the average air-fuel ratio is switched from the rich air-fuel ratio to the lean air-fuel ratio. In the present embodiment, inter-cylinder air-fuel ratio control is performed so that the combustion air-fuel ratio becomes leaner than the average air-fuel ratio at the first cylinder right after the average air-fuel ratio is switched from the rich air-fuel ratio to the lean air-fuel ratio. This will be explained with reference to FIG. 6.

Figure 6:
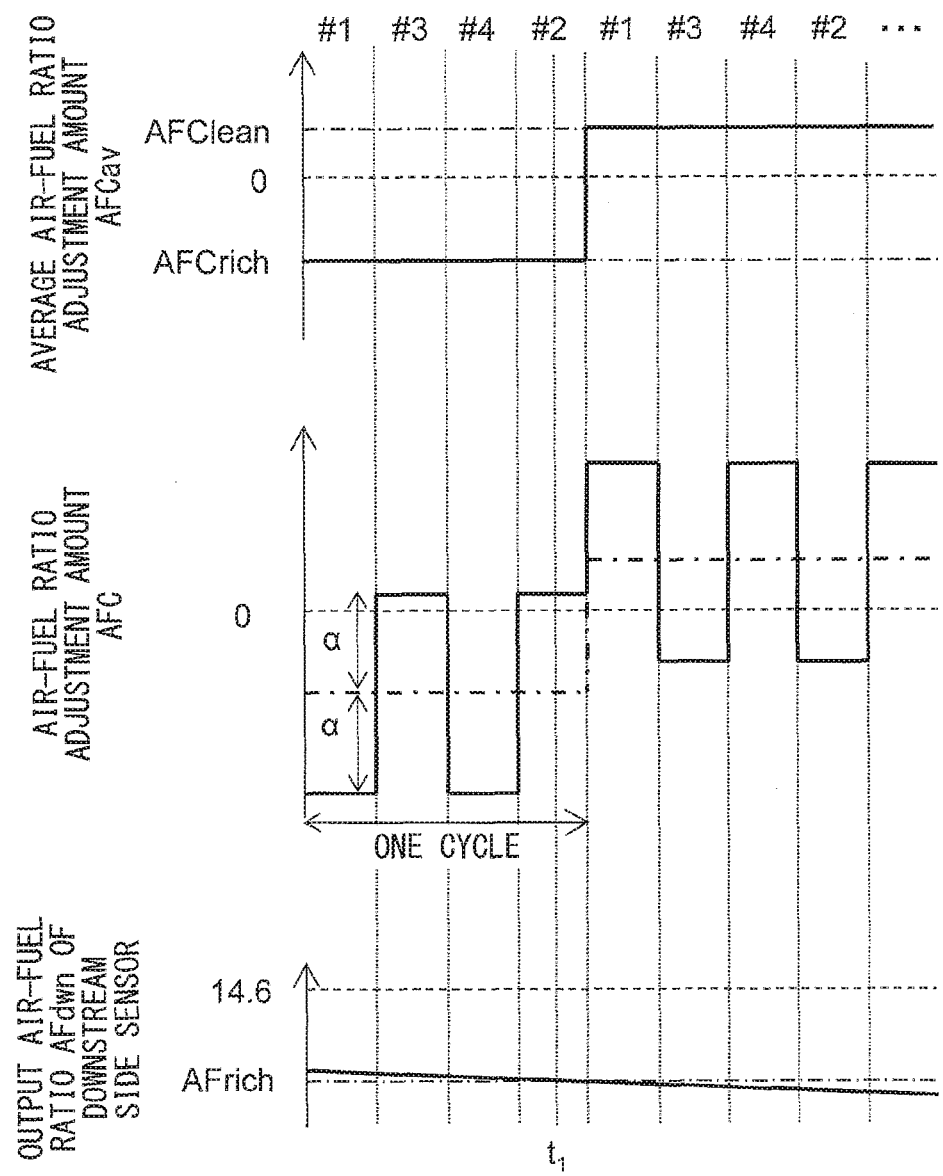
FIG. 6 is a time chart of an average air-fuel ratio correction amount etc.

FIG. 6 is a time chart of the average air-fuel ratio correction amount, air-fuel ratio correction amount of each cylinder, and output air-fuel ratio of the downstream side air-fuel ratio sensor 41. In the illustrated example, before the time $t_1$, the average air-fuel ratio correction amount AFCav is made the rich set correction amount AFCrich. In addition, due to inter-cylinder air-fuel ratio control, at a rich side cylinder, the air-fuel ratio correction amount AFC becomes the rich set correction amount AFCrich minus the amount of change α, while at a lean side cylinder, the air-fuel ratio correction amount AFC becomes the rich set correction amount AFCrich plus the amount of change α.

In the illustrated example, at the time $t_1$, the output air-fuel ratio AFdwn of the downstream side air-fuel ratio sensor 41 becomes the rich judged air-fuel ratio AFrich or less. At this time, combustion is being performed at the #2 cylinder. Fuel is next fed from a fuel injector 11 to the #1 cylinder. Therefore, from the #1 cylinder at which fuel is next fed, the average air-fuel ratio correction amount AFCav is switched to the lean set correction amount AFClean.

On the other hand, before the time $t_1$, the #1 cylinder is made the rich side cylinder at the inter-cylinder air-fuel ratio control. Therefore, if performing inter-cylinder air-fuel ratio control as in the procedure before the time $t_1$, the #1 cylinder right after the average air-fuel ratio correction amount AFCav is switched to the lean set correction amount AFClean becomes a rich side cylinder. However, in the present embodiment, at this #1 cylinder, the air-fuel ratio correction amount AFC is set to the average air-fuel ratio correction amount AFCav plus the amount of change α. That is, this #1 cylinder is made a lean side cylinder. As a result, in the present embodiment, the combustion air-fuel ratio is made leaner than the average air-fuel ratio at the first cylinder right after the average air-fuel ratio is switched from the rich air-fuel ratio to the lean air-fuel ratio. After that, at the #3 cylinder, the air-fuel ratio correction amount AFC is set to the average air-fuel ratio correction amount AFCav minus the amount of change α.

In addition, in the present embodiment, inter-cylinder air-fuel ratio control is performed so that the combustion air-fuel ratio becomes richer than the average air-fuel ratio at the first cylinder right after the average air-fuel ratio is switched from the lean air-fuel ratio to the rich air-fuel ratio. This will be explained with reference to FIG. 7.

Figure 7:
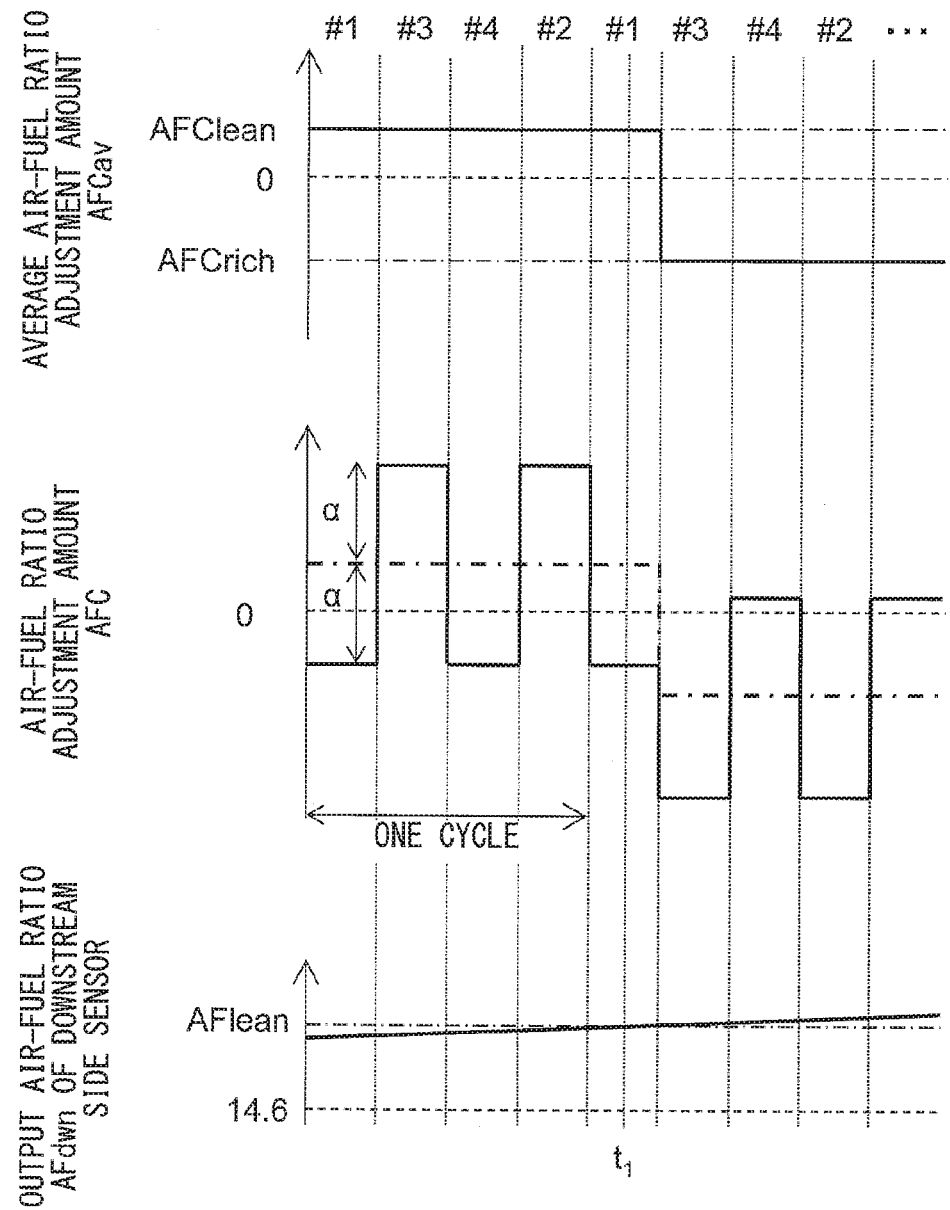
FIG. 7 is a time chart of an average air-fuel ratio correction amount etc.

FIG. 7 is a time chart of the average air-fuel ratio correction amount, air-fuel ratio correction amount of each cylinder, and output air-fuel ratio of the downstream side air-fuel ratio sensor 41 and is similar to FIG. 6. In the illustrated example, before the time $t_1$, the average air-fuel ratio correction amount AFCav is made the lean set correction amount AFClean. In addition, due to the inter-cylinder air-fuel ratio control, at a rich side cylinder, the air-fuel ratio correction amount AFC becomes the lean set correction amount AFClean minus the amount of change α, while at a lean side cylinder, the air-fuel ratio correction amount AFC becomes the lean set correction amount AFClean plus the amount of change α.

In the illustrated example, at the time $t_1$, the output air-fuel ratio AFdwn of the downstream side air-fuel ratio sensor 41 becomes the lean judged air-fuel ratio AFlean or more. At this time, combustion is occurring at the #1 cylinder, therefore fuel is next fed from a fuel injector 11 to the #3 cylinder. Therefore, the average air-fuel ratio correction amount AFCav is switched to the rich set correction amount AFCrich from the #3 cylinder at which fuel is next fed.

On the other hand, before the time $t_1$, the #3 cylinder is made the lean side cylinder in inter-cylinder air-fuel ratio control. Therefore, if performing inter-cylinder air-fuel ratio control as in the operation before the time $t_1$, the #3 cylinder right before the average air-fuel ratio correction amount AFCav is switched to the rich set correction amount AFCrich becomes a lean side cylinder. However, in the present embodiment, at this #3 cylinder, the air-fuel ratio correction amount AFC is set to the average air-fuel ratio correction amount AFCav minus the amount of change α. That is, this #3 cylinder is made a rich side cylinder. As a result, in the present embodiment, the combustion air-fuel ratio is made richer than the average air-fuel ratio at the first cylinder right after the average air-fuel ratio is switched from the lean air-fuel ratio to the rich air-fuel ratio. After that, in the #4 cylinder, the air-fuel ratio correction amount AFC is set to the average air-fuel ratio correction amount AFCav plus the amount of change α.

<Effects of Average Air-Fuel Ratio Control and Inter-Cylinder Air-Fuel Ratio Control>

Figure 8A:
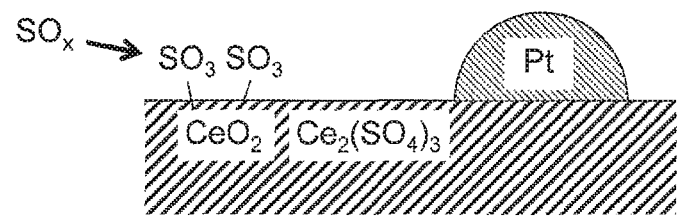
FIGS. 8A to 8C are views which schematically show a carrier surface of an exhaust purification catalyst.
Figure 8B:
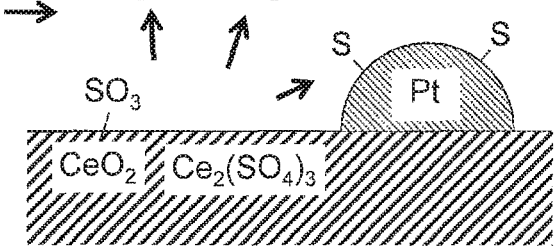
Figure 8C:
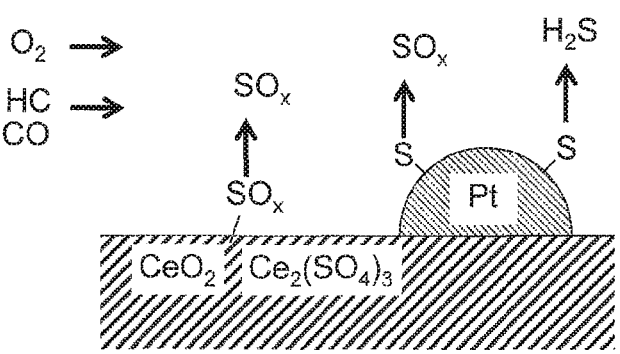

Next, referring to FIGS. 8A to 8C and FIGS. 9A and 9B, the effects due to average air-fuel ratio control and inter-cylinder air-fuel ratio control will be explained. First, referring to FIGS. 8A to 8C, the effect of performing the above-mentioned such average air-fuel ratio control will be explained. FIGS. 8A to 8C are views which schematically shows the carrier surfaces of the exhaust purification catalysts 20 and 24. In the example which is shown in FIGS. 8A to 8C, the carriers of the exhaust purification catalysts 20 and 24 contain platinum (Pt) as a precious metal which has a catalytic action and ceria ($CeO_2$) as a substance which has an oxygen storage ability.

In this regard, the fuel which is supplied into the internal combustion engine contains a sulfur content, though slight, therefore the exhaust gas which is discharged from the combustion chamber 5 contains a slight amount of sulfur oxides ($SO_X$). When the temperatures of the exhaust purification catalysts 20 and 24 do not become that high (for example, are 600° C. or less), if the $SO_X$ which is contained in the exhaust gas flows into the exhaust purification catalysts 20 and 24, even if the air-fuel ratio of the exhaust gas is a substantially stoichiometric air-fuel ratio, the $SO_X$ is physically adsorbed at the ceria on the carrier by Van der Waals force. However, the $SO_X$ which is contained in the exhaust gas is firmly stored by the ceria on the carriers if the air-fuel ratio of the exhaust gas is the lean air-fuel ratio.

FIG. 8A shows the state where the exhaust gas of a lean air-fuel ratio flows into the exhaust purification catalysts 20 and 24 when the temperature of the exhaust purification catalysts 20 and 24 is not that high (for example, 600° C. or less). Therefore, in the state which is shown in FIG. 8A, the exhaust gas which flows into the exhaust purification catalysts 20 and 24 contains a large amount of excess oxygen. If the exhaust gas which flows into the exhaust purification catalysts 20 and 24 contains excess oxygen, the $SO_X$ which is contained in the exhaust gas is chemically adsorbed at the ceria as $SO_3$. According to this chemical adsorption, $SO_X$ is adsorbed at the ceria more firmly than the above-mentioned physical adsorption. Further, if the excess oxygen which is contained in the exhaust gas becomes further greater, that is, if the lean degree of the air-fuel ratio of the exhaust gas becomes larger, the $SO_X$ which is contained in the exhaust gas reacts with the ceria to become $Ce_2(SO_4)_3$ and be absorbed. By such absorption, $SO_X$ is firmly absorbed at the ceria by the above-mentioned chemical adsorption. Note that, in the following explanation, $SO_X$ being "adsorbed" and "absorbed" at the ceria will be referred to all together as the SOx being "stored" at the ceria.

In such a state, if exhaust gas exhaust gas of a rich air-fuel ratio flows into the exhaust purification catalysts 20 and 24, the sulfur content of the $SO_X$ which is stored in the ceria moves on to the platinum. This state is shown in FIG. 8B. As shown in FIG. 8B, if exhaust gas of a rich air-fuel ratio flows into the exhaust purification catalysts 20 and 24, the exhaust gas contains a large amount of excess unburned HC and CO. For this reason, the $SO_X$ which is stored in the ceria is broken down by the unburned HC and CO resulting in the production of water ($H_2O$) and carbon dioxide ($CO_2$). In addition, the sulfur content which is produced by breakdown of $SO_X$ is adsorbed on the surface of the platinum. In this way, if the sulfur content which is adsorbed on the surface of the platinum increases and covers the surface of the platinum, the area by which the platinum contacts the surrounding gas decreases thereby inviting a drop in the catalytic activity of the platinum.

Note that, breakdown of sulfur which is stored in the ceria becomes harder the stronger $SO_X$ is stored at the ceria. Therefore, compared with when $SO_X$ is chemically adsorbed at the ceria, when $SO_X$ is absorbed in the ceria as $Ce_2(SO_4)_3$, breakdown of sulfur which is stored in the ceria becomes harder and therefore movement of the sulfur content from the ceria to the platinum does not easily occur. For this reason, movement of sulfur content when $SO_X$ is absorbed at the ceria does not occur, compared with when $SO_X$ is chemically adsorbed at ceria, if the rich degree of the air-fuel ratio of the exhaust gas is not large or if the temperature of the exhaust purification catalysts 20 and 24 is not high.

In this way, in the state where the sulfur content is adsorbed on the surface of the platinum, the exhaust purification catalysts 20 and 24 become high in temperature (for example, 600° C. or more). If rich air-fuel ratio exhaust gas flows into the exhaust purification catalysts 20 and 24, the sulfur content which is adsorbed on the surfaces of the platinum is made to separate. This state is shown in FIG. 8C. As shown in FIG. 8C, if rich air-fuel ratio exhaust gas flows into the exhaust purification catalysts 20 and 24, the inflowing exhaust gas contains a large amount of excess unburned HC and CO. Further, even when the air-fuel ratio of the exhaust gas is a rich air-fuel ratio, the exhaust gas contains oxygen, though slight. For this reason, if the exhaust purification catalysts 20 and 24 are high in temperature, the sulfur content which is adsorbed on the platinum surfaces reacts with the unburned HC, CO, and oxygen in the exhaust gas to become $SO_X$ and $H_2S$ which are made to be separated from the platinum surface. Note that, at this time, the $SO_X$ which is stored at the ceria is also made to separate without being absorbed at the platinum surfaces.

Here, during operation of the internal combustion engine, the temperature of the exhaust purification catalysts 20 and 24 is not constantly maintained at a high temperature (for example, 720° C. or more). Depending on the engine operating state, it is sometimes maintained at a certain degree of low temperature (for example, less than 720° C.). When in this way the exhaust purification catalysts 20 and 24 are maintained at a certain degree of low temperature, if the air-fuel ratio of the exhaust gas which flows into the exhaust purification catalysts 20 and 24 becomes a rich air-fuel ratio, as shown in FIG. 8B, the sulfur content move from the ceria to the platinum surfaces and a drop of the catalytic activity of the platinum ends up being invited.

As opposed to this, in the exhaust purification system of the present embodiment, in the average air-fuel ratio control, the lean shift amount is made smaller than the rich shift amount. Due to this, the time period during which the average air-fuel ratio is lean becomes longer than the time period during which the average air-fuel ratio is rich. In this way, in the present embodiment, the time period in which the average exhaust air-fuel ratio of the exhaust gas which flows into the upstream side exhaust purification catalyst 20 is lean becomes longer or the time period in which the average exhaust air-fuel ratio is rich becomes shorter. For this reason, it becomes harder for the sulfur content to move from the ceria to the platinum surface and accordingly becomes possible to suppress the drop in catalytic activity of the platinum.

Note that, from the viewpoint of making the time period when the average exhaust air-fuel ratio is lean longer and making the time period when the average exhaust air-fuel ratio is rich shorter, it is preferable that the lean shift amount be as small as possible and that the rich shift amount be as large as possible. That is, the difference between the lean shift amount and the rich shift amount is preferably made as large as possible.

Figure 9A:
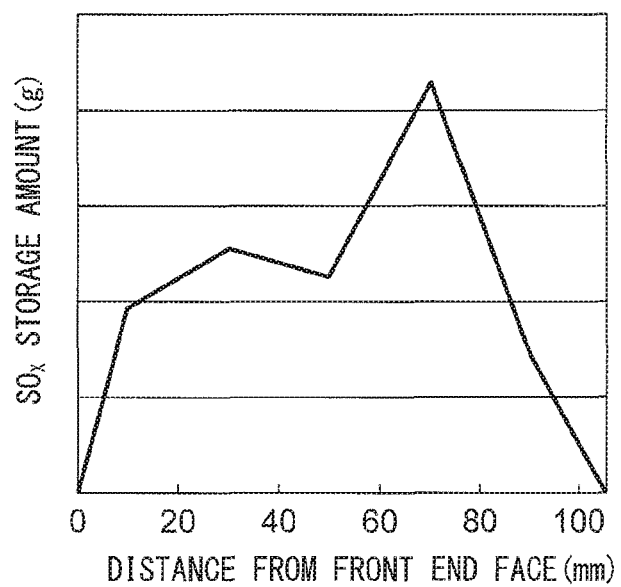
FIGS. 9A and 9B are views which show the relationship between a distance from a front end surface of an upstream side exhaust purification catalyst and a storage amount of $SO_X$ per unit volume.
Figure 9B:
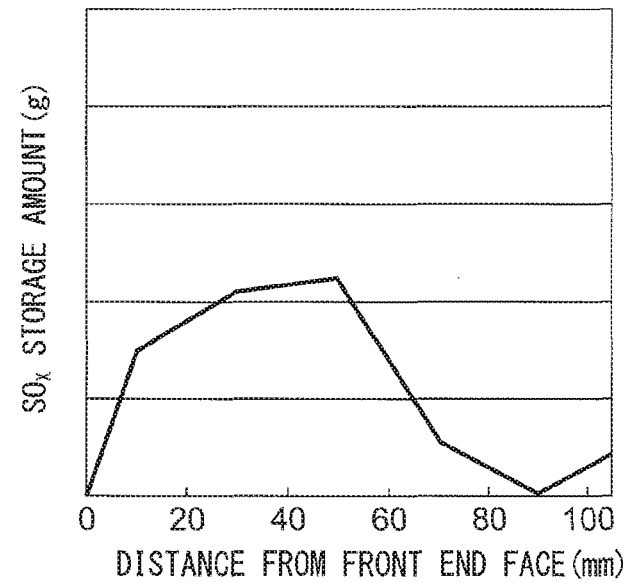

Next, referring to FIGS. 9A and 9B, the effect of performing inter-cylinder air-fuel ratio control will be explained. FIGS. 9A and 9B show the relationship between the distance from the upstream side end face of the upstream side exhaust purification catalyst in the direction of flow of exhaust (front end face) and the storage amount of the $SO_X$ in the precious metal and carrier per unit volume of the exhaust purification catalyst and shows the results of experiments when using fuel with a high sulfur content concentration to operate the internal combustion engine for a predetermined time.

FIG. 9A shows the results when maintaining the average exhaust air-fuel ratio of the exhaust gas which flows into the upstream side exhaust purification catalyst at the lean air-fuel ratio and not performing the above-mentioned inter-cylinder air-fuel ratio control. Therefore, FIG. 9A shows the results when the combustion air-fuel ratios are maintained at the lean air-fuel ratios at all cylinders. As will be understood from FIG. 9A, when inter-cylinder air-fuel ratio control is not being performed, $SO_X$ is stored across the entire direction of flow of exhaust of the upstream side exhaust purification catalyst and in particular a large amount of $SO_X$ is stored at the back.

On the other hand, FIG. 9B shows the results when maintaining the average exhaust air-fuel ratio of the exhaust gas which flows into the upstream side exhaust purification catalyst at the lean air-fuel ratio and performing the above-mentioned inter-cylinder air-fuel ratio control. Therefore, FIG. 9B shows the results in the case when the combustion air-fuel ratio is made to shift to the rich side and lean side from the lean air-fuel ratio for each cylinder. As will be understood from FIG. 9B, when performing inter-cylinder air-fuel ratio control, a large amount of $SO_X$ is stored in the front of the upstream side exhaust purification catalyst in the direction of flow of exhaust and almost no $SO_X$ is stored in the back.

In this way, as the reason why $SO_X$ is stored at the front of the upstream side exhaust purification catalyst when performing inter-cylinder air-fuel ratio control, the existence of a relationship between the storage of $SO_X$ and adsorption and release of oxygen may be considered. When performing inter-cylinder air-fuel ratio control, exhaust gas which contains excess unburned HC and CO is discharged from a cylinder with a combustion air-fuel ratio of a rich air-fuel ratio. On the other hand, exhaust gas which contains excess unburned oxygen is discharged from a cylinder with a combustion air-fuel ratio of a lean air-fuel ratio. As a result, the exhaust gas which flows into the upstream side exhaust purification catalyst contains large amounts of unburned HC, CO, and oxygen even if the average exhaust air-fuel ratio is the stoichiometric air-fuel ratio.

As a result, when performing inter-cylinder air-fuel ratio control (FIG. 9B), oxygen is actively adsorbed and released at the front of the upstream side exhaust purification catalyst. Here, storage of $SO_X$ at the carrier of the upstream side exhaust purification catalyst is believed to easily occur in the region of the upstream side exhaust purification catalyst where oxygen is actively absorbed and released. For this reason, when performing inter-cylinder air-fuel ratio control, a large amount of $SO_X$ is stored at the front of the upstream side exhaust purification catalyst where oxygen is actively absorbed and released. As a result, $SO_X$ is no longer stored at the back.

On the other hand, when not performing inter-cylinder air-fuel ratio control (FIG. 9A), the unburned HC, CO, and oxygen which are contained in the exhaust gas which flows into the upstream side exhaust purification catalyst are not that great. For this reason, at the front side of the upstream side exhaust purification catalyst, less than active a reaction occurs. Therefore, at the front side, oxygen is not actively absorbed or released. As a result, oxygen is actively absorbed and released at the middle to back of the upstream side exhaust purification catalyst. For this reason, when not performing inter-cylinder air-fuel ratio control, $SO_X$ is stored over the entire region in the direction of flow of exhaust. In particular, it is believed that a large amount of $SO_X$ is stored from the middle to the back of the upstream side exhaust purification catalyst. Note that, in the example which is shown in FIGS. 9A and 9B, the case is shown where the average exhaust air-fuel ratio of the exhaust gas which flows into the upstream side exhaust purification catalyst is maintained at the stoichiometric air-fuel ratio, but a similar trend is observed when the average exhaust air-fuel ratio of the exhaust gas which flows into the upstream side exhaust purification catalyst is maintained at the lean air-fuel ratio.

Here, the maximum storable oxygen amount Cmax of the upstream side exhaust purification catalyst changes in accordance with the state of storage of $SO_X$. Specifically, if $SO_X$ is stored in a certain region of the upstream side exhaust purification catalyst, the amount of oxygen which can be stored in that region decreases. That is, in the region where $SO_X$ is stored, part of the sulfur content is adsorbed at the precious metal surface. If the sulfur content is adsorbed at the precious metal surface in this way, the catalytic activity at the precious metal falls, therefore in the state where the carrier around this precious metal stores oxygen, even if exhaust gas which contains unburned HC and CO flows into the upstream side exhaust purification catalyst, the stored oxygen and unburned HC and CO can no longer be made to react. Accordingly, it is no longer possible to release the oxygen which is stored in the upstream side exhaust purification catalyst and as a result a decrease in the maximum storable oxygen amount Cmax is invited.

Therefore, when not performing inter-cylinder air-fuel ratio control (FIG. 9A), $SO_X$ is stored across the entire direction of flow of exhaust of the upstream side exhaust purification catalyst, therefore the maximum storable oxygen amount Cmax of the upstream side exhaust purification catalyst becomes smaller. As opposed to this, when performing inter-cylinder air-fuel ratio control (FIG. 9B), a region remains where almost no $SO_X$ is stored at the back of the upstream side exhaust purification catalyst. As a result, in this case, a drop in the maximum storable oxygen amount Cmax can be suppressed.

Further, if performing the inter-cylinder air-fuel ratio control when the average air-fuel ratio correction amount AFCav is the lean set correction amount AFClean (for example, times $t_2$ to $t_3$ of FIG. 4), at a lean side cylinder, the air-fuel ratio correction amount AFC becomes the lean set correction amount AFClean plus the amount of change $\alpha$. As a result, the combustion air-fuel ratio of the lean side cylinder is lean with a large lean degree.

Here, as explained with reference to FIG. 8A, the larger the lean degree of the air-fuel ratio of the exhaust gas which flows into the upstream side exhaust purification catalyst 20, the more strongly the $SO_X$ is stored at the ceria. Therefore, by performing average air-fuel ratio control plus additional inter-cylinder air-fuel ratio control, the $SO_X$ can be made to be firmly stored at the ceria and therefore the movement of sulfur content from the ceria to the platinum surface can be suppressed.

From the above, according to the present embodiment, by performing the above-mentioned such average air-fuel ratio control, the sulfur content which was adsorbed at the carrier (ceria etc.) can be kept from moving to the precious metal (platinum etc.). Due to this, it is possible to suppress a drop in catalytic activity of the precious metal. In addition, by performing the above-mentioned such inter-cylinder air-fuel ratio control, it is possible to suppress the storage of $SO_X$ in the carrier at the rear of the upstream side exhaust purification catalyst 20. Due to this, it is possible to suppress a drop in the maximum storable oxygen amount. Furthermore, even by performing the above-mentioned inter-cylinder air-fuel ratio control, it is possible to keep the sulfur content which was adsorbed at the carrier from moving to the precious metal.

Note that, in the above embodiment, in inter-cylinder air-fuel ratio control, the amount of change $\alpha$ becomes the same in all of the rich side cylinders. Accordingly, the combustion air-fuel ratio becomes the same. However, there is no need to make the amount of change $\alpha$ constant at all of the rich side cylinders. It may also be possible to make it a value which differs in amount of change even between cylinders at the rich side. In this case, the combustion air-fuel ratio will differ between the rich side cylinders. Further, the same can be said for the lean side cylinders.

Further, in the above embodiment, in inter-cylinder air-fuel ratio control, the combustion air-fuel ratio is made to shift to either the rich side or the lean side from the average air-fuel ratio in all of the cylinders. However, in inter-cylinder air-fuel ratio control, in part of the cylinders, the amount of change may be made zero and combustion air-fuel ratio may be made to match the average air-fuel ratio.

In addition, in the above embodiment, in inter-cylinder air-fuel ratio control, the number of the rich side cylinders and the number of the lean side cylinders are the same. However, the number of the rich side cylinders and the number of the lean side cylinders need not necessarily be the same. Therefore, for example, in the case of a four-cylinder internal combustion engine, just one cylinder may be made one to shift to the rich side and the remaining three cylinders or two of the remaining three cylinders may be made others to shift to the lean side.

However, in each case, when the average air-fuel ratio is controlled to the lean air-fuel ratio by average air-fuel ratio control, inter-cylinder air-fuel ratio control has to be performed so that the combustion air-fuel ratio becomes the rich air-fuel ratio at least at one cylinder among the plurality of cylinders. Further, even when the average air-fuel ratio is controlled to the rich air-fuel ratio by average air-fuel ratio control, inter-cylinder air-fuel ratio control is preferably performed so that the combustion air-fuel ratio becomes the lean air-fuel ratio at least at one cylinder among the plurality of cylinders. Further, in inter-cylinder air-fuel ratio control, the combustion air-fuel ratios of the cylinders are preferably controlled so as to become richer than the average air-fuel ratio at part of the cylinders among the plurality of cylinders and so as to become leaner than the average air-fuel ratio at the remaining cylinders among the plurality of cylinders.

Further, in the above embodiment, the combustion air-fuel ratio is made leaner than the average air-fuel ratio at the first cylinder right after the average air-fuel ratio is switched from the rich air-fuel ratio to the lean air-fuel ratio. Here, when the average air-fuel ratio is switched from the rich air-fuel ratio to the lean air-fuel ratio, the oxygen storage amount of the upstream side exhaust purification catalyst 20 becomes substantially zero. In this state, if ending up making the combustion air-fuel ratio the rich air-fuel ratio at the first cylinder right after the average air-fuel ratio is switched to the lean air-fuel ratio, the unburned HC and CO in the exhaust gas end up flowing out without being removed at the upstream side exhaust purification catalyst 20. As opposed to this, in the present embodiment, at the first cylinder, the combustion air-fuel ratio is made leaner than the average air-fuel ratio, therefore unburned HC and CO can be prevented from flowing out from the upstream side exhaust purification catalyst 20.

Similarly, in the above embodiment, at the first cylinder right after the average air-fuel ratio is switched from the lean air-fuel ratio to the rich air-fuel ratio, the combustion air-fuel ratio is made richer than the average air-fuel ratio. When the average air-fuel ratio is switched from the lean air-fuel ratio to the rich air-fuel ratio, the oxygen storage amount OSA of the upstream side exhaust purification catalyst 20 becomes substantially the maximum storable oxygen amount Cmax. In this state, if the combustion air-fuel ratio is made the lean air-fuel ratio at the first cylinder right after the average air-fuel ratio is switched to the rich air-fuel ratio, the oxygen and $NO_X$ in the exhaust gas end up flowing out without being removed at the upstream side exhaust purification catalyst 20. As opposed to this, in the present embodiment, the combustion air-fuel ratio is made richer than the average air-fuel ratio at the first cylinder, therefore the oxygen and $NO_X$ can be prevented from flowing out from the upstream side exhaust purification catalyst 20.

<Explanation of Specific Control>

Figure 10:
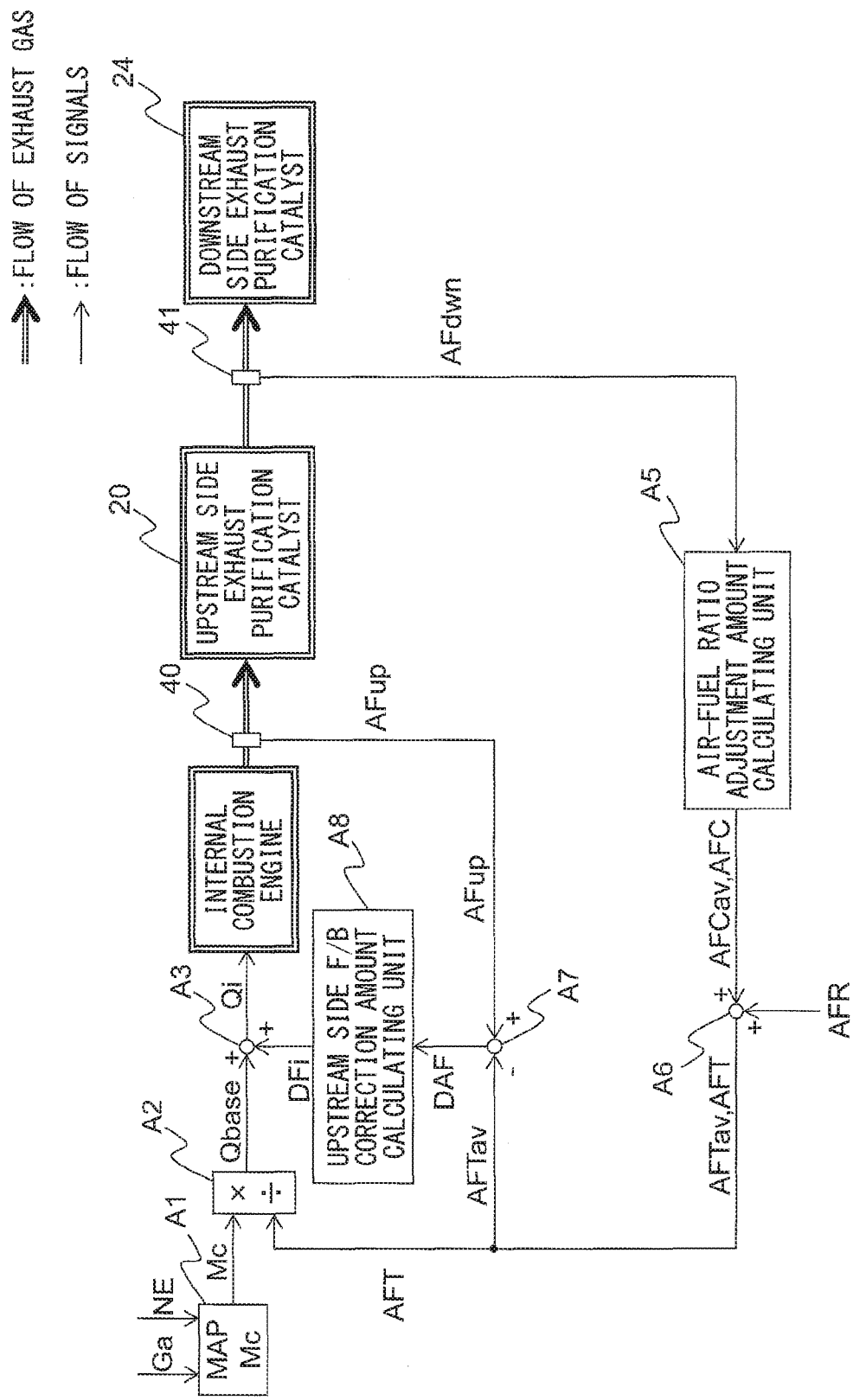
FIG. 10 is a functional block diagram of a control device.
Figure 11:
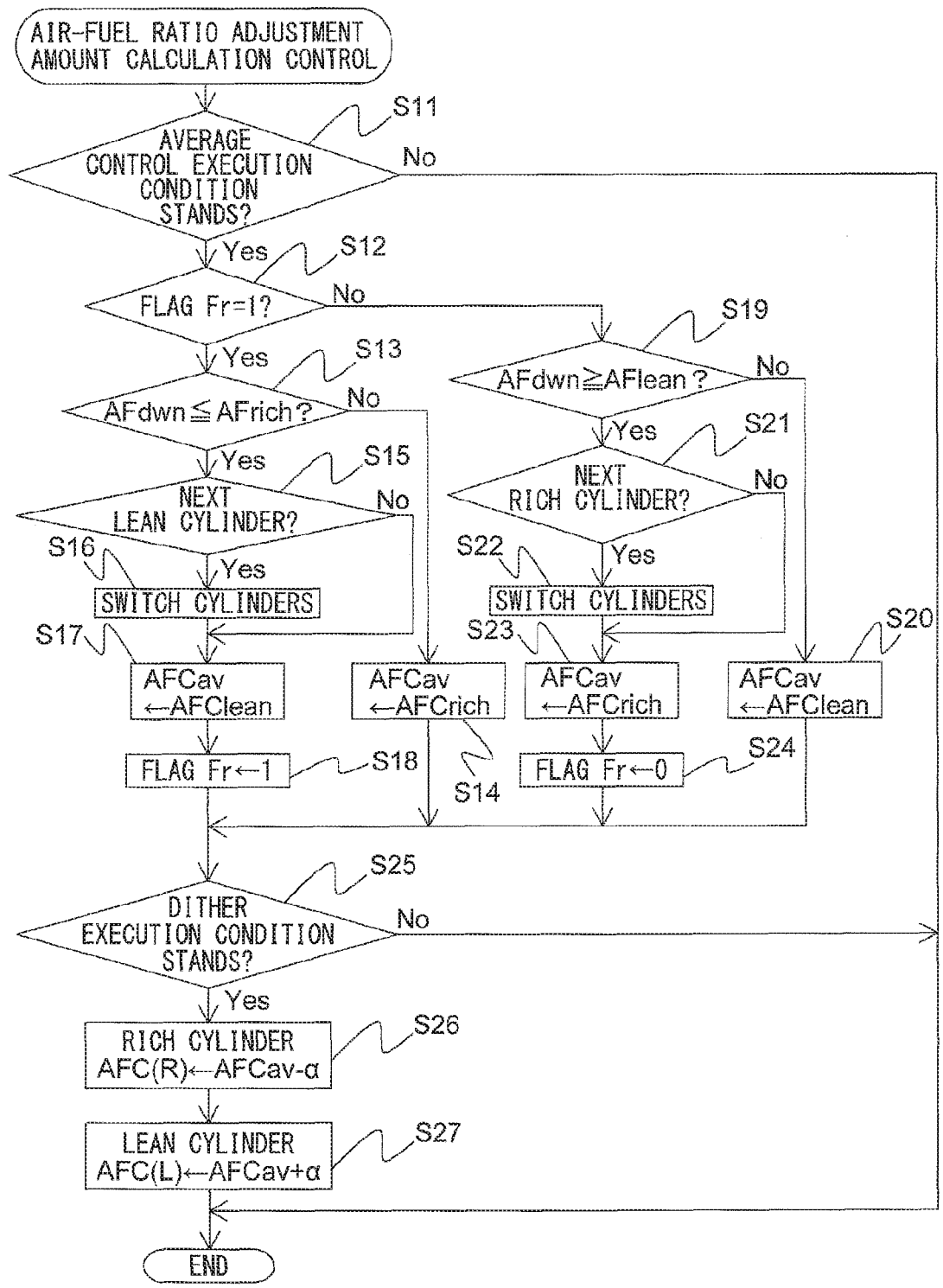
FIG. 11 is a flow chart which shows a control routine of processing for calculating an air-fuel ratio correction amount in a first embodiment.

Next, referring to FIG. 10 and FIG. 11, the control device of the exhaust purification system in the above embodiment will be specifically explained. The control device in the present embodiment is comprised of the functional blocks A1 to A8 in the functional block diagram of FIG. 10. Below, the functional blocks will be explained while referring to FIG. 10. The operations at these functional blocks A1 to A8 are basically performed in the ECU 31 which functions as a control device for controlling the exhaust purification system of the internal combustion engine.

<Calculation of Fuel Injection Amount>

First, the calculation of the fuel injection amount will be explained. In calculating the fuel injection amount, the cylinder intake air amount calculating unit A1, basic fuel injection amount calculating unit A2, and fuel injection amount calculating unit A3 are used.

The cylinder intake air amount calculating unit A1 calculates the amount of intake air MC to the cylinders based on the amount of flow Ga of intake air, engine speed NE, and map or calculation formula which is stored in the ROM 34 of the ECU 31. The amount of flow of intake air Ga is measured by the air flow meter 39, while the engine speed NE is calculated based on the output of the crank angle sensor 44.

The basic fuel injection amount calculating unit A2 divides the cylinder intake air amount Mc, which was calculated by the cylinder intake air amount calculating unit A1, by the target air-fuel ratio AFT, to thereby calculate the basic fuel injection amount Qbase (Qbase=Mc/AFT). The target air-fuel ratio AFT is calculated by the later explained target air-fuel ratio setting unit A6.

The fuel injection amount calculating unit A3 adds the basic fuel injection amount Qbase, which was calculated by the basic fuel injection amount calculating unit A2, and the later explained F/B correction amount DFi, to thereby calculate the fuel injection amount Qi (Qi=Qbase+DFi). The fuel injector 11 is instructed to inject fuel so that the thus calculated fuel injection amount Qi of fuel is injected from the fuel injector 11.

<Calculation of Target Air-Fuel Ratio>

Next, the calculation of the target air-fuel ratio will be explained. In calculating the target air-fuel ratio, the air-fuel ratio correction amount calculating unit A5 and the target air-fuel ratio setting unit A6 are used.

In the air-fuel ratio correction amount calculating unit A5, the average air-fuel ratio correction amount AFCav and the air-fuel ratio correction amount AFC of each cylinder are calculated based on the output air-fuel ratio AFdwn of the downstream side air-fuel ratio sensor 41. Specifically, the average air-fuel ratio correction amount AFCav and the air-fuel ratio correction amount AFC are calculated based on the flow chart shown in FIG. 11.

The target air-fuel ratio setting unit A6 calculates the target average air-fuel ratio AFTav and the target air-fuel ratio AFT of each cylinder by adding the average air-fuel ratio correction amount AFCav and the air-fuel ratio correction amount AFC of each cylinder which were calculated by the air-fuel ratio correction amount calculating unit A5 to the control center air-fuel ratio (in the present embodiment, the stoichiometric air-fuel ratio) AFR. The thus calculated target air-fuel ratio AFT is input to the basic fuel injection amount calculating unit A2 and the target average air-fuel ratio AFTav is input to the later explained air-fuel ratio deviation calculating unit A7.

<Calculation of F/B Correction Amount>

Next, the calculation of the F/B correction amount based on the output air-fuel ratio AFup of the upstream side air-fuel ratio sensor 40 will be explained. In calculating the F/B correction amount, the air-fuel ratio deviation calculating unit A7 and the F/B correction amount calculating unit A8 are used.

The air-fuel ratio deviation calculating unit A7 subtracts, from the output air-fuel ratio AFup of the upstream side air-fuel ratio sensor 40, the target average air-fuel ratio AFTav which was calculated by the target air-fuel ratio setting unit A6 to thereby calculate the air-fuel ratio deviation DAF (DAF=AFup−AFTav). This air-fuel ratio deviation DAF is a value which expresses the excess/deficiency of the amount of feed of fuel with respect to the target average air-fuel ratio AFTav.

The F/B correction amount calculating unit A8 processes the air-fuel ratio deviation DAF, which was calculated by the air-fuel ratio deviation calculating unit A7, by proportional-integral-derivative processing (PID processing) so as to calculate the F/B correction amount DFi for compensating for the excess/deficiency of the amount of fuel feed, based on the following formula (1). The thus calculated F/B correction amount DFi is input to the fuel injection amount calculating unit A3.

$$DFi=Kp \cdot DAF+Ki \cdot SDAF+Kd \cdot DDAF \quad (1)$$

Note that, in the above formula (1), Kp is a preset proportional gain (proportional constant), Ki is a preset integral gain (integral constant), and Kd is a preset derivative gain (derivative constant). Further, DDAF is a time derivative value of the air-fuel ratio deviation DAF and is calculated by dividing the difference between the currently updated air-fuel ratio deviation DAF and the previously updated air-fuel ratio deviation DAF by the time corresponding to the updating interval. Further, SDAF is a time integral value of the air-fuel ratio deviation DAF. This time integral value DDAF is calculated by adding the previously updated time integral value DDAF and the currently updated air-fuel ratio deviation DAF (SDAF=DDAF+DAF).

<Flow Chart>

FIG. 11 is a flow chart which shows a control routine of processing for calculating an air-fuel ratio correction amount in the present embodiment. The illustrated control routine is performed by interruption at certain time intervals.

First, at step S11, it is judged if a condition for execution of average air-fuel ratio control stands. The condition for execution of average air-fuel ratio control will be explained later. When it is judged that the condition for execution of average air-fuel ratio control does not stand, the control routine is made to end. On the other hand, when it is judged that the condition for execution of average air-fuel ratio control stands, the routine proceeds to step S12. At step S12, it is judged if the rich flag Fr is "1". The rich flag Fr is a flag which is set to "1" when the average air-fuel ratio is controlled to the rich air-fuel ratio in average air-fuel ratio control and is set to "0" when controlled to the lean air-fuel ratio.

If, in average air-fuel ratio control, the average air-fuel ratio is controlled to the rich air-fuel ratio, at step S12, it is judged that the rich flag Fr is "1", then the routine proceeds to step S13. At step S13, it is judged if the output air-fuel ratio AFdwn of the downstream side air-fuel ratio sensor 41 becomes the rich judged air-fuel ratio AFrich or less. If the air-fuel ratio of the exhaust gas which flows out from the upstream side exhaust purification catalyst 20 has become substantially the stoichiometric air-fuel ratio, at step S13, it is judged that the output air-fuel ratio AFdwn of the downstream side air-fuel ratio sensor 41 is larger than the rich judged air-fuel ratio AFrich, then the routine proceeds to step S14. At step S14, the average air-fuel ratio correction amount AFCav is set to the rich set correction amount AFCrich. Due to this, the average air-fuel ratio is maintained at the rich air-fuel ratio.

Next, at step S25, it is judged if the condition for execution of inter-cylinder air-fuel ratio control (dither control) stands. The condition for execution of the inter-cylinder air-fuel ratio control will be explained later. If it is judged that the condition for execution of inter-cylinder air-fuel ratio control does not stand, the control routine is made to end. On the other hand, when it is judged that the condition for execution of inter-cylinder air-fuel ratio control stands, the routine proceeds to step S26. At step S26, the average air-fuel ratio correction amount AFCav minus the predetermined amount of change α is made the air-fuel ratio correction amount AFC(R) of the rich side cylinder. Next, at step S27, the average air-fuel ratio correction amount AFCav plus a predetermined amount of change α is made the air-fuel ratio correction amount AFC(L) of the lean side cylinder, then the control routine is made to end.

After that, if the air-fuel ratio of the exhaust gas which flows out from the upstream side exhaust purification catalyst 20 becomes the rich air-fuel ratio, at the next control routine, at step S13, it is judged that the output air-fuel ratio AFdwn of the downstream side air-fuel ratio sensor 41 becomes the rich judged air-fuel ratio AFrich or less, then the routine proceeds to step S15. At step S15, it is judged if the cylinder at which combustion is next performed is a lean cylinder. When a rich cylinder, step S16 is skipped. On the other hand, if, at step S15, it is judged that the cylinder at which combustion is next performed is a lean cylinder, the routine proceeds to step S16. At step S16, the rich side cylinders and lean side cylinders are switched. Therefore, a cylinder which had been deemed a rich side cylinder in the inter-cylinder air-fuel ratio control up to then is switched to a lean side cylinder. Next, at step S17, the average air-fuel ratio correction amount AFCav is set to the lean set correction amount AFClean. Next, at step S18, the rich flag Fr is set to "1", then the routine proceeds to step S25.

If the rich flag Fr is set to "1", at the next control routine, the routine proceeds from step S12 to step S19. At step S19, it is judged if the output air-fuel ratio AFdwn of the downstream side air-fuel ratio sensor 41 is the lean judged air-fuel ratio AFlean or more. If the air-fuel ratio of the exhaust gas which flows out from the upstream side exhaust purification catalyst 20 becomes substantially the stoichiometric air-fuel ratio, at step S19, it is judged that the output air-fuel ratio AFdwn of the downstream side air-fuel ratio sensor 41 is smaller than the lean judged air-fuel ratio AFlean, then the routine proceeds to step S20. At step S20, the average air-fuel ratio correction amount AFCav is set to the lean set correction amount AFClean. Due to this, the average air-fuel ratio is maintained at the lean air-fuel ratio, then the routine proceeds to step S25.

After that, if the air-fuel ratio of the exhaust gas which flows out from the upstream side exhaust purification catalyst 20 becomes the lean air-fuel ratio, at the next control routine, at step S19, it is judged that the output air-fuel ratio AFdwn of the downstream side air-fuel ratio sensor 41 is the lean judged air-fuel ratio AFlean or more, then the routine proceeds to step S21. At step S21, it is judged if the cylinder at which combustion is next performed is a rich cylinder. When a lean cylinder, step S22 is skipped. On the other hand, if, at step S21, it is judged that the cylinder at which combustion is next performed is a rich cylinder, the routine proceeds to step S22. At step S22, the rich side cylinders and the lean side cylinders are switched. Next, at step S23, the average air-fuel ratio correction amount AFCav is set to the rich set correction amount AFCrich. Next, at step S24, the rich flag Fr is reset to "0", then the routine proceeds to step S25.

<Timings of Execution of Average Air-Fuel Ratio Control and Inter-Cylinder Air-Fuel Ratio Control>

Figure 12:
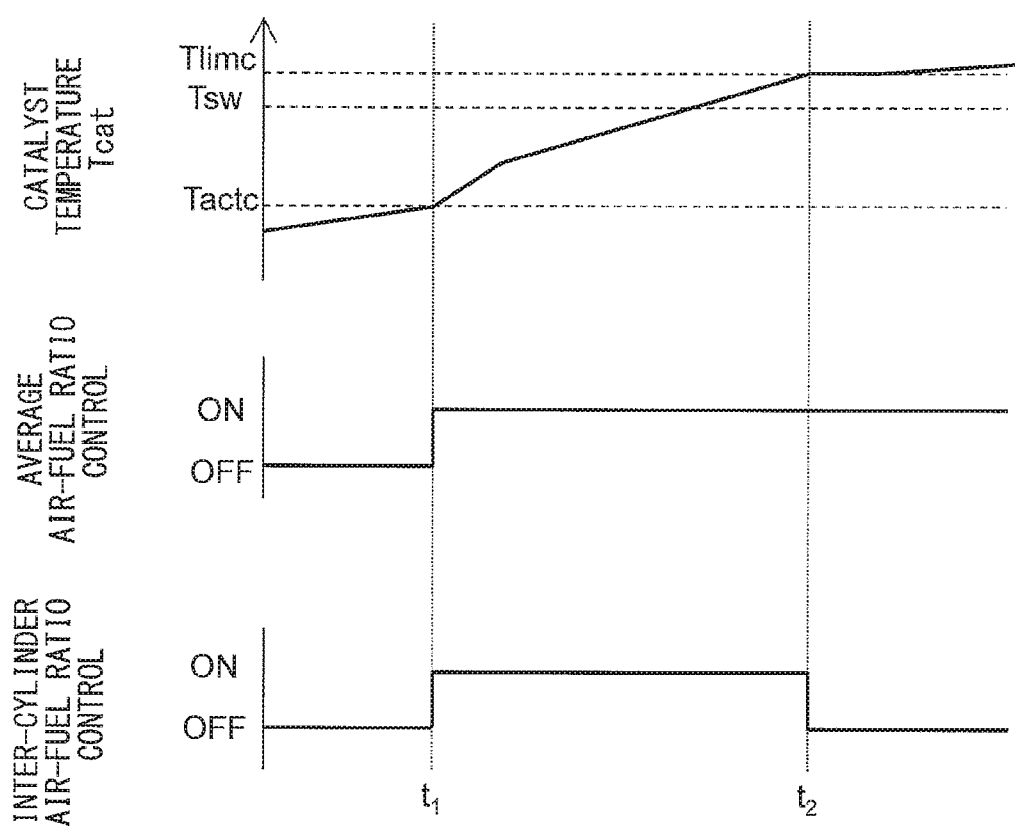
FIG. 12 is a time chart of a temperature of an upstream side exhaust purification catalyst etc.

Next, referring to FIG. 12, the relationship between the temperature of the upstream side exhaust purification catalyst 20 and the timings of execution of the average air-fuel ratio control and inter-cylinder air-fuel ratio control will be explained. FIG. 12 is a time chart of the temperature of the upstream side exhaust purification catalyst 20, the presence of average air-fuel ratio control, and the presence of inter-cylinder air-fuel ratio control.

As will be understood from FIG. 12, in the present embodiment, if the temperature of the upstream side exhaust purification catalyst 20 is less than the activation temperature (for example, 400° C. where removal rate becomes 50% or so) Tactc, the above-mentioned inter-cylinder air-fuel ratio control is executed. Instead, in this case, the combustion air-fuel ratios of the cylinders are controlled so that the combustion air-fuel ratios become equal at all cylinders. In addition, in the present embodiment, when the upstream side exhaust purification catalyst 20 is less than the activation temperature Tactc, the average air-fuel ratio control is not performed. Instead, in this case, the air-fuel ratio correction amounts AFC of all cylinders are maintained at zero. Accordingly, the combustion air-fuel ratios become substantially the stoichiometric air-fuel ratio at all cylinders.

Further, as will be understood from FIG. 12, in the present embodiment, if the temperature of the upstream side exhaust purification catalyst 20 is higher than an upper limit temperature (for example, 800° C.) Tlimc, inter-cylinder air-fuel ratio control is not performed. Instead, in this case, the combustion air-fuel ratios of the cylinders are controlled so that the combustion air-fuel ratios become equal at all cylinders. At this time, average air-fuel ratio control continues to be performed, therefore the combustion air-fuel ratios of the cylinders are controlled to match the target average air-fuel ratio. However, in the present embodiment, when the temperature of the upstream side exhaust purification catalyst 20 falls from a temperature higher than the upper limit temperature Tlimc, even if the temperature of the upstream side exhaust purification catalyst 20 becomes the upper limit temperature Tlimc or less, inter-cylinder air-fuel ratio control is not performed until the temperature reaches a switching temperature (for example, 750° C.) Tsw lower than the upper limit temperature Tlimc and higher than the activation temperature Tactc. In this case as well, instead, the combustion air-fuel ratios of the cylinders are controlled so that the combustion air-fuel ratios become equal at all cylinders. Further, when the temperature of the upstream side exhaust purification catalyst 20 becomes the switching temperature Tsw or less, inter-cylinder air-fuel ratio control is performed.

Next, the effect obtained by changing the states of execution of the average air-fuel ratio control and inter-cylinder air-fuel ratio control according to the temperature in this way will be explained. Here, if performing the above-mentioned average air-fuel ratio control or inter-cylinder air-fuel ratio control, unburned HC, CO, and $NO_X$ will flow into the upstream side exhaust purification catalyst 20. For this reason, if the upstream side exhaust purification catalyst 20 does not reach the activation temperature, there is a possibility that these unburned HC, CO, and $NO_X$ will end up flowing out without being removed at the upstream side exhaust purification catalyst 20. In the present embodiment, when the upstream side exhaust purification catalyst 20 is lower than the activation temperature, the average air-fuel ratio control and inter-cylinder air-fuel ratio control are not performed. For this reason, the concentration of unburned HC and CO in the exhaust gas which flows into the upstream side exhaust purification catalyst 20 falls and therefore it is possible to suppress the outflow of unburned HC, CO, etc. from the upstream side exhaust purification catalyst 20.

Further, if the temperature of the upstream side exhaust purification catalyst 20 becomes higher than the upper limit temperature, the higher the temperature becomes, the more the precious metal which is carried on the upstream side exhaust purification catalyst 20 sinters and therefore the more the catalytic activity ends up falling. On the other hand, if performing inter-cylinder air-fuel ratio control, unburned HC, CO, and oxygen flows into the upstream side exhaust purification catalyst 20, therefore in the upstream side exhaust purification catalyst 20, these unburned HC and CO burn and the temperature of the upstream side exhaust purification catalyst 20 rises. As opposed to this, in the present embodiment, if the temperature of the upstream side exhaust purification catalyst 20 becomes the upper limit temperature or more, performance of inter-cylinder air-fuel ratio control is stopped. Due to this, the temperature of the upstream side exhaust purification catalyst 20 is kept from rising even after reaching the upper limit temperature. Accordingly, sintering of the precious metal which is carried on the upstream side exhaust purification catalyst 20 can be suppressed. Note that, in the present embodiment, "upper limit temperature" means the temperature at which the catalytic activity ends up falling to a certain level or less due to a rise in the temperature of the upstream side exhaust purification catalyst 20.

<Combustion Air-Fuel Ratio Control at Start of Inter-Cylinder Air-Fuel Ratio Control>

Figure 13:
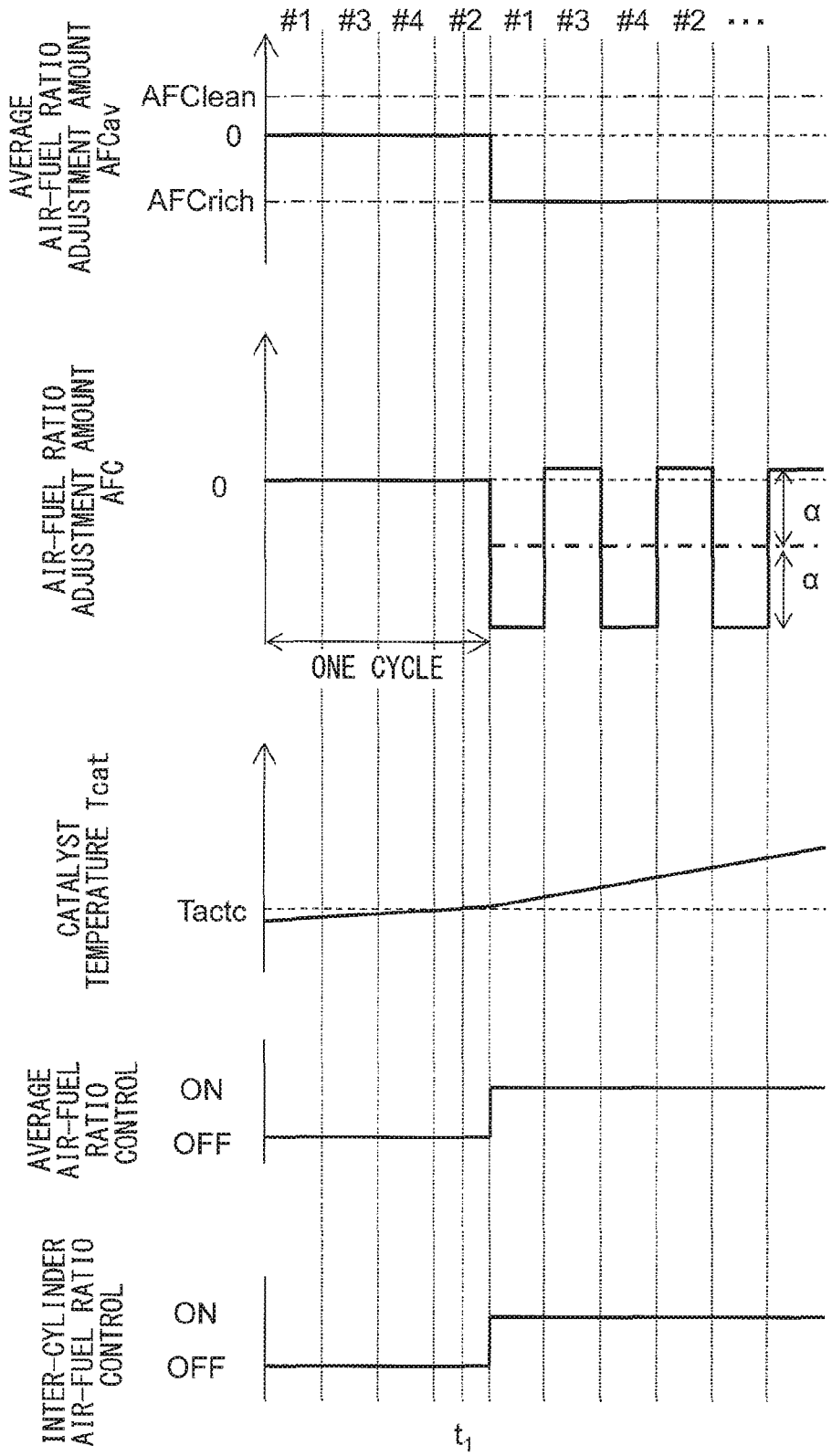
FIG. 13 is a time chart of an average air-fuel ratio correction amount etc.

Next, referring to FIG. 13 and FIG. 14, control of the combustion air-fuel ratios at the cylinders when starting inter-cylinder air-fuel ratio control will be explained. FIG. 13 is a time chart of the average air-fuel ratio correction amount, air-fuel ratio correction amount, catalyst temperature, presence of average air-fuel ratio control, and presence of inter-cylinder air-fuel ratio control. In particular, FIG. 13 shows the trends in the parameters when inter-cylinder air-fuel ratio control is started by the temperature of the upstream side exhaust purification catalyst 20 changing from less than the activation temperature to that temperature or or more.

In the example which is shown in FIG. 13, before the time $t_1$, the temperature of the upstream side exhaust purification catalyst 20 becomes less than the activation temperature Tactc. For this reason, before the time $t_1$, the average air-fuel ratio control and inter-cylinder air-fuel ratio control are not performed. As a result, in all cylinders, the air-fuel ratio correction amount AFC is made zero. Accordingly, in all cylinders, the combustion air-fuel ratio is made substantially the stoichiometric air-fuel ratio.

In the illustrated example, at the time $t_1$, the temperature of the upstream side exhaust purification catalyst 20 becomes the activation temperature Tactc or more. At this time, combustion is performed at the #2 cylinder, therefore what is next fed from fuel from a fuel injector 11 is the #1 cylinder. Therefore, average air-fuel ratio control is started from the #1 cylinder at which fuel is first fed. In the example which is shown in FIG. 13, the average air-fuel ratio correction amount AFCav is set to the rich set correction amount AFCrich. Note that, the average air-fuel ratio correction amount AFCav may also be set to the lean set correction amount AFClean when the average air-fuel ratio control is started.

In addition, in the example which is shown in FIG. 13, the inter-cylinder air-fuel ratio control is started from the #1 cylinder at which fuel is first fed from a fuel injector 11 at the time $t_1$ on. In particular, in the present embodiment, when inter-cylinder air-fuel ratio control is started, the cylinder at which fuel is first fed is basically made a rich side cylinder. That is, when starting inter-cylinder air-fuel ratio control, basically, the combustion air-fuel ratio is controlled so as to become richer than the average air-fuel ratio at the cylinder at which fuel is first fed after start. Therefore, in the example which is shown in FIG. 13, the air-fuel ratio correction amount AFC is made the average air-fuel ratio correction amount AFCav minus the amount of change α at the #1 cylinder at which fuel is first fed at the time $t_1$ on.

In this way, after the start of inter-cylinder air-fuel ratio control, in the cylinder at which fuel is first fed, the combustion air-fuel ratio is made rich, whereby at the start of inter-cylinder air-fuel ratio control, it is possible to make the oxygen which was stored at the oxygen storing substance separate from it. The oxygen and $SO_X$ are believed to be stored in a similar form in the oxygen storing substance, therefore by making oxygen separate from the oxygen storing substance, the oxygen storing substance can easily store the $SO_X$.

In this regard, during operation of the internal combustion engine, control is performed so that the air-fuel ratio of the exhaust gas which is discharged from the upstream side exhaust purification catalyst 20 becomes the rich air-fuel ratio (below, referred to as "richness increasing control"). As such control, for example, the following such control may be mentioned. As first control, post restart rich control which controls the air-fuel ratio of the exhaust gas which flows into the upstream side exhaust purification catalyst 20 to a rich air-fuel ratio after the end of fuel cut control which stops the feed of fuel from a fuel injector 11 temporarily during operation of the internal combustion engine may be mentioned. Such post restart rich control is performed so as to decrease the oxygen storage amounts of the exhaust purification catalysts 20 and 24 which had increased during the fuel cut operation. As second control, power boosting control which temporarily increases the amounts of fuel injection from the fuel injectors 11 when the engine load suddenly rises to the maximum load may be mentioned. As third control, overheat prevention control which prevents the temperature of the upstream side exhaust purification catalyst 20 from ending up excessively rising by increasing the amounts of fuel injection from the fuel injectors 11 and using the heat of vaporization to finally make the temperature of the exhaust gas fall may be mentioned.

During execution of such richness increasing control, basically, the average air-fuel ratio control and inter-cylinder air-fuel ratio control are made to stop. Further, if the richness increasing control ends, these average air-fuel ratio control and inter-cylinder air-fuel ratio control are resumed. In this case, since richness increasing control is performed, at the time of resumption of the average air-fuel ratio control and inter-cylinder air-fuel ratio control, the oxygen storage amount OSA of the upstream side exhaust purification catalyst 20 is made substantially zero. For this reason, at the time of resumption of these control, if, as explained above, making the cylinder first fed with fuel a rich side cylinder, the unburned HC and CO in the exhaust gas which is discharged from this cylinder end up being unable to be removed at the upstream side exhaust purification catalyst 20.

Therefore, in the present embodiment, even if starting the inter-cylinder air-fuel ratio control, if having performed richness increasing control right before starting inter-cylinder air-fuel ratio control, the combustion air-fuel ratio is controlled so as to become leaner than the average air-fuel ratio in the cylinder at which fuel is first fed after the start. This state is shown in FIG. 14. FIG. 14 is a view, similar to FIG. 13, which shows the trends in the different parameters when inter-cylinder air-fuel ratio control is started by the richness increasing control ending.

Figure 14:
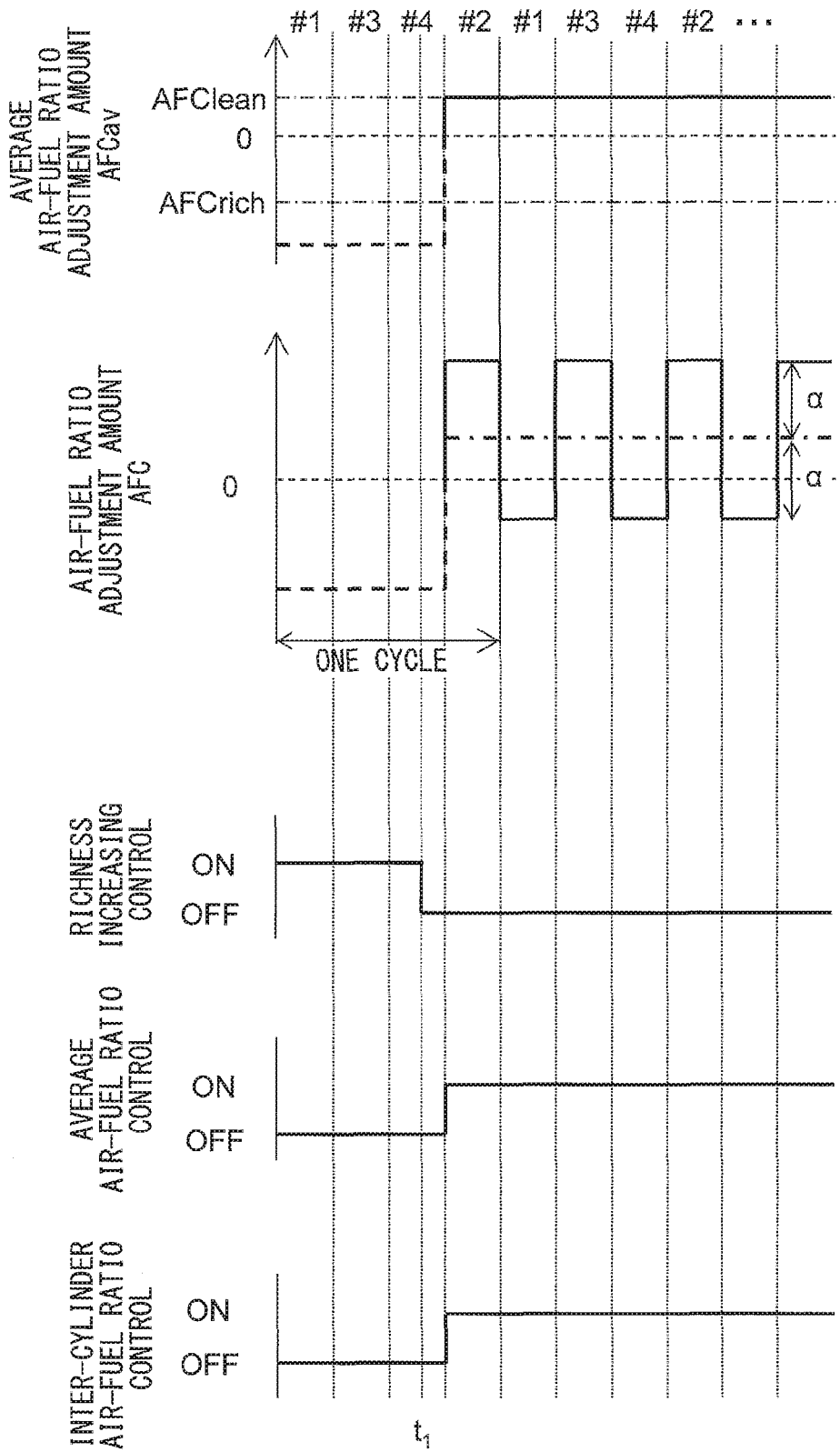
FIG. 14 is a time chart of an average air-fuel ratio correction amount etc.

In the example which is shown in FIG. 14, at the time $t_1$, the richness increasing control is made to end. Before the time $t_1$, the inter-cylinder air-fuel ratio control and average air-fuel ratio control are not performed, but richness increasing control causes the combustion air-fuel ratios to become constant rich air-fuel ratios in all of the cylinders (in FIG. 14, the air-fuel ratio correction amount which corresponds to the combustion air-fuel ratio at this time is shown by the broken line).

At the time $t_1$, combustion is performed at the #4 cylinder, therefore fuel is next fed from a fuel injector 11 to the #2 cylinder. In the present embodiment, average air-fuel ratio control is started from the #2 cylinder where fuel is next fed, therefore the average air-fuel ratio correction amount AFCav is set to the lean set correction amount AFClean.

In addition, in the example which is shown in FIG. 14, inter-cylinder air-fuel ratio control is started from the #2 cylinder at which fuel is first fed from a fuel injector 11 at the time $t_1$ on. In addition, if richness increasing control had been performed right before the start of inter-cylinder air-fuel ratio control, when starting inter-cylinder air-fuel ratio control, the cylinder at which fuel is first fed is made a lean side cylinder. That is, when starting inter-cylinder air-fuel ratio control after rich control, the combustion air-fuel ratio is controlled so as to become leaner than the average air-fuel ratio at the cylinder at which fuel is first fed after start. Therefore, in the example which is shown in FIG. 14, the air-fuel ratio correction amount AFC is made the average air-fuel ratio correction amount AFCav plus the amount of change α at the #2 cylinder at which fuel is first fed at the time $t_1$ on.

<Flow Chart>

Figure 15:
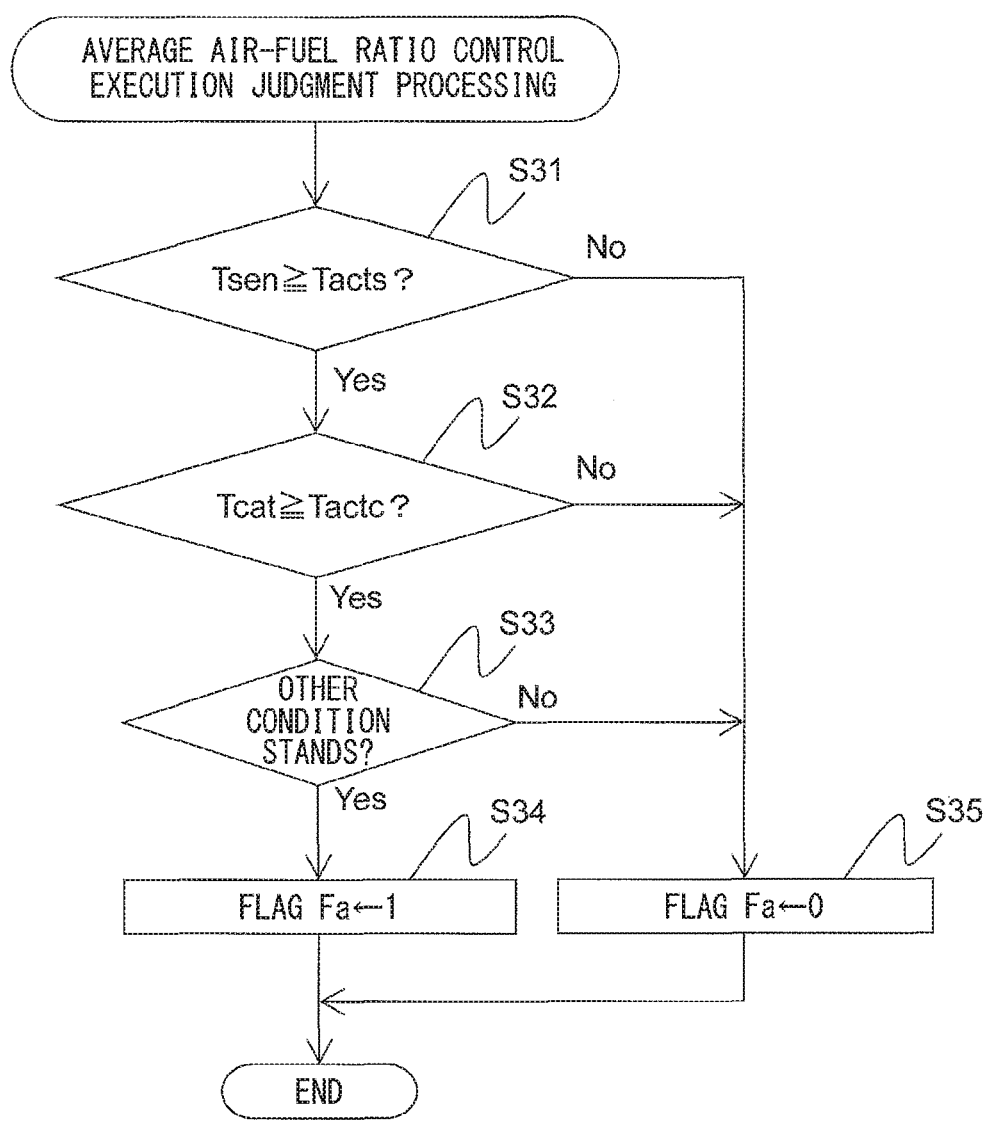
FIG. 15 is a flow chart which shows a control routine of processing for judgment of execution of average air-fuel ratio control.

FIG. 15 is a flow chart which shows the control routine of processing for judgment of whether the condition for execution of average air-fuel ratio control stands. The illustrated control routine is performed by interruption at certain time intervals.

First, at step S31, it is judged if the temperature Tsen of the air-fuel ratio sensors 40 and 41 is the activation temperature Tacts or more. The temperature of the air-fuel ratio sensors 40 and 41 is obtained by detecting the impedance and using the detected impedance as the basis for calculation. Further, at step S32, it is judged if the temperature Tcat of the upstream side exhaust purification catalyst 20 is the activation temperature Tactc or more. The temperature of the upstream side exhaust purification catalyst 20 is detected by the temperature sensor 46 or is calculated based on other parameters. In addition, at step S33, it is judged if another condition for execution other than temperature stands. As another condition for execution, for example, not being during richness increasing control etc. may be mentioned.

Further, when, at steps S31 to S33, it is judged that the temperature Tsen of the air-fuel ratio sensors 40 and 41 is the activation temperature Tactc or more, the temperature Tcat of the upstream side exhaust purification catalyst 20 is the activation temperature Tactc or more, and other conditions for execution also stand, the routine proceeds to step S34. At step S34, the average air-fuel ratio control execution flag Fa is set to "1". The average air-fuel ratio control execution flag Fa is a flag which is set to "1" when the condition for execution of the average air-fuel ratio control stands and is set to "0" when it does not stand. When, at step S34, the average air-fuel ratio control execution flag Fa is set to "1", at step S11 of FIG. 11, it is judged if the condition for execution of the average air-fuel ratio control stands.

On the other hand, when it is judged that at least one of the judgments of steps S31 to S33 does not stand, the routine proceeds to step S35. At step S35, the average air-fuel ratio control execution flag Fa is reset to "0", then the control routine is made to end.

Figure 16:
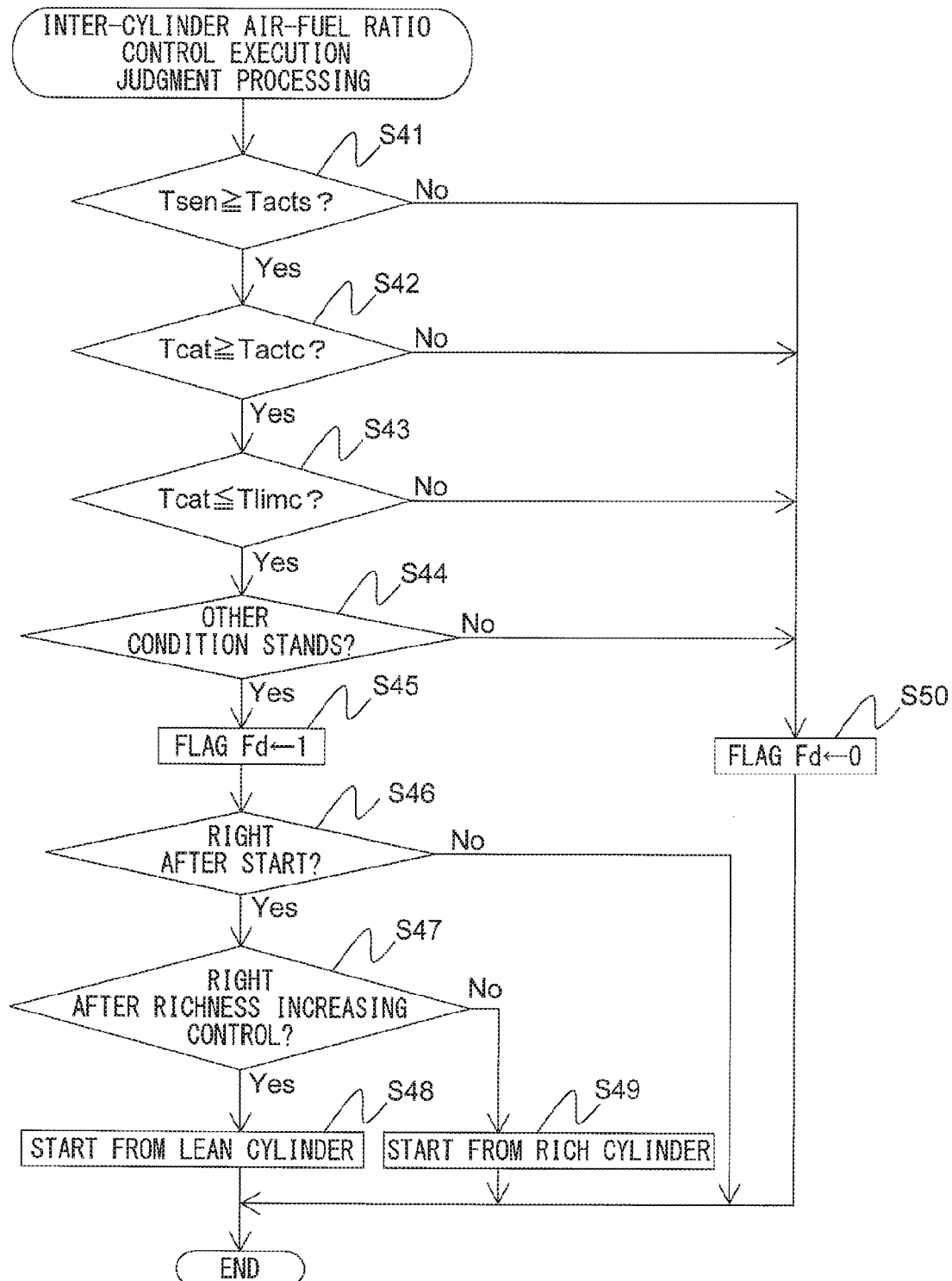
FIG. 16 is a flow chart which shows a control routine of processing for judgment of execution of inter-cylinder air-fuel ratio control.

FIG. 16 is a flow chart which shows a control routine of processing for judgment if the condition for execution of inter-cylinder air-fuel ratio control stands. The illustrated control routine is performed by interruption at certain time intervals.

Steps S41, S42, and S44 are similar to steps S31 to S33 of FIG. 15, therefore explanations will be omitted. In the present control routine, at steps S41, S42, and S44 and at step S43, it is judged if the temperature Tcat of the upstream side exhaust purification catalyst 20 is the upper limit temperature Tlimc or less. Further, if, at step S43, the temperature Tcat of the upstream side exhaust purification catalyst 20 is higher than the upper limit temperature Tlimc, the routine proceeds to step S50. At step S50, the inter-cylinder air-fuel ratio control execution flag Fd is reset to "0", then the control routine is made to end. The inter-cylinder air-fuel ratio control execution flag Fd is a flag which is set to "1" when the condition for execution of the inter-cylinder air-fuel ratio control stands and is set to "0" when it does not stand.

On the other hand, when at step S43 it is judged that the temperature of the upstream side exhaust purification catalyst 20 is the upper limit temperature Tlimc or less, the routine proceeds to step S45 if the judgments at steps S41, S42, and S44 all stand. At step S45, the inter-cylinder air-fuel ratio control execution flag Fd is set to "1". Next, at step S46, it is judged if the time is right after inter-cylinder air-fuel ratio control has started. That is, it is judged if the time is before the initial fuel injection is started from when the condition for execution of inter-cylinder air-fuel ratio control stands. When it is judged that the time is not right after inter-cylinder air-fuel ratio control has been started, the control routine is made to end. On the other hand, when at step S46 it is judged that the time is right after inter-cylinder air-fuel ratio control has started, the routine proceeds to step S47.

At step S47, it is judged if increased richness control had been performed until right before the start of inter-cylinder air-fuel ratio control. If at step S47 it is judged that increased richness control had been performed, the routine proceeds to step S48. At step S48, control is performed so that the inter-cylinder air-fuel ratio control starts from the lean side cylinder, then the control routine is made to end. On the other hand, if at step S47 it is judged that increased richness control has not been performed, the routine proceeds to step S49. At step S49, control is performed so that the inter-cylinder air-fuel ratio control starts from the rich side cylinder, then the control routine is made to end.

Modification of First Embodiment

Next, referring to FIG. 17 and FIG. 18, a modification of the exhaust purification system of the first embodiment of the present invention will be explained. In the inter-cylinder air-fuel ratio control of the above-mentioned first embodiment, both when the average air-fuel ratio correction amount AFCav is set to the rich set correction amount AFCrich and when it is set to the lean set correction amount AFClean, the combustion air-fuel ratio is made to change between cylinders.

However, if the combustion air-fuel ratio is made to change between cylinders when the average air-fuel ratio correction amount AFCav is set to the rich set correction amount AFCrich, the air-fuel ratio correction amount AFC of the rich side cylinder becomes the rich set correction amount AFCrich minus the amount of change α. For this reason, the combustion air-fuel ratio at the rich side cylinder becomes a rich air-fuel ratio of a large rich degree. If the rich degree becomes higher in this way, as explained above, even if $SO_X$ has been firmly stored in the oxygen storing substance, separation of SOx is invited and the sulfur content ends up moving to the precious metal surface.

Figure 17:
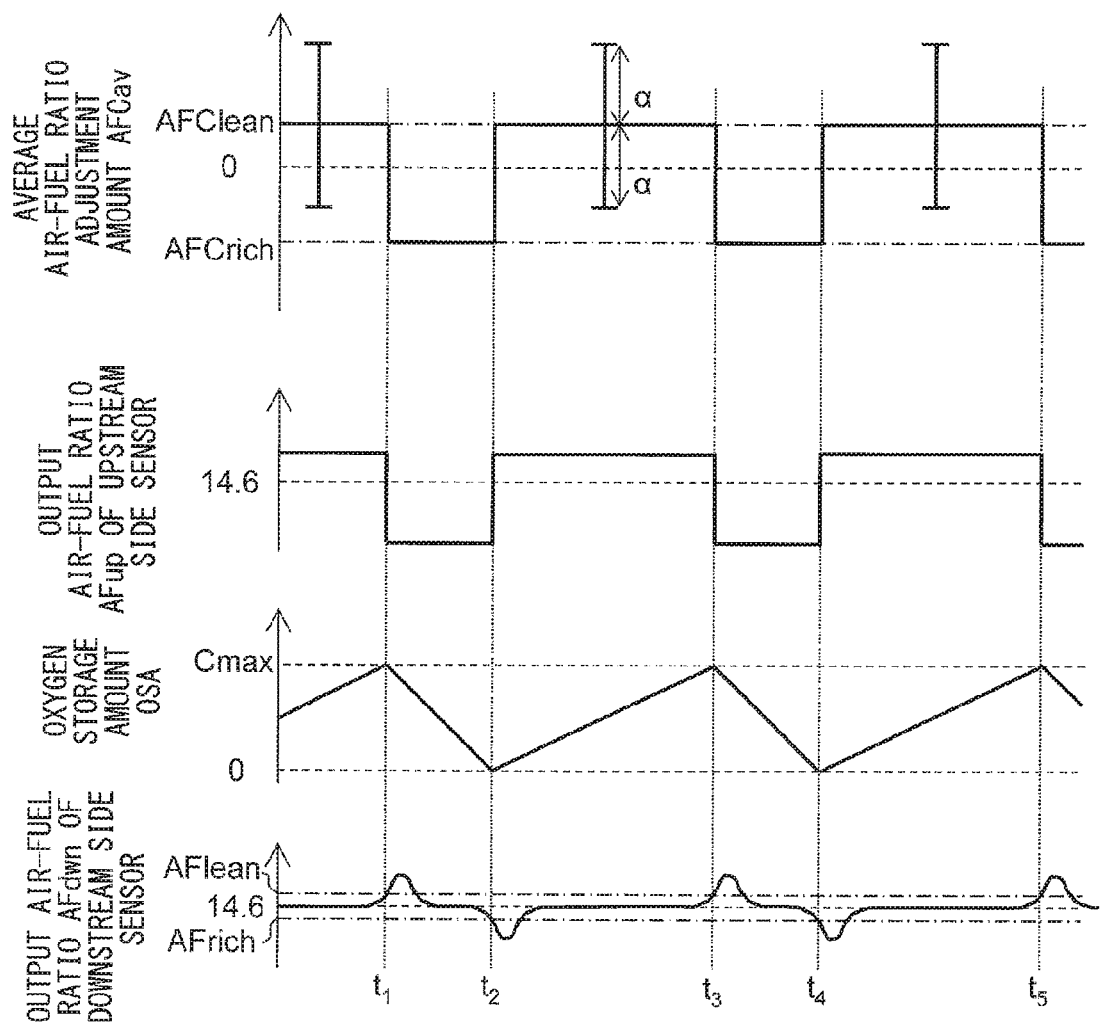
FIG. 17 is a time chart of an average air-fuel ratio correction amount etc.

Therefore, in this modification, as shown in FIG. 17, inter-cylinder air-fuel ratio control is performed when the average air-fuel ratio is made the lean air-fuel ratio. In addition, when the average air-fuel ratio is made the rich air-fuel ratio, inter-cylinder air-fuel ratio control is not performed and the combustion air-fuel ratios of the cylinders are controlled so that the combustion air-fuel ratios become rich air-fuel ratios at all cylinders. Due to this, even when the average air-fuel ratio is made the rich air-fuel ratio, the combustion air-fuel ratios of the cylinders are kept from becoming rich with a large rich degree and accordingly movement of sulfur content from the oxygen storing substance to the precious metal surface can be suppressed.

Figure 18:
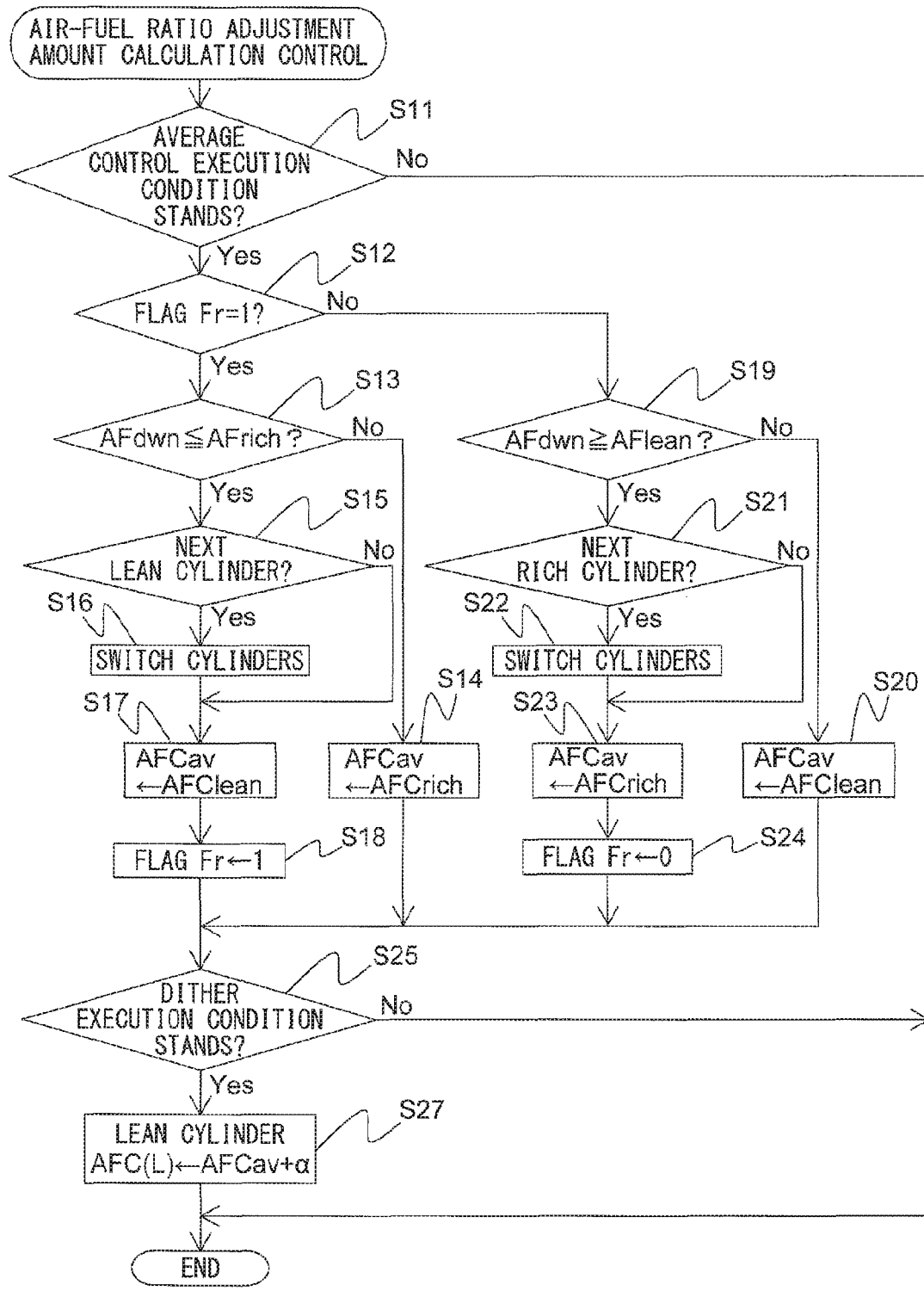
FIG. 18 is a flow chart which shows a control routine of processing for calculating an air-fuel ratio correction amount according to a modification of the first embodiment.

FIG. 18 is a flow chart which shows a control routine of processing for calculating an air-fuel ratio correction amount in the present modification. The control routine which is shown in FIG. 18 is similar to the control routine which is shown in FIG. 11 except for the point of the deletion of step S26 of FIG. 11.

Second Embodiment

Next, referring to FIG. 19 to FIG. 21, an exhaust purification system of a second embodiment of the present invention will be explained. The configuration and control of the exhaust purification system according to the second embodiment are, except for the points which are explained below, basically similar to the configuration and control of the exhaust purification system according to the first embodiment.

In the average air-fuel ratio control of the present embodiment, first, if, in the state where the target average air-fuel ratio is set to the rich set air-fuel ratio, it is judged that the output air-fuel ratio of the downstream side air-fuel ratio sensor 41 has become the rich air-fuel ratio, the target average air-fuel ratio is switched to the lean set air-fuel ratio. Due to this, the average air-fuel ratio changes to the lean air-fuel ratio.

If the target average air-fuel ratio is switched to the lean set air-fuel ratio, the oxygen excess/deficiency of the exhaust gas which flows into the upstream side exhaust purification catalyst 20 is cumulatively added. The "oxygen excess/deficiency" means the amount of oxygen which becomes in excess or the amount of oxygen which becomes deficient when trying to make the air-fuel ratio of the exhaust gas which flows into the upstream side exhaust purification catalyst 20 the stoichiometric air-fuel ratio (amount of excess unburned gas etc.) In particular, when the target average air-fuel ratio becomes the lean set air-fuel ratio, the oxygen in the exhaust gas which flows into the upstream side exhaust purification catalyst 20 becomes excessive. This excess oxygen is stored in the upstream side exhaust purification catalyst 20. Therefore, it can be said that the cumulative amount of the oxygen excess/deficiency (below, referred to as the "cumulative oxygen excess/deficiency") expresses the oxygen storage amount OSA of the upstream side exhaust purification catalyst 20.

Note that, the oxygen excess/deficiency is calculated based on the output air-fuel ratio of the upstream side air-fuel ratio sensor 40 and the flow rate of the exhaust gas which flows through the upstream side exhaust purification catalyst 20 or the fuel feed amount from the fuel injector 11 etc. Specifically, the oxygen excess/deficiency OED in the exhaust gas which flows into the upstream side exhaust purification catalyst 20 is, for example, calculated from the following formula (2):

$$OED = 0.23 \times Qi \times (AFup - AFR) \quad (2)$$

Here, 0.23 is the concentration of oxygen in the air, Qi is the fuel injection amount, AFup is the output air-fuel ratio of the upstream side air-fuel ratio sensor 40, and AFR is the air-fuel ratio becoming the control center (in the present embodiment, stoichiometric air-fuel ratio).

If the cumulative oxygen excess/deficiency which is obtained by cumulatively adding the thus calculated oxygen excess/deficiency becomes a predetermined switching reference value (corresponding to predetermined switching reference storage amount Cref) or more, the target average air-fuel ratio which had been set to the lean set air-fuel ratio up to then is switched to the rich set air-fuel ratio. That is, when the oxygen storage amount OSA of the upstream side exhaust purification catalyst 20 from which starting to control the average air-fuel ratio to the lean air-fuel ratio reaches a predetermined switching reference storage amount Cref, the average air-fuel ratio is switched to the rich air-fuel ratio.

After that, when the output air-fuel ratio of the downstream side air-fuel ratio sensor 41 again becomes the rich judged air-fuel ratio or less, the target average air-fuel ratio is again made the lean set air-fuel ratio then after that a similar procedure is repeated. In this way, in the present embodiment as well, the target average air-fuel ratio of the exhaust gas which flows into the upstream side exhaust purification catalyst 20 is alternately set to the lean set air-fuel ratio and the rich set air-fuel ratio.

Figure 19:
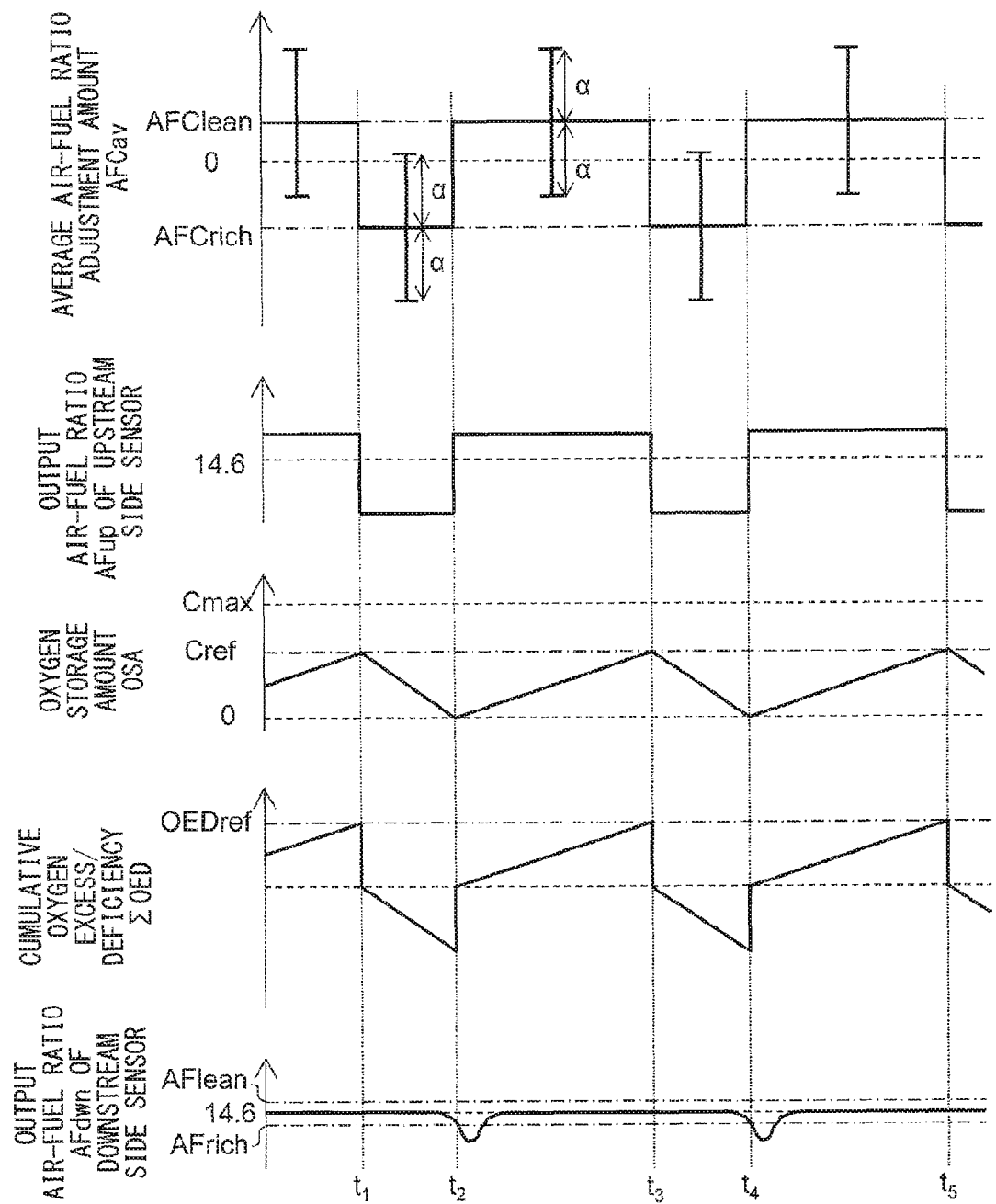
FIG. 19 is a time chart of an average air-fuel ratio correction amount etc.

Referring to FIG. 19, the average air-fuel ratio control of the present embodiment will be specifically explained. FIG. 19 is a time chart, similar to FIG. 4, of the average air-fuel ratio correction amount AFCav etc. In the example which is shown in FIG. 19, at the times $t_1$ to $t_2$, the average air-fuel ratio correction amount AFCav is set to the rich set correction amount AFCrich. That is, the target average air-fuel ratio is made a rich air-fuel ratio. Along with this, the output air-fuel ratio AFup of the upstream side air-fuel ratio sensor 40 becomes a rich air-fuel ratio. The unburned HC and CO which are contained in the exhaust gas which flows into the upstream side exhaust purification catalyst 20 are removed by the upstream side exhaust purification catalyst 20. Along with this, the oxygen storage amount OSA of the upstream side exhaust purification catalyst 20 is gradually decreased. On the other hand, due to the action of removal of unburned HC and CO in the upstream side exhaust purification catalyst 20, the output air-fuel ratio AFdwn of the downstream side air-fuel ratio sensor 41 becomes the substantially stoichiometric air-fuel ratio.

After that, if the oxygen storage amount OSA of the upstream side exhaust purification catalyst 20 decreases and approaches zero, part of the unburned HC and CO which flow into the upstream side exhaust purification catalyst 20 starts to flow out from the upstream side exhaust purification catalyst 20. For this reason, in the illustrated example, at the time $t_2$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the lean set correction amount AFClean. Therefore, the target average air-fuel ratio is switched to the lean air-fuel ratio. At this time, the cumulative oxygen excess/deficiency ΣCOED is reset to zero.

At the time $t_2$, if the average air-fuel ratio correction amount AFCav is switched to the lean set correction amount AFClean, the air-fuel ratio of the exhaust gas which flows into the upstream side exhaust purification catalyst 20 changes from the rich air-fuel ratio to the lean air-fuel ratio. Further, along with this, the output air-fuel ratio AFup of the upstream side air-fuel ratio sensor 40 becomes the lean air-fuel ratio. In addition, at the time $t_2$ on, the oxygen storage amount OSA of the upstream side exhaust purification catalyst 20 gradually increases and further the cumulative oxygen excess/deficiency ΣOED also gradually increases. Further, the output air-fuel ratio AFdwn of the downstream side air-fuel ratio sensor 41 converges to the stoichiometric air-fuel ratio.

After that, if the oxygen storage amount OSA of the upstream side exhaust purification catalyst 20 increases, at the time $t_3$, the oxygen storage amount OSA of the upstream side exhaust purification catalyst 20 reaches the switching reference storage amount Cref. At this time, the cumulative oxygen excess/deficiency ΣOED reaches a switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is stopped by the average air-fuel ratio correction amount AFCav being switched to the rich set correction amount AFCrich. Therefore, the target average air-fuel ratio is made the rich air-fuel ratio. Further, at this time, the cumulative oxygen excess/deficiency ΣOED is reset to zero. After that, in average air-fuel ratio control, the control of the times $t_1$ to $t_3$ is repeated.

Note that, the switching reference storage amount Cref is set sufficiently lower than the maximum storable oxygen amount Cmax when the upstream side exhaust purification catalyst 20 is unused. For this reason, even if the actual air-fuel ratio of the exhaust gas unintentionally greatly deviates from the target average air-fuel ratio for an instant, the oxygen storage amount OSA will not reach the maximum storable oxygen amount Cmax. Conversely speaking, the switching reference storage amount Cref is made a sufficiently small amount so that even if the above-mentioned such unintended deviation of the air-fuel ratio occurs, the oxygen storage amount OSA will not reach the maximum storable oxygen amount Cmax. For example, the switching reference storage amount Cref is made ¾ or less of the maximum storable oxygen amount Cmax of when the upstream side exhaust purification catalyst 20 is unused, preferably ½ or less, more preferably ⅕ or less.

According to the present embodiment, before oxygen or $NO_X$ flows out from the upstream side exhaust purification catalyst 20, the target average air-fuel ratio is switched from the lean air-fuel ratio to the rich air-fuel ratio. For this reason, it is possible to constantly suppress the amount of discharge of $NO_X$ from the upstream side exhaust purification catalyst 20. That is, so long as performing the above-mentioned control, basically the amount of discharge of $NO_X$ from the upstream side exhaust purification catalyst 20 can be made substantially zero. Further, the cumulative time when calculating the cumulative oxygen excess/deficiency ΣOED is short, therefore compared with when cumulatively adding it over a long period of time, there is greater resistance to calculation error. For this reason, error in calculation of the cumulative oxygen excess/deficiency ΣOED can be kept from causing $NO_X$ to end up being discharged.

Note that, in the present embodiment, even in the time period when the average air-fuel ratio correction amount AFCav is set to the rich set correction amount AFCrich (for example, times $t_1$ to $t_2$) and even in the time period in which it is set to the lean set correction amount AFClean (for example, times $t_2$ to $t_3$), inter-cylinder air-fuel ratio control is performed. In particular, in the example which is shown in FIG. 19, at the rich side cylinder, the air-fuel ratio correction amount AFC is set to an average air-fuel ratio correction amount AFCav minus the amount of change α. On the other hand, at the lean side cylinder, the air-fuel ratio correction amount AFC is set to the average air-fuel ratio correction amount AFCav plus the amount of change α. However, in the same way as the modification of the above-mentioned first embodiment, it is also possible to not perform the inter-cylinder air-fuel ratio control in the time period during which the average air-fuel ratio correction amount AFCav is set to the rich set correction amount.
<Specific Explanation and Flow Chart of Control>

Figure 20:
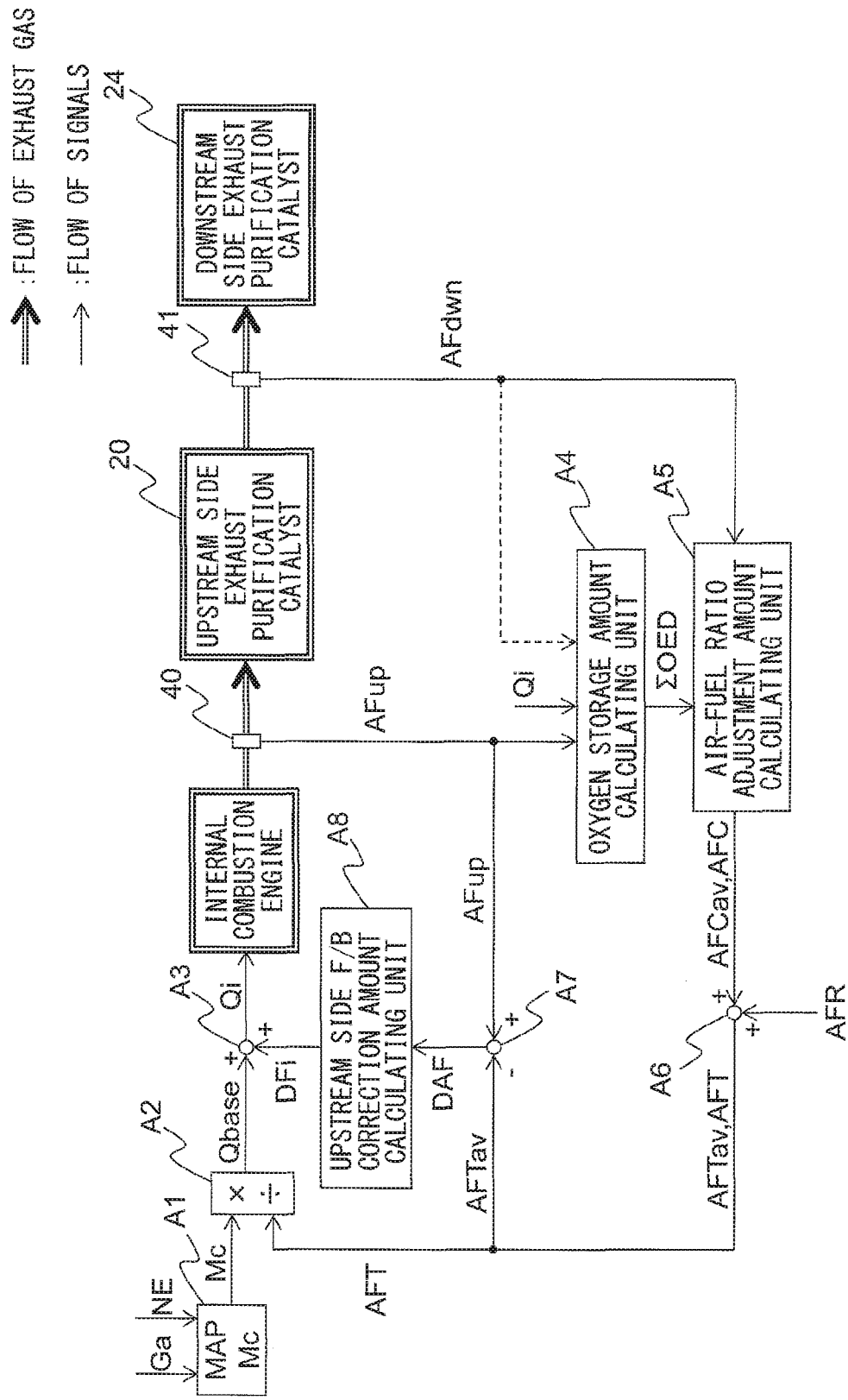
FIG. 20 is a functional block diagram of a control device.

Next, referring to FIG. 20, a control device of an exhaust purification system in the above embodiment will be specifically explained. FIG. 20 is a functional block diagram similar to FIG. 10. It comprises the functional block diagram which is shown in FIG. 10 plus the oxygen excess/deficiency calculating unit A4.

The oxygen excess/deficiency calculating unit A4 uses the fuel injection amount Qi which was calculated by the fuel injection amount calculating unit A3 and the output air-fuel ratio AFup of the upstream side air-fuel ratio sensor 40 as the basis to calculate the cumulative oxygen excess/deficiency ΣOED. The oxygen excess/deficiency calculating unit A4, for example, uses the above formula (2) to multiply the difference between the output air-fuel ratio of the upstream side air-fuel ratio sensor 40 and the control center air-fuel ratio with the fuel injection amount Qi and cumulatively adds the found values to calculate the cumulative oxygen excess/deficiency ΣOED. Further, in the present embodiment, the air-fuel ratio correction amount calculating unit A5 uses the output air-fuel ratio AFdwn of the downstream side air-fuel ratio sensor 41 plus the cumulative oxygen excess/deficiency ΣOED which is calculated by the oxygen excess/deficiency calculating unit A4 as the basis to calculate the average air-fuel ratio correction amount AFCav and the air-fuel ratio correction amounts AFC of the cylinders.

Figure 21:
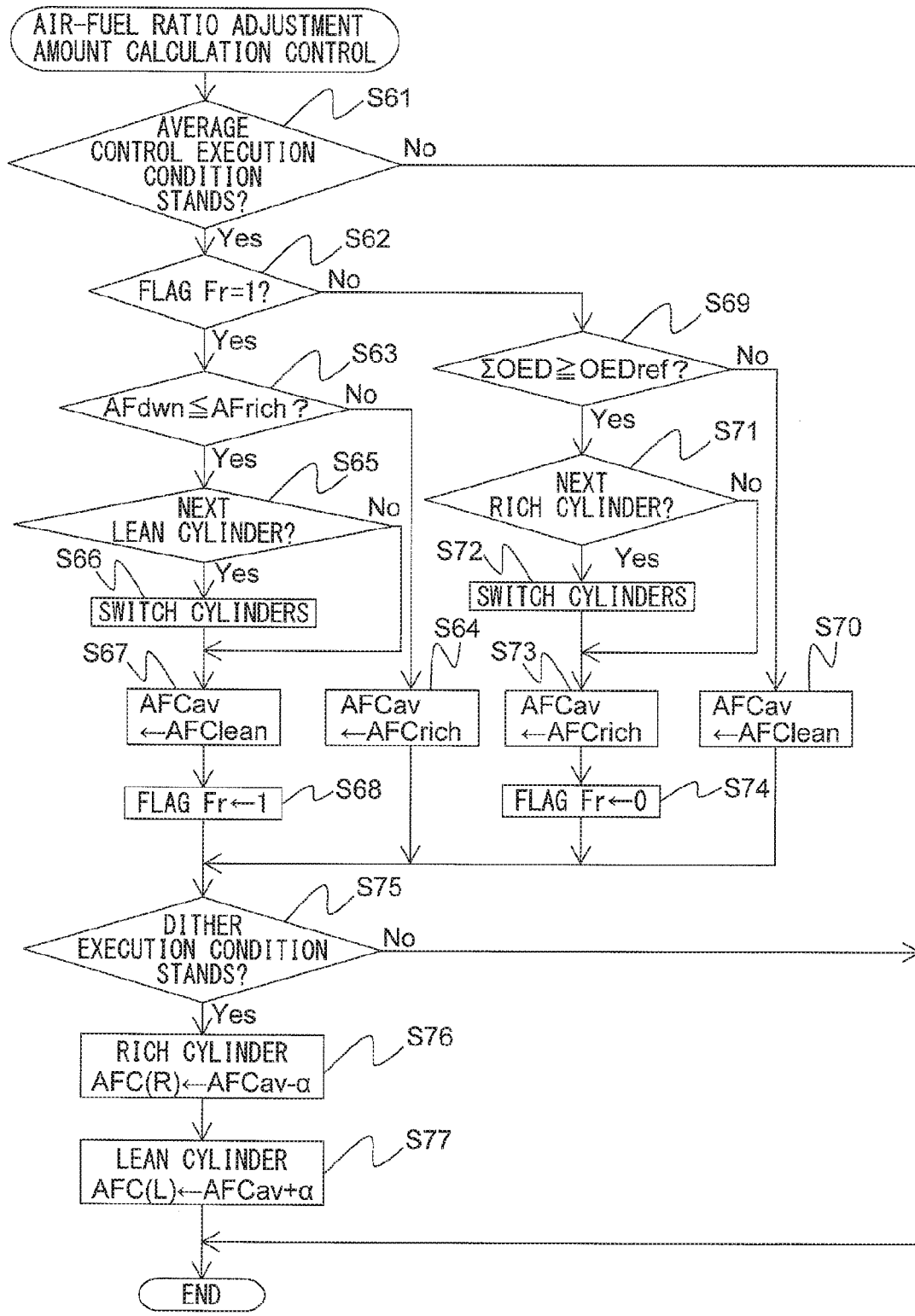
FIG. 21 is a flow chart which shows a control routine of processing for calculating an air-fuel ratio correction amount in a second embodiment.

FIG. 21 is a flow chart which shows a control routine of processing for calculating an air-fuel ratio correction amount in a second embodiment. The illustrated control routine is performed by interruption at certain time intervals. Steps S61 to S68 and steps S70 to S77 of FIG. 21 are similar to steps S11 to S18 and steps S20 to S27 of FIG. 11, therefore explanations will be omitted.

In the control routine which is shown in FIG. 21, when it is judged at step S62 that the rich flag Fr is not "1", the routine proceeds to step S69. At step S69, it is judged if the cumulative oxygen excess/deficiency ΣOED from when the average air-fuel ratio correction amount AFCav is switched is the switching reference value OEDref or more. If the cumulative oxygen excess/deficiency ΣOED is smaller than the switching reference value OEDref, the routine proceeds to step S70. On the other hand, if it is judged that the cumulative oxygen excess/deficiency ΣOED is the switching reference value OEDref or more, the routine proceeds to step S71.

Third Embodiment

Next, referring to FIG. 22 to FIG. 23, an exhaust purification system of a third embodiment of the present invention will be explained. The configuration and control of the exhaust purification system according to the third embodiment are, except for the points which are explained below, basically similar to the configuration and control of the exhaust purification systems according to the first embodiment or second embodiment.

In the present embodiment, at average air-fuel ratio control, at least when the output air-fuel ratio AFdwn of the downstream side air-fuel ratio sensor 41 becomes the rich judged air-fuel ratio AFrich or less, the average air-fuel ratio is controlled to a lean air-fuel ratio with a larger lean degree compared to when the output air-fuel ratio is larger than the rich judged air-fuel ratio AFrich. That is, in the present embodiment, when the output air-fuel ratio AFdwn of the downstream side air-fuel ratio sensor 41 becomes the rich judged air-fuel ratio AFrich or less, the average air-fuel ratio correction amount AFCav is set to a strong rich set correction amount AFCsrich smaller than the rich set correction amount AFCrich. In addition, in the present embodiment, if the output air-fuel ratio AFdwn of the downstream side air-fuel ratio sensor 41 becomes the rich judged air-fuel ratio AFrich or less, the above-mentioned inter-cylinder air-fuel ratio control is not performed and the combustion air-fuel ratios of the cylinders are controlled so that the combustion air-fuel ratios become equal at all of the cylinders.

Further, in the present embodiment, in average air-fuel ratio control, at least when the output air-fuel ratio AFdwn of the downstream side air-fuel ratio sensor 41 is the lean judged air-fuel ratio AFlean or more, the average air-fuel ratio is controlled to a rich air-fuel ratio with a larger rich degree compared with when the output air-fuel ratio is smaller than the lean judged air-fuel ratio AFlean. That is, in the present embodiment, when the output air-fuel ratio AFdwn of the downstream side air-fuel ratio sensor 41 is the lean judged air-fuel ratio AFlean or more, the average air-fuel ratio correction amount AFCav is set to a strong lean set correction amount AFCslean larger than the lean set correction amount AFlean. In addition, in the present embodiment, when the output air-fuel ratio AFdwn of the downstream side air-fuel ratio sensor 41 is the lean judged air-fuel ratio AFlean or more, the above-mentioned inter-cylinder air-fuel ratio control is not performed and the combustion air-fuel ratios of the cylinders are controlled so that the combustion air-fuel ratios become equal at all of the cylinders.

Figure 22:
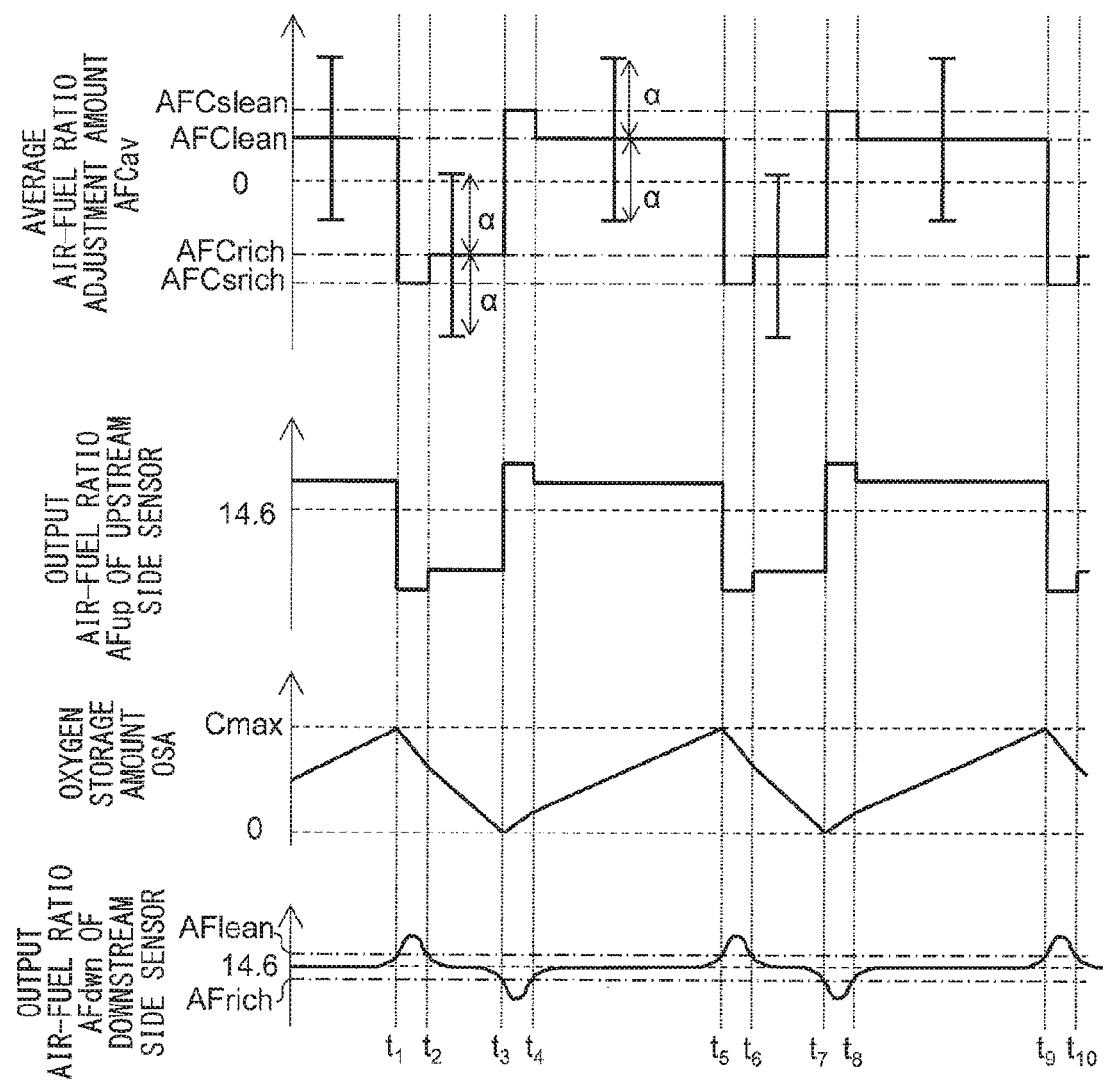
FIG. 22 is a time chart of an average air-fuel ratio correction amount etc.

Referring to FIG. 22, average air-fuel ratio control and inter-cylinder air-fuel ratio control of the present embodiment will be specifically explained. FIG. 22 is a time chart similar to FIG. 4 of the average air-fuel ratio correction amount AFCav etc. In the example which is shown in FIG. 22, before the time $t_1$, control similar to that before the time $t_1$ of FIG. 4 is performed.

If, at the time $t_1$, the output air-fuel ratio AFdwn of the downstream side air-fuel ratio sensor 41 becomes the lean judged air-fuel ratio AFlean or more, the oxygen storage amount OSA is made to decrease by the average air-fuel ratio correction amount AFCav being switched to the strong rich set correction amount AFCsrich. Therefore, the target average air-fuel ratio is switched to the rich air-fuel ratio. At this time, inter-cylinder air-fuel ratio control is not performed. For this reason, the combustion air-fuel ratios of the cylinders basically match the target average air-fuel ratio.

If, at the time $t_1$, the target average air-fuel ratio is switched to the rich air-fuel ratio, the output air-fuel ratio AFdwn of the downstream side air-fuel ratio sensor 41 gradually falls toward the stoichiometric air-fuel ratio and, at the time $t_2$, becomes smaller than the lean judged air-fuel ratio AFlean. In the present embodiment, if, at the time $t_2$, the output air-fuel ratio AFdwn becomes smaller than the lean judged air-fuel ratio AFlean, the average air-fuel ratio correction amount AFCav is switched to a rich set correction amount AFCrich with a smaller rich degree than the strong rich set correction amount AFCsrich. Therefore, the rich degree of the target average air-fuel ratio falls. In addition, in the present embodiment, at the time $t_2$ on, the inter-cylinder air-fuel ratio control is performed.

After that, if the target average air-fuel ratio is maintained at the rich air-fuel ratio, the oxygen storage amount OSA of the upstream side exhaust purification catalyst 20 gradually decreases and finally approaches zero. Due to this, part of the unburned HC and CO which flow into the upstream side exhaust purification catalyst 20 starts to flow out from the upstream side exhaust purification catalyst 20. At the time $t_3$, the output air-fuel ratio AFdwn of the downstream side air-fuel ratio sensor 41 becomes the rich judged air-fuel ratio AFrich or less.

At the time $t_3$, if the output air-fuel ratio AFdwn of the downstream side air-fuel ratio sensor 41 becomes the rich judged air-fuel ratio AFrich or less, to make the oxygen storage amount OSA increase, the average air-fuel ratio correction amount AFCav is switched to the strong lean set correction amount AFCslean. Therefore, the target average air-fuel ratio is switched to the lean air-fuel ratio. At this time, inter-cylinder air-fuel ratio control is not performed. For this reason, the combustion air-fuel ratios of the cylinders basically match the target average air-fuel ratio.

At the time $t_3$, if the target average air-fuel ratio is switched to the lean air-fuel ratio, the output air-fuel ratio AFdwn of the downstream side air-fuel ratio sensor 41 gradually rises toward the stoichiometric air-fuel ratio and, at the time $t_4$, becomes larger than the rich judged air-fuel ratio AFlrich. In the present embodiment, if, at the time $t_4$, the output air-fuel ratio AFdwn becomes larger than the rich judged air-fuel ratio AFrich, the average air-fuel ratio correction amount AFCav is switched to a lean set correction amount AFCleanw with a smaller lean degree than the strong lean set correction amount AFCslean. Therefore, the lean degree of the target average air-fuel ratio falls. In addition, in the present embodiment, at the time $t_4$ on, inter-cylinder air-fuel ratio control is performed.

After that, if the target average air-fuel ratio is maintained at the lean air-fuel ratio, the oxygen storage amount OSA of the upstream side exhaust purification catalyst 20 gradually increases and finally approaches the maximum storable oxygen amount Cmax. Due to this, part of the oxygen and $NO_X$ which flow into the upstream side exhaust purification catalyst 20 starts to flow out from the upstream side exhaust purification catalyst 20. At the time $t_5$, the output air-fuel ratio AFdwn of the downstream side air-fuel ratio sensor 41 becomes the lean judged air-fuel ratio AFlean or less. For this reason, at the time $t_5$, the average air-fuel ratio correction amount AFCav is switched to the rich set correction amount AFCsrich. After that, similar control is repeated.

Next, the effects according to the exhaust purification system according to the third embodiment will be explained. At the time $t_1$ of FIG. 22, when the output air-fuel ratio AFdwn of the downstream side air-fuel ratio sensor 41 becomes the lean judged air-fuel ratio AFlean or more, the oxygen storage amount OSA of the upstream side exhaust purification catalyst 20 becomes substantially the maximum storable oxygen amount Cmax. For this reason, if, at the time $t_1$, right after the target average air-fuel ratio is switched to the rich air-fuel ratio, sudden acceleration of the internal combustion engine or other disturbance causes the air-fuel ratio to temporarily change to the lean side, when the rich degree of the target average air-fuel ratio is low, there is a possibility of unburned HC or CO ending up flowing out from the upstream side exhaust purification catalyst 20. As opposed to this, in the present embodiment, when, at the time $t_1$, the target air-fuel ratio is switched to the rich air-fuel ratio, the rich degree of the target average air-fuel ratio is made larger. For this reason, even if disturbance etc. causes the air-fuel ratio to temporarily change to the lean side, it is possible to keep the oxygen or $NO_X$ from flowing out from the upstream side exhaust purification catalyst 20.

Further, if, at the time $t_1$, performing inter-cylinder air-fuel ratio control right after the target average air-fuel ratio is switched to the rich air-fuel ratio as well and the above-mentioned disturbance etc. causes the air-fuel ratio to temporarily change to the lean side, the lean degree becomes greater at the lean side cylinder in inter-cylinder air-fuel ratio control. If exhaust gas of a lean air-fuel ratio of a large lean degree flows into the upstream side exhaust purification catalyst 20 in this way, the oxygen storage amount OSA of the upstream side exhaust purification catalyst 20 becomes substantially the maximum storable oxygen amount Cmax, therefore there is a possibility that oxygen or $NO_X$ will flow out from the upstream side exhaust purification catalyst 20. As opposed to this, in the present embodiment, when at the time $t_1$ the target air-fuel ratio is switched to the rich air-fuel ratio, the inter-cylinder air-fuel ratio control is stopped. Due to this, it is possible to keep oxygen or $NO_X$ from flowing out from the upstream side exhaust purification catalyst 20.

Further, when, at the time $t_3$ of FIG. 22, the output air-fuel ratio AFdwn of the downstream side air-fuel ratio sensor 41 becomes the rich judged air-fuel ratio AFrich or less, the oxygen storage amount OSA of the upstream side exhaust purification catalyst 20 becomes substantially zero. For this reason, if, at the time $t_3$, right after the target average air-fuel ratio is switched to the lean air-fuel ratio, sudden deceleration of the internal combustion engine or other disturbance causes the air-fuel ratio to temporarily change to the rich side, there is a possibility of unburned HC or CO ending up flowing out from the upstream side exhaust purification catalyst 20 when the lean degree of the target average air-fuel ratio is low. As opposed to this, in the present embodiment, when, at the time $t_3$, the target air-fuel ratio is switched to the lean air-fuel ratio, the lean degree of the target average air-fuel ratio is made larger. For this reason, even if disturbance etc. causes the air-fuel ratio to temporarily change to the rich side, it is possible to keep the unburned HC or CO from flowing out from the upstream side exhaust purification catalyst 20.

Further, when, at the time $t_3$, performing inter-cylinder air-fuel ratio control right after switching the target average air-fuel ratio to the lean air-fuel ratio and the above-mentioned disturbance etc. causes the air-fuel ratio to temporarily change to the rich side, the rich degree becomes larger at the rich side cylinder in the inter-cylinder air-fuel ratio control. If in this way exhaust gas with a rich air-fuel ratio of a large rich degree flows into the upstream side exhaust purification catalyst 20, the oxygen storage amount OSA of the upstream side exhaust purification catalyst 20 becomes substantially zero, therefore there is a possibility of unburned HC or CO flowing out from the upstream side exhaust purification catalyst 20. As opposed to this, in the present embodiment, when, at the time $t_3$, the target air-fuel ratio is switched to the lean air-fuel ratio, inter-cylinder air-fuel ratio control is stopped. Due to this, it is possible to suppress the outflow of unburned HC or CO from the upstream side exhaust purification catalyst 20.

Note that, in the embodiment which is shown in FIG. 22, only when the output air-fuel ratio AFdwn of the downstream side air-fuel ratio sensor 41 becomes the lean judged air-fuel ratio AFlean or more (times $t_1$ to $t_2$), the rich degree of the target average air-fuel ratio is made larger and the inter-cylinder air-fuel ratio is stopped. However, if, at the times $t_1$ to $t_2$, the rich degree of the target average air-fuel ratio is made larger and the inter-cylinder air-fuel ratio is stopped, this control may be continued over a certain extent of time even at the time $t_2$ on. Similarly, in the embodiment which is shown in FIG. 22, only when the output air-fuel ratio AFdwn of the downstream side air-fuel ratio sensor 41 is the rich judged air-fuel ratio AFrich or less (times $t_3$ to $t_4$), the lean degree of the target average air-fuel ratio is made larger and the inter-cylinder air-fuel ratio is stopped. However, if, at the times $t_3$ to $t_4$, the lean degree of the target average air-fuel ratio is made larger and inter-cylinder air-fuel ratio is stopped, it is possible to continue such control after at the time $t_4$ on over a certain extent of time.

Further, the control in the present embodiment can also be applied to the exhaust purification catalyst according to the second embodiment. However, in this case, in the exhaust purification catalyst according to the second embodiment, the output air-fuel ratio AFdwn of the downstream side air-fuel ratio sensor 41 basically never becomes the lean judged air-fuel ratio AFlean or more. Therefore, in this case, control according to the present embodiment is performed only if the output air-fuel ratio AFdwn of the downstream side air-fuel ratio sensor 41 becomes the rich judged air-fuel ratio AFrich or less.

<Flow Chart>

Figure 23:
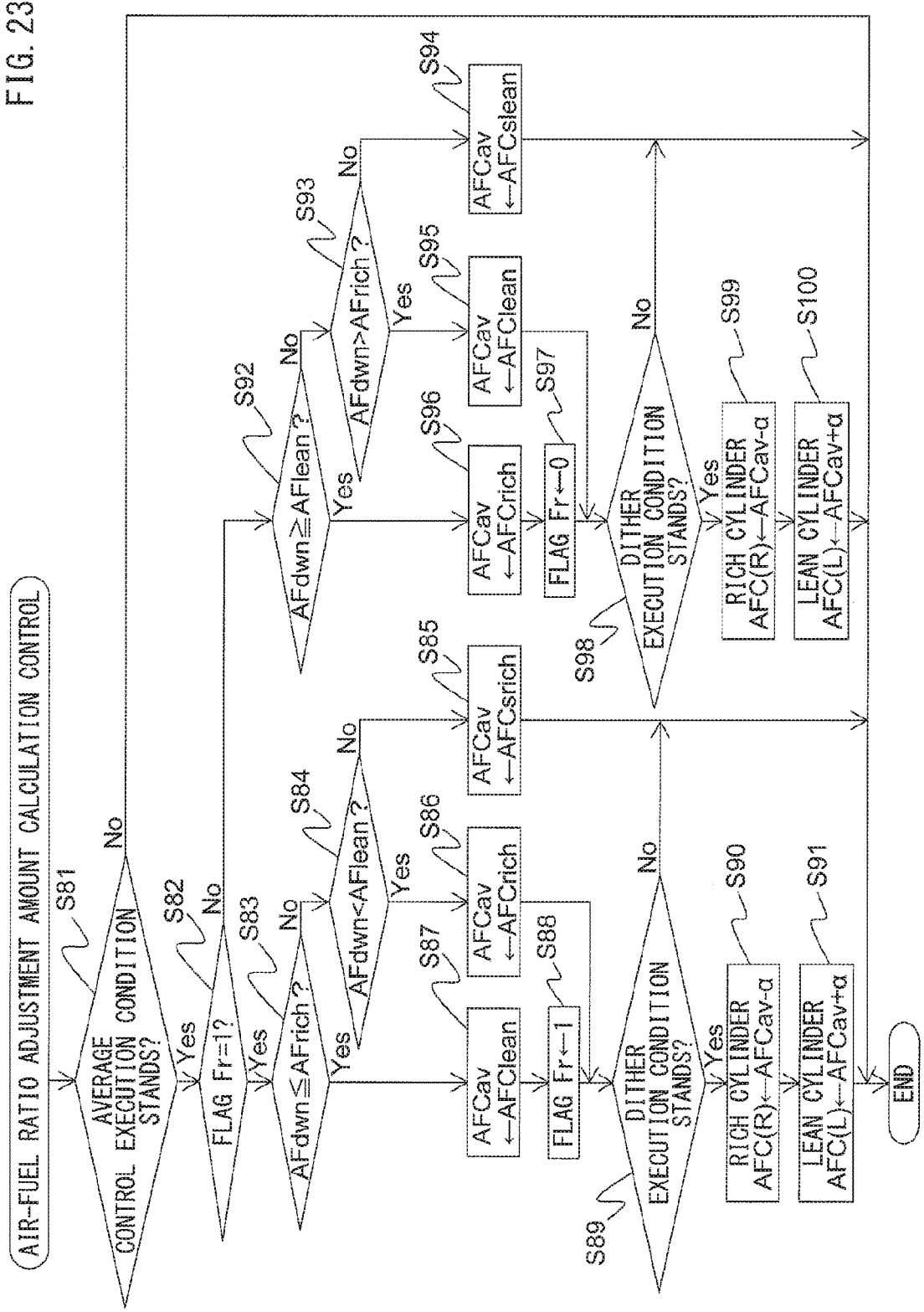
FIG. 23 is a flow chart which shows a control routine of processing for calculating an air-fuel ratio correction amount in a third embodiment.

FIG. 23 is a flow chart which shows a control routine of processing for calculating an air-fuel ratio correction amount in the present embodiment. The illustrated control routine is performed by interruption every certain time interval. Note that, in FIG. 23, for simplification of the drawing, processing such as steps S15, S16, S21, and S22 of FIG. 11 is omitted.

Steps S81 to S83 are similar to steps S11 to S13 of FIG. 11, therefore explanations will be omitted. If, at step S83, it is judged that the output air-fuel ratio AFdwn of the downstream side air-fuel ratio sensor 41 becomes the rich judged air-fuel ratio AFrich or less, the routine proceeds to step S84. At step S84, it is judged if the output air-fuel ratio AFdwn of the downstream side air-fuel ratio sensor 41 is lower than the lean judged air-fuel ratio AFlean. If, at step S84, it is judged that the output air-fuel ratio AFdwn is the lean judged air-fuel ratio AFlean or more (for example, times $t_1$ to $t_2$ of FIG. 22), the routine proceeds to step S85. At step S85, the average air-fuel ratio correction amount AFCav is set to the strong rich set correction amount AFCsrich. After that, steps S89 to S91 performing inter-cylinder air-fuel ratio control are skipped and the control routine is made to end.

After that, if the air-fuel ratio of the exhaust gas which flows out from the upstream side exhaust purification catalyst 20 approaches the stoichiometric air-fuel ratio, at step S84, it is judged that the output air-fuel ratio AFdwn of the downstream side air-fuel ratio sensor 41 is smaller than the lean judged air-fuel ratio AFlean, then the routine proceeds to step S86. At step S86, the average air-fuel ratio correction amount AFCav is set to the rich set correction amount AFCrich then the routine proceeds to step S89. Steps S87 and S88 of FIG. 23 are similar to steps S17 and S18 of FIG. 11, while steps S89 to S92 of FIG. 23 are similar to steps S25 to S27 and S19 of FIG. 11, therefore explanations are omitted.

When, at step S92, it is judged that the output air-fuel ratio AFdwn of the downstream side air-fuel ratio sensor 41 is the lean judged air-fuel ratio AFlean or more, the routine proceeds to step S93. At step S93, it is judged if the output air-fuel ratio AFdwn of the downstream side air-fuel ratio sensor 41 becomes higher than the rich judged air-fuel ratio AFrich. When at step S93 it is judged that the output air-fuel ratio AFdwn is the rich judged air-fuel ratio AFrich or less (for example, times $t_3$ to $t_4$ of FIG. 22), the routine proceeds to step S94. At step S94, the average air-fuel ratio correction amount AFCav is set to the strong lean correction amount AFCslean. After that, steps S98 to S100 performing inter-cylinder air-fuel ratio control are skipped and the control routine is made to end.

After that, if the air-fuel ratio of the exhaust gas which flows out from the upstream side exhaust purification catalyst 20 approaches the stoichiometric air-fuel ratio, at step S93, it is judged that the output air-fuel ratio AFdwn of the downstream side air-fuel ratio sensor 41 has become larger than the rich judged air-fuel ratio AFrich, then the routine proceeds to step S95. At step S95, the average air-fuel ratio correction amount AFCav is set to the lean set correction amount AFClean, then the routine proceeds to step S98. Steps S96 and S97 of FIG. 23 are similar to steps S23 and S24 of FIG. 11, while steps S98 to S100 of FIG. 23 are similar to steps S25 to S27 and S19 of FIG. 11, therefore explanations will be omitted.

Fourth Embodiment

Next, referring to FIG. 24 to FIG. 26, an exhaust purification system of a fourth embodiment of the present invention will be explained. The configuration and control of the exhaust purification system according to the fourth embodiment are, except for the points which are explained below, basically similar to the configuration and control of the exhaust purification systems according to the first embodiment or second embodiment.

In the exhaust purification system according to the present embodiment, in average air-fuel ratio control, the rich shift amount of the rich set air-fuel ratio and the lean shift amount of the lean set air-fuel ratio are made smaller the larger the degree of deterioration of the upstream side exhaust purification catalyst 20. In addition, in the exhaust purification system according to the present embodiment, during inter-cylinder air-fuel ratio control, the difference between the air-fuel ratio of a cylinder made richer than the average air-fuel ratio and the air-fuel ratio of a cylinder made leaner than the average air-fuel ratio is made smaller if the degree of deterioration of the upstream side exhaust purification catalyst 20 becomes larger.

Figure 24:
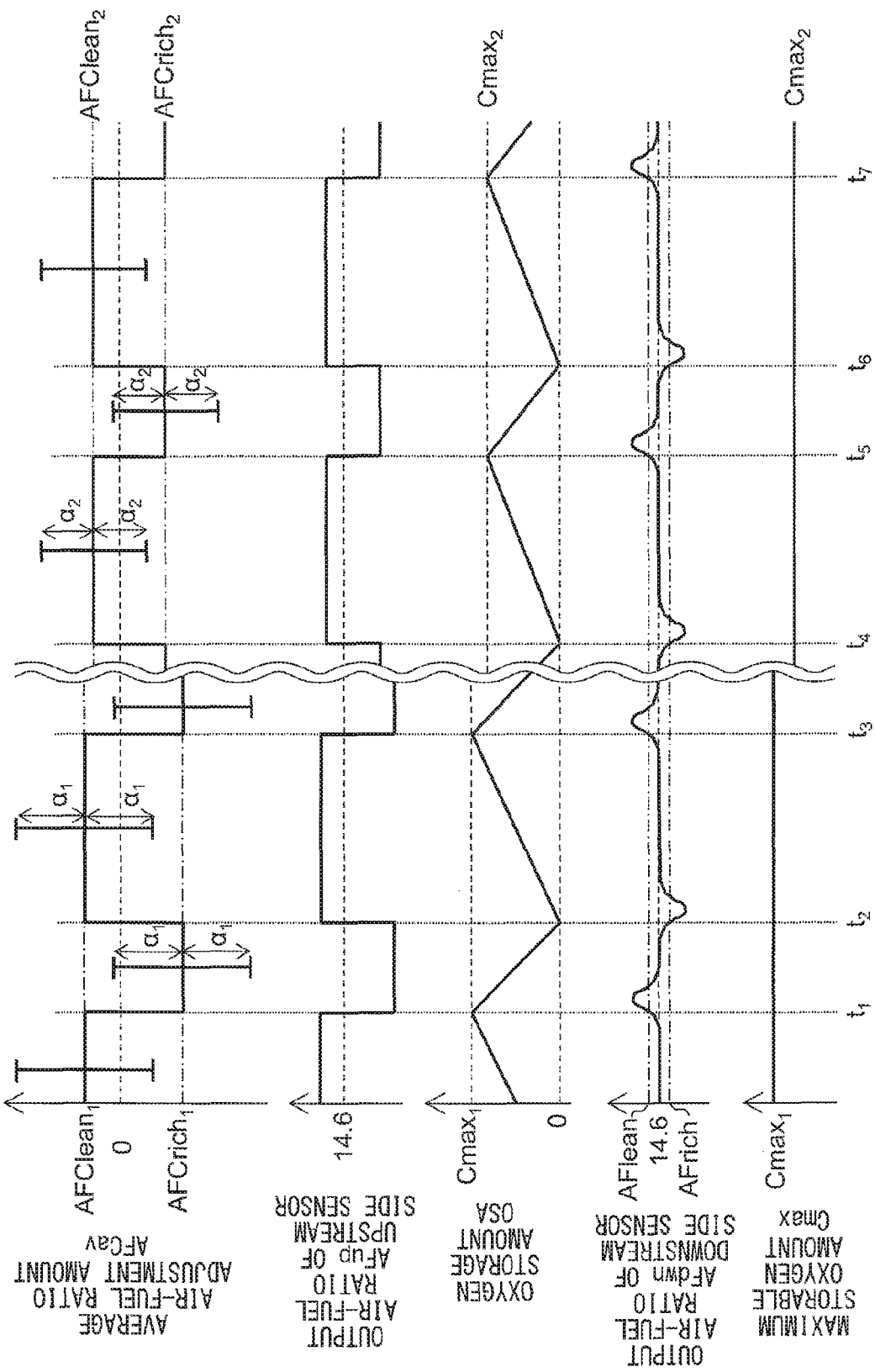
FIG. 24 is a time chart of an average air-fuel ratio correction amount etc.

Referring to FIG. 24, the average air-fuel ratio control and inter-cylinder air-fuel ratio control in the present embodiment will be specifically explained. FIG. 24 is a time chart similar to FIG. 4 of the average air-fuel ratio correction amount AFCav etc. In the example which is shown in FIG. 24, basically control similar to the example which is shown in FIG. 4 is performed. However, in the present embodiment as well, basically average air-fuel ratio control and inter-cylinder air-fuel ratio control similar to the second embodiment and third embodiment may be performed.

As will be understood from FIG. 24, before the time $t_3$, the maximum storable oxygen amount Cmax of the upstream side exhaust purification catalyst 20 is relatively large (Cmax$_1$). At this time, the rich set correction amount AFCrich and lean set correction amount AFClean in average air-fuel ratio control are made relatively large values (AFCrich$_1$, AFClean$_1$). Further, the amount of change α at the inter-cylinder air-fuel ratio control is also made a relatively large value (α$_1$).

Note that, the maximum storable oxygen amount Cmax of the upstream side exhaust purification catalyst 20, for example, is calculated based on the cumulative oxygen excess/deficiency ΣOED from when the average air-fuel ratio correction amount AFCav is switched to the rich air-fuel ratio to when the output air-fuel ratio AFdwn of the downstream side air-fuel ratio sensor 41 reaches the rich judged air-fuel ratio AFrich. Alternatively, the maximum storable oxygen amount Cmax is calculated based on the cumulative oxygen excess/deficiency ΣOED from when the average air-fuel ratio correction amount AFCav is switched to the lean air-fuel ratio to when the output air-fuel ratio AFdwn of the downstream side air-fuel ratio sensor 41 reaches the lean judged air-fuel ratio AFrich. Specifically, the smaller the cumulative oxygen excess/deficiency ΣOED becomes in this time period, the smaller the maximum storable oxygen amount Cmax is calculated as.

On the other hand, as will be understood from FIG. 24, at the time $t_4$ on, the maximum storable oxygen amount Cmax of the upstream side exhaust purification catalyst 20 decreases from the value before the time $t_3$ (Cmax$_1$). Along with this, in the present embodiment, the absolute values of the rich set correction amount AFCrich and lean set correction amount AFClean in average air-fuel ratio control are made smaller than the values before the time $t_3$ (AFCrich$_2$, AFClean$_2$). Further, the amount of change α at the inter-cylinder air-fuel ratio control is also made a value α$_2$ smaller than the value α$_1$ before the time $t_3$ (α$_2$<α$_1$).

Figure 25A:
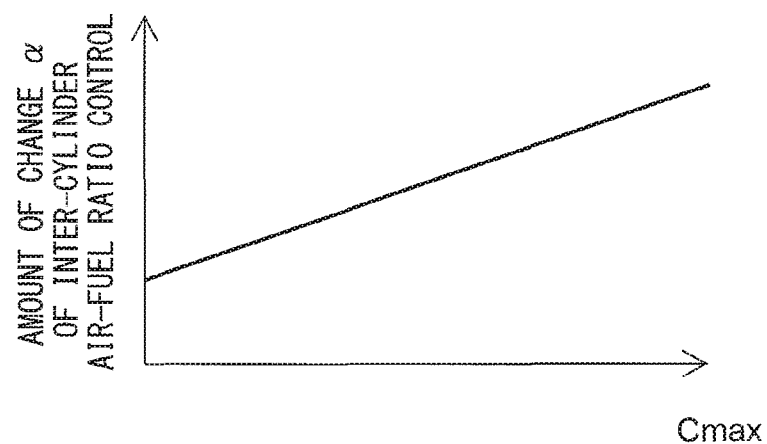
FIGS. 25A and 25B are views which show the relationship among a maximum storable oxygen amount, amount of change α at inter-cylinder air-fuel ratio control, and set correction amount at average air-fuel ratio control.
Figure 25B:
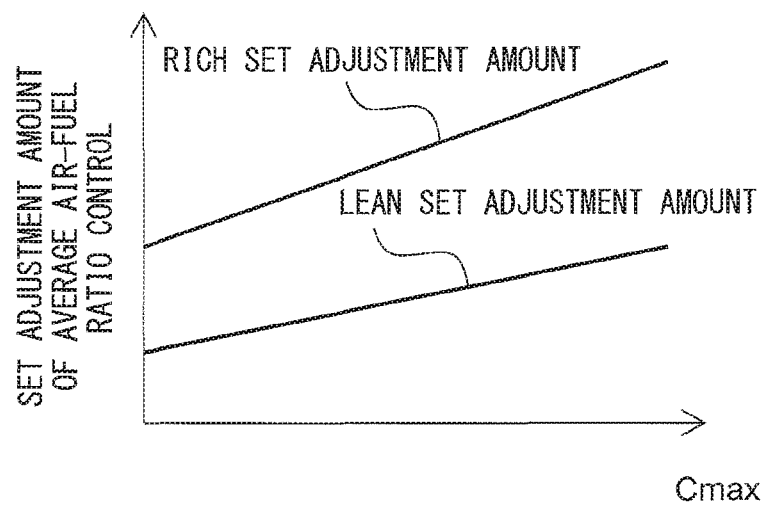

FIGS. 25A and 25B are views which show the relationship of the maximum storable oxygen amount Cmax and the amount of change α at the inter-cylinder air-fuel ratio control and set correction amount of the average air-fuel ratio control (absolute value). As will be understood from FIG. 25A, the amount of change α at the inter-cylinder air-fuel ratio control becomes larger the more the maximum storable oxygen amount Cmax increases. Further, as will be understood from FIG. 25B, the rich set correction amount AFCrich becomes larger the more the maximum storable oxygen amount Cmax increases. Similarly, the lean set correction amount AFClean also becomes larger the more the maximum storable oxygen amount Cmax increases. However, as will be understood from FIG. 25B, the lean set correction amount AFClean is made a value which is constantly smaller than the rich set correction amount AFCrich.

Next, the advantageous effects of the exhaust purification system according to the fourth embodiment will be explained. As explained above, the maximum oxygen storage amount Cmax of the upstream side exhaust purification catalyst 20 generally expresses the degree of deterioration of the upstream side exhaust purification catalyst 20. For this reason, the smaller the maximum oxygen storage amount Cmax, the larger the degree of deterioration of the upstream side exhaust purification catalyst 20, that is, the lower the catalyst activity of the precious metal is meant.

In the present embodiment, the smaller the maximum storable oxygen amount Cmax of the upstream side exhaust purification catalyst 20, that is, the larger the degree of deterioration of the upstream side exhaust purification catalyst 20, the smaller the rich shift amount and lean shift amount at the average air-fuel ratio control. In addition, the amount of change α at the inter-cylinder air-fuel ratio control is made smaller. As a result, the amount of flow of the unburned HC, CO, and NO$_X$ at which flow into the upstream side exhaust purification catalyst 20 becomes smaller. For this reason, even if the degree of deterioration of the upstream side exhaust purification catalyst 20 becomes larger and the catalytic activity of the precious metal falls, the unburned HC, CO, and NO$_X$ in the exhaust gas can be sufficiently removed at the upstream side exhaust purification catalyst 20.

Figure 26:
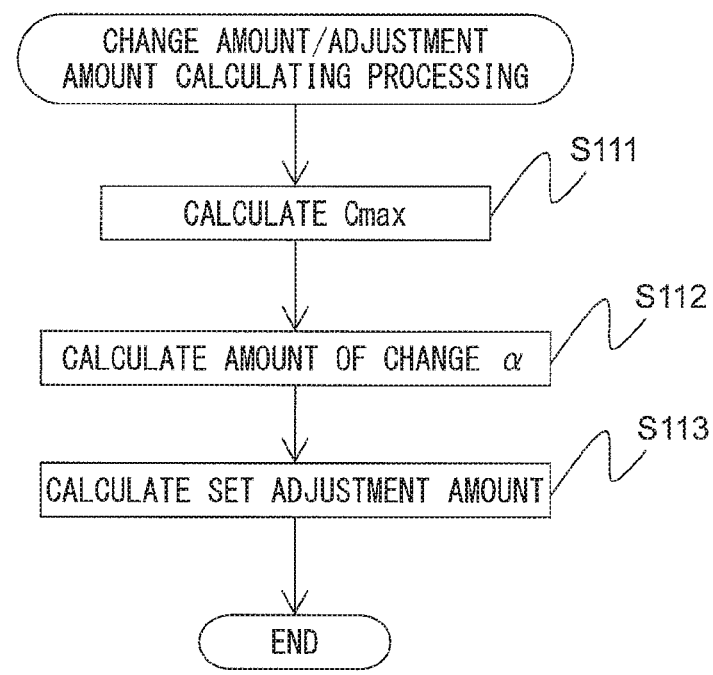
FIG. 26 is a flow chart which shows a control routine of processing for calculating an amount of change and a set air-fuel ratio.

FIG. 26 is a flow chart which shows a control routine of processing for calculating the amount of change α and the set air-fuel ratio. As shown in FIG. 26, first, at step S111, for example, the cumulative oxygen excess/deficiency ΣOED is used as the basis to calculate the maximum storable oxygen amount Cmax. Next, at step S112, the maximum storable oxygen amount Cmax which was calculated at step S111 is used as the basis to calculate the amount of change α at the inter-cylinder air-fuel ratio control using the map which is shown in FIG. 25A. The thus calculated amount of change α is used at steps S26, S27, etc. of FIG. 11. Next, at step S113, the maximum storable oxygen amount Cmax which was calculated at step S111 is used as the basis to calculate the rich set correction amount AFCrich and lean set correction amount AFClean in inter-cylinder air-fuel ratio control using the map which is shown in FIG. 25B. The thus calculated rich set correction amount AFCrich and lean set correction amount AFClean are used at steps S14, S17, S20, S23, etc. of FIG. 11.

Fifth Embodiment

Next, referring to FIG. 27 to FIG. 29, an exhaust purification system of a fifth embodiment of the present invention will be explained. The configuration and control of the exhaust purification system according to the fifth embodiment are, except for the points which are explained below, basically similar to the configuration and control of the exhaust purification systems according to the first embodiment to fourth embodiment.

In the exhaust purification system according to the present embodiment, in average air-fuel ratio control, the rich shift amount of the rich set air-fuel ratio and the lean shift amount of the lean set air-fuel ratio are made smaller if the amount of intake air which is fed to the combustion chamber 5 becomes larger. In addition, in the exhaust purification system according to the present embodiment, in inter-cylinder air-fuel ratio control, the difference between the air-fuel ratio of a cylinder which is made richer than the average air-fuel ratio and the air-fuel ratio of a cylinder which is made leaner than the average air-fuel ratio is made smaller if the amount of intake air which is fed to the combustion chamber 5 becomes larger.

Figure 27:
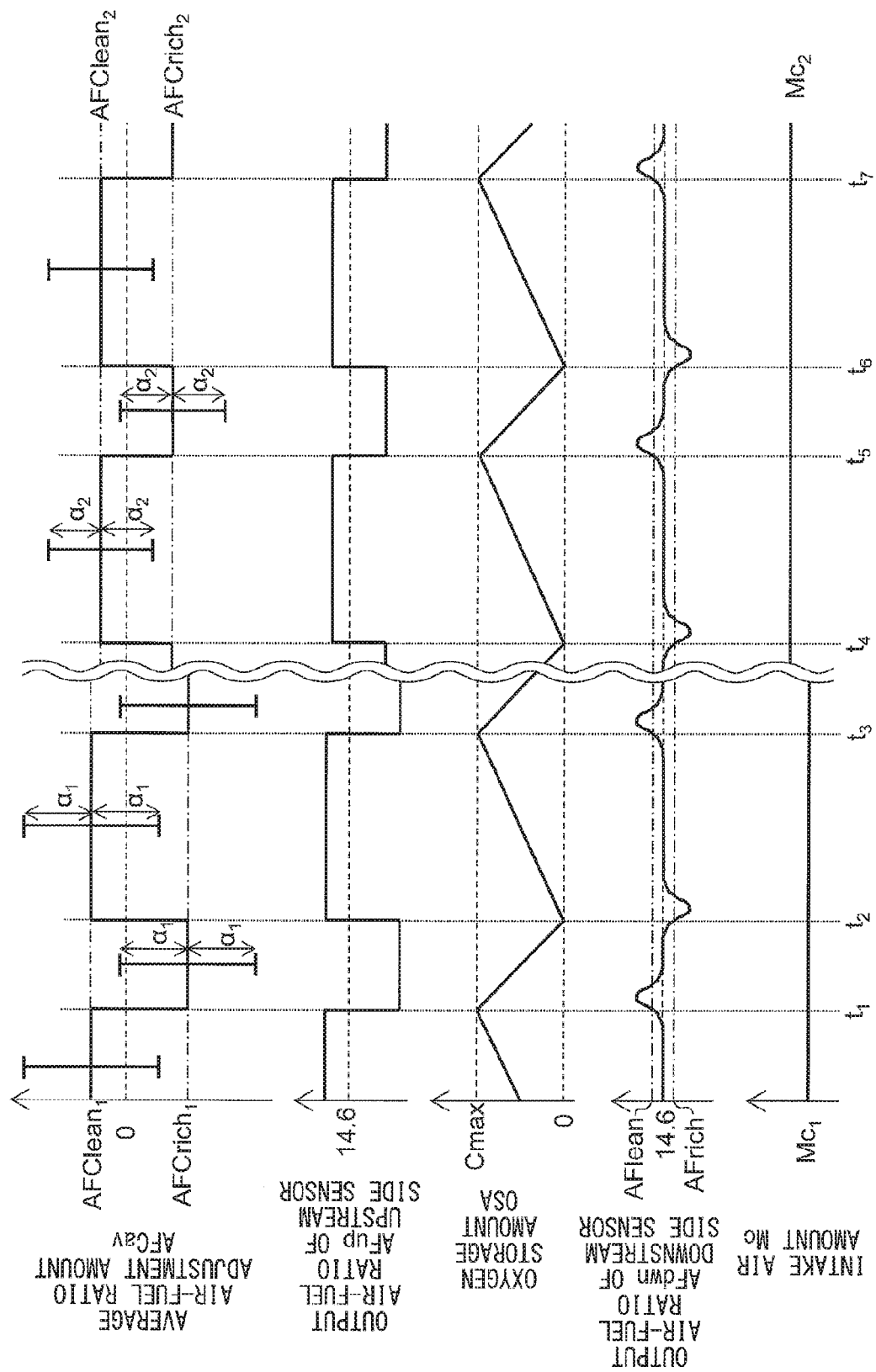
FIG. 27 is a time chart of an average air-fuel ratio correction amount etc.

Referring to FIG. 27, the average air-fuel ratio control and inter-cylinder air-fuel ratio control in the present embodiment will be specifically explained. FIG. 27 is a time chart similar to FIG. 4 of the average air-fuel ratio correction amount AFCav etc. In the example which is shown in FIG. 27, basically control which is similar to the example which is shown in FIG. 4 is performed. However, in the present embodiment as well, basically average air-fuel ratio control and inter-cylinder air-fuel ratio control similar to the second embodiment and third embodiment may be performed.

As will be understood from FIG. 27, before the time $t_3$, the amount of intake air Mc to the combustion chamber 5 of each cylinder is relatively small (Mc$_1$). At this time, the rich set correction amount AFCrich and lean set correction amount AFClean at the average air-fuel ratio control are made relatively large values (AFCrich$_1$, AFClean$_1$). That is, the rich shift amount and lean shift amount at the average air-fuel ratio control are made larger. Further, the amount of change α at the inter-cylinder air-fuel ratio control is also made a relatively large value (α$_1$). Note that, the amount of intake air to the combustion chamber 5 of each cylinder is for example calculated based on the output of the air flow meter 39.

On the other hand, as will be understood from FIG. 27, at the time t$_4$ on, the amount of intake air Mc to the combustion chamber 5 of each cylinder becomes relatively large (Mc$_2$) and becomes larger than the amount of intake air Mc before the time t$_3$. Along with this, in the present embodiment, the absolute values of the rich set correction amount AFCrich and lean set correction amount AFClean at the average air-fuel ratio control are made smaller than the values before the time t$_3$ (AFCrich$_2$, AFClean$_2$). That is, the rich shift amount and lean shift amount at the average air-fuel ratio control are made smaller than before the time t$_3$. Further, the amount of change α at the inter-cylinder air-fuel ratio control is also made a value smaller than the value α$_1$ before the time t$_3$ (α$_2$<α$_1$).

Figure 28A:
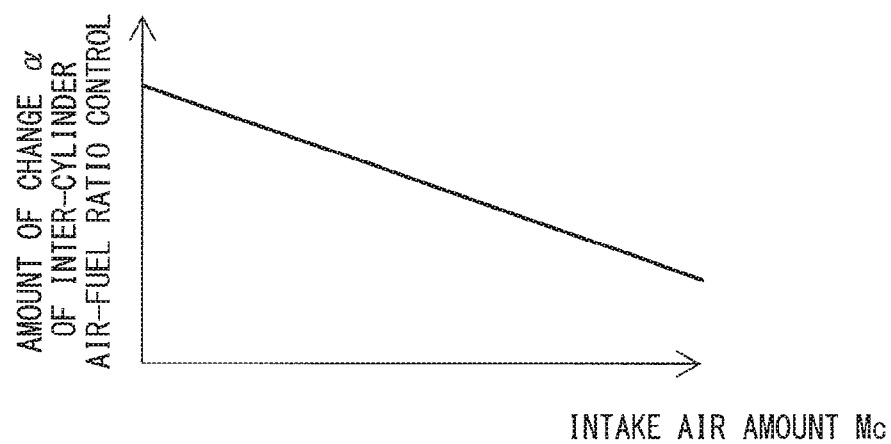
FIGS. 28A and 28B are views which show the relationship among an amount of intake air to a combustion chamber of each cylinder, amount of change α at inter-cylinder air-fuel ratio control, and set correction amount at average air-fuel ratio control.
Figure 28B:
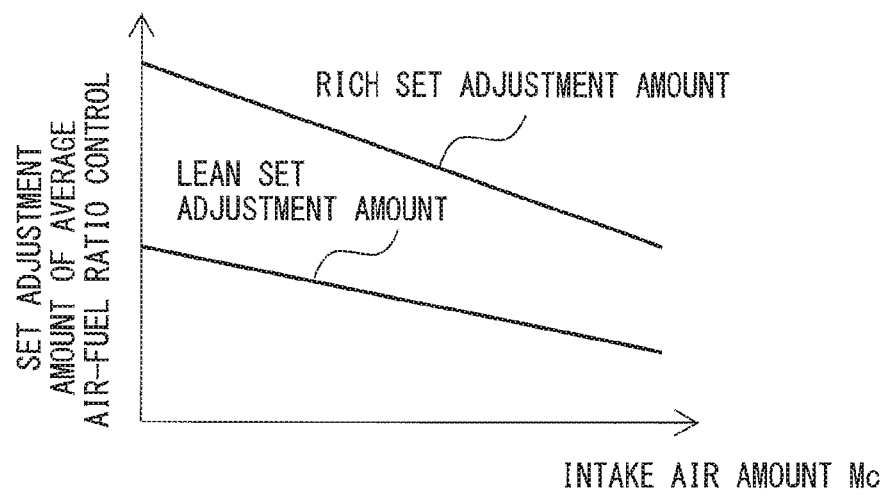

FIGS. 28A and 28B are views which show the relationship between the amount of intake air Mc to the combustion chamber 5 of each cylinder and the amount of change α at the inter-cylinder air-fuel ratio control and the set correction amount (absolute value) at the average air-fuel ratio control. As will be understood from FIG. 28A, the amount of change α at the inter-cylinder air-fuel ratio control is made smaller the more the amount of intake air Mc is increased. Further, as will be understood from FIG. 28B, the rich set correction amount AFCrich is made smaller the more the amount of intake air Mc is increased. Similarly, the lean set correction amount AFClean is also made smaller the more the amount of intake air Mc is increased. However, as will be understood from FIG. 28B, the lean set correction amount AFClean is made a value constantly smaller than the rich set correction amount AFCrich.

Next, the effect according to the exhaust purification system according to the fifth embodiment will be explained. If the amount of intake air to the combustion chamber 5 of each cylinder increases, the amount of flow of the exhaust gas which flows into the upstream side exhaust purification catalyst 20 increases. For this reason, the passage time during which the exhaust gas passes through the upstream side exhaust purification catalyst 20 becomes shorter. For this reason, at the upstream side exhaust purification catalyst 20, the unburned HC, CO, and NO$_X$ are difficult to remove.

As opposed to this, in the present embodiment, the greater the amount of intake air to the combustion chamber 5 of each cylinder, the smaller the rich shift amount and lean shift amount are made in the average air-fuel ratio control. In addition, the amount of change α at the inter-cylinder air-fuel ratio control is made smaller. As a result, the more the amount of intake air to the combustion chamber 5 of each cylinder increases, the lower the concentration of unburned HC, CO, and NO$_X$ in the exhaust gas is made. For this reason, even if the amount of intake air to the combustion chamber 5 of each cylinder increases, the unburned HC, CO, and NO$_X$ in the exhaust gas can be sufficiently removed at the upstream side exhaust purification catalyst 20.

Figure 29:
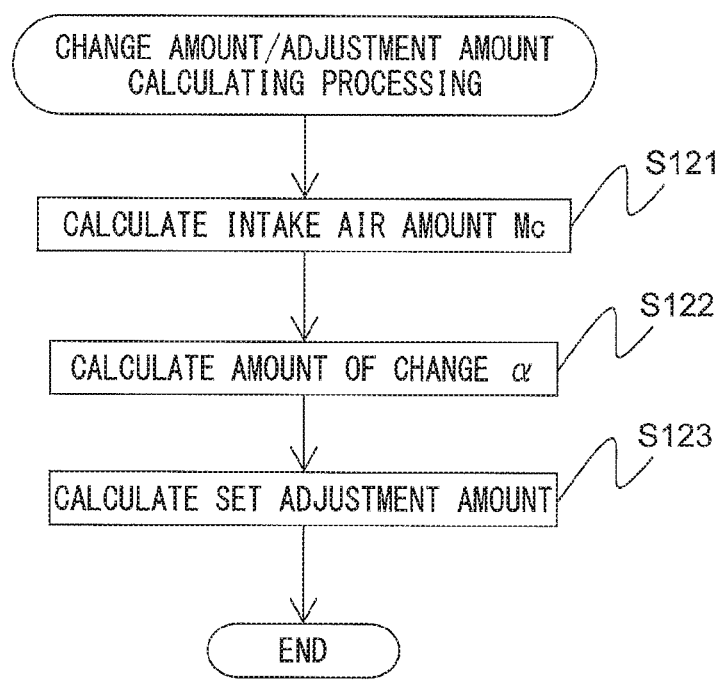
FIG. 29 is a flow chart which shows a control routine of processing for calculating an amount of change and a set air-fuel ratio.

FIG. 29 is a flow chart which shows the control routine of processing for calculating the amount of change α and the set air-fuel ratio. As shown in FIG. 29, first, at step S121, the output of the air flow meter 39 is used as the basis to calculate the amount of intake air Mc to the combustion chamber 5 of each cylinder. Next, at step S122, the amount of intake air Mc which was calculated at step S121 is used as the basis to calculate the amount of change α at the inter-cylinder air-fuel ratio control using the map which is shown in FIG. 28A. Next, at step S123, the amount of intake air Mc which is calculated at step S121 is used as the basis to calculate the rich set correction amount AFCrich and lean set correction amount AFClean in the inter-cylinder air-fuel ratio control using the map which is shown in FIG. 28B.

Sixth Embodiment

Next, referring to FIG. 30 to FIG. 31, an exhaust purification system of a sixth embodiment of the present invention will be explained. The configuration and control of the exhaust purification system according to the sixth embodiment are, except for the points which are explained below, basically similar to the configuration and control of the exhaust purification systems according to the first embodiment to fifth embodiment. In the exhaust purification system according to the present embodiment, during inter-cylinder air-fuel ratio control, the difference between the air-fuel ratio of a cylinder which is made richer than the average air-fuel ratio and the air-fuel ratio of a cylinder which is made leaner than the average air-fuel ratio is made smaller if the temperature of the exhaust purification catalyst becomes higher.

Figure 30:
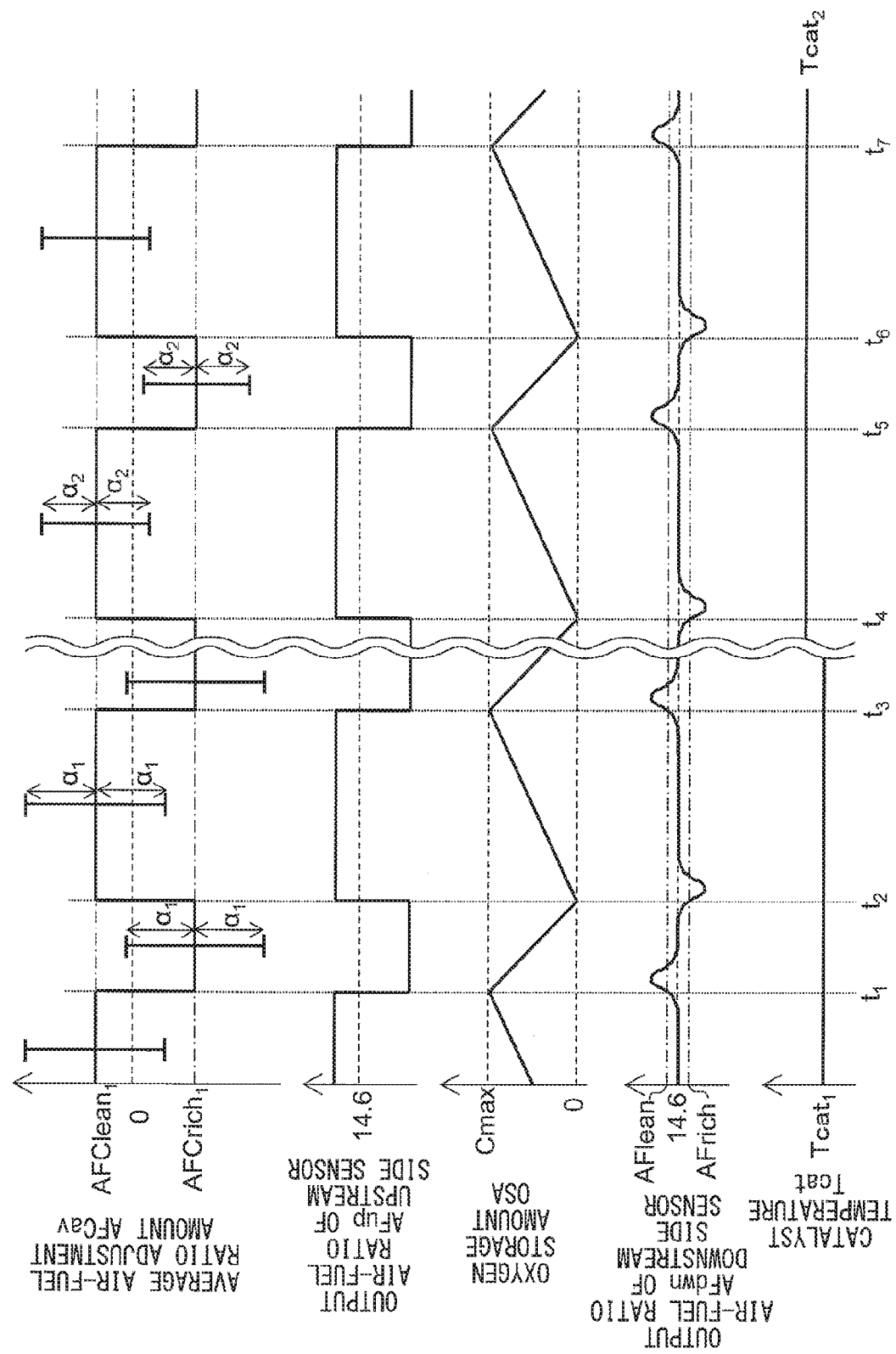
FIG. 30 is a time chart of an average air-fuel ratio correction amount etc.

Referring to FIG. 30, the average air-fuel ratio control and inter-cylinder air-fuel ratio control in the present embodiment will be specifically explained. FIG. 30 is a time chart similar to FIG. 4 of the average air-fuel ratio correction amount AFCav etc. In the example which is shown in FIG. 30, basically control similar to the example which is shown in FIG. 4 is performed. However, in the present embodiment as well, basically average air-fuel ratio control and inter-cylinder air-fuel ratio control similar to the second embodiment and third embodiment may be performed.

As will be understood from FIG. 30, before the time t$_3$, the temperature Tcat of the upstream side exhaust purification catalyst 20 is a relatively low temperature (Tcat$_1$) in the temperature range of the activation temperature Tactc or more and the upper limit temperature Tlimc or less. At this time, the amount of change α at the inter-cylinder air-fuel ratio control is made a relatively large value (α$_1$). On the other hand, from the time t$_4$ on, the temperature Tcat of the upstream side exhaust purification catalyst 20 becomes a relatively high temperature in the above-mentioned temperature range and becomes a temperature (Tcat$_2$) higher than the temperature Tcat of the upstream side exhaust purification catalyst 20$_1$ before the time t$_3$. Along with this, in the present embodiment, the amount of change α at the inter-cylinder air-fuel ratio control is made a value α$_2$ smaller than the value α$_1$ before the time t$_3$ (α$_2$<α$_1$).

Figure 31:
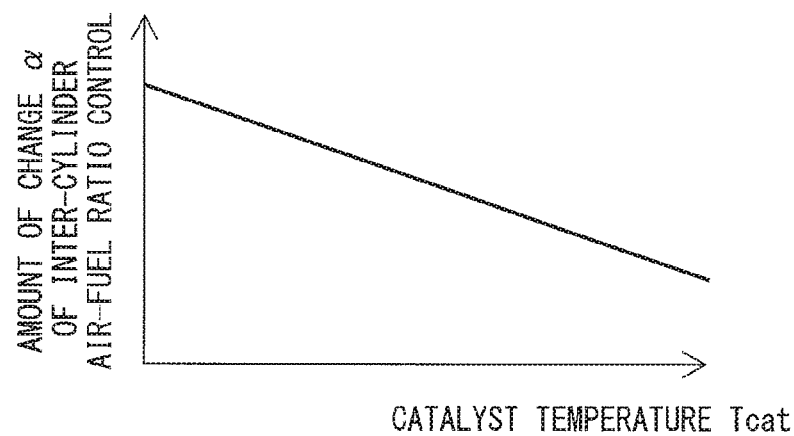
FIG. 31 is a view which shows the relationship between a temperature of an exhaust purification catalyst and an amount of change at inter-cylinder air-fuel ratio control.

FIG. 31 is a view which shows the relationship between the temperature Tcat of the upstream side exhaust purification catalyst 20 and the amount of change α at the inter-cylinder air-fuel ratio control. The temperature Tcat of the upstream side exhaust purification catalyst 20 in the figure is in the temperature range of the activation temperature Tactc or more and the upper limit temperature Tlimc or less. As will be understood from FIG. 31, the amount of change α at the inter-cylinder air-fuel ratio control becomes smaller the more the temperature Tcat of the upstream side exhaust purification catalyst 20 rises.

Next, the effect according to the exhaust purification system according to the sixth embodiment will be explained.

If performing inter-cylinder air-fuel ratio control, unburned HC, CO which flow out from a rich side cylinder and oxygen which flows out from a lean side cylinders flow into the upstream side exhaust purification catalyst 20. For this reason, in the upstream side exhaust purification catalyst 20, an exothermic reaction occurs due to these unburned HC, CO, and oxygen and the temperature of the upstream side exhaust purification catalyst 20 rises. For this reason, if inter-cylinder air-fuel ratio control is performed when the temperature of the upstream side exhaust purification catalyst 20 is high, that temperature ends up excessively rising to the upper limit temperature or more. If the upstream side exhaust purification catalyst 20 is excessively raised in temperature in this way, as explained above, a drop in the catalytic activity of the upstream side exhaust purification catalyst 20 is invited. As opposed to this, in the present embodiment, the higher the temperature Tcat of the upstream side exhaust purification catalyst 20, the smaller the amount of change α at the inter-cylinder air-fuel ratio control is made and accordingly the more the amount of flow of the unburned HC and CO which flow into the upstream side exhaust purification catalyst 20 is decreased. For this reason, it becomes hard for the upstream side exhaust purification catalyst 20 to be raised in temperature and accordingly a drop in the catalytic activity of the upstream side exhaust purification catalyst 20 accompanying an excess rise in temperature can be suppressed.

Figure 32:
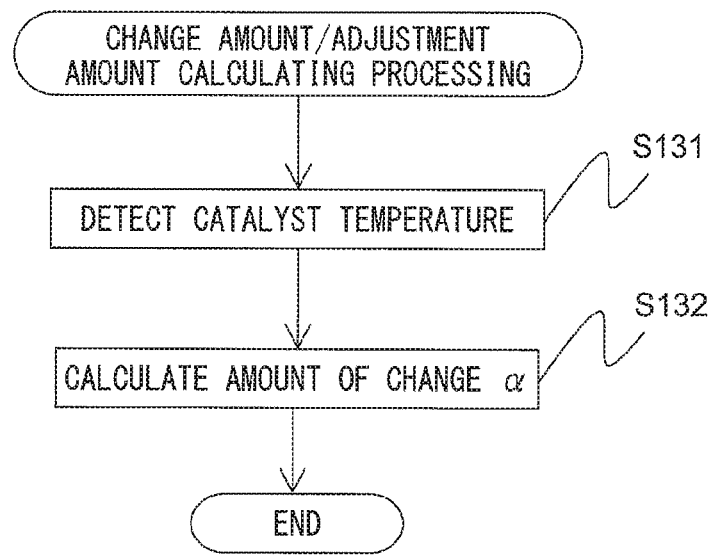
FIG. 32 is a flow chart which shows a control routine of processing for calculating an amount of change.

FIG. 32 is a flow chart which shows a control routine of processing for calculating an amount of change α. As shown in FIG. 32, first, at step S131, the temperature sensor 46 is used to detect the temperature Tcat of the upstream side exhaust purification catalyst 20. Note that, the temperature Tcat of the upstream side exhaust purification catalyst 20 may also be calculated based on other parameters. Next, at step S132, the temperature Tcat of the upstream side exhaust purification catalyst 20 which was calculated at step S131 is used as the basis to calculate the amount of change α at the inter-cylinder air-fuel ratio control using a map such as shown in FIG. 31, then the control routine is made to end.

Seventh Embodiment

Next, referring to FIG. 33, an exhaust purification system of a seventh embodiment of the present invention will be explained. The configuration and control of the exhaust purification system according to the seventh embodiment are, except for the points which are explained below, basically similar to the configuration and control of the exhaust purification systems according to the first embodiment to sixth embodiment.

Figure 33A:
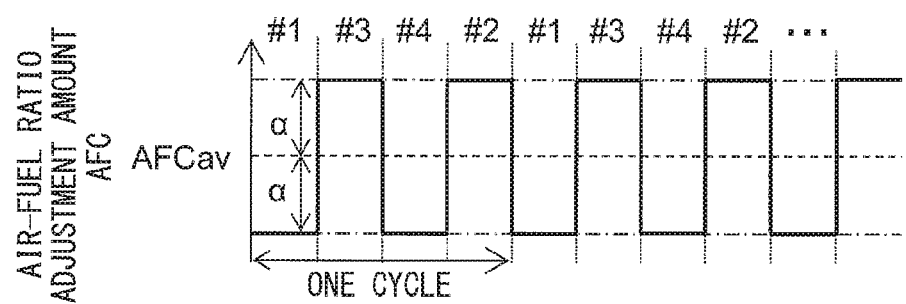
FIGS. 33A and 33B are time charts of an air-fuel ratio correction amount.

In the exhaust purification systems according to the above embodiments, in the inter-cylinder air-fuel ratio control, basically the rich side cylinders and the lean side cylinders are fixed. Specifically, for example, as shown in FIG. 33A, the #1 cylinder and #4 cylinder are fixed as rich side cylinders while the #3 cylinder and #2 cylinder are fixed as lean side cylinders. However, at the rich side cylinders, excess fuel is fed into the combustion chambers 5, therefore carbon is easily produced due to combustion. The thus produced carbon, for example, deposits on the spark plugs 10 and sometimes causes the insulation resistance between the center electrodes and metal pieces of the spark plugs 10 to fall.

Figure 33B:
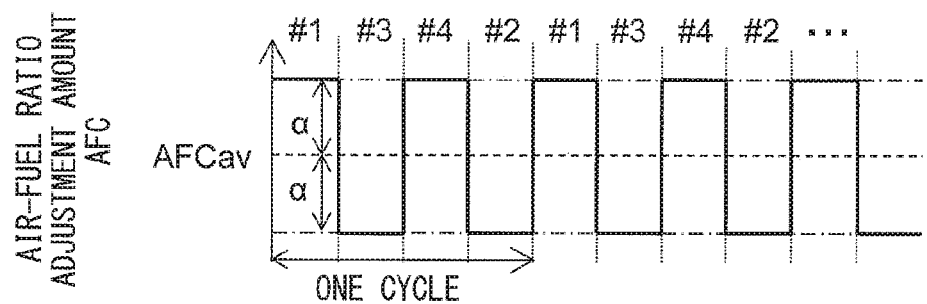

Therefore, in the present embodiment, every certain time interval, the rich side cylinders and lean side cylinders in the inter-cylinder air-fuel ratio control are switched. Therefore, the inter-cylinder air-fuel ratio control, for example, switches between the state which is shown in FIG. 33A and the state which is shown in FIG. 33B every certain time interval. In the state which is shown in FIG. 33B, the #1 cylinder and #4 cylinder are made lean side cylinders, while the #3 cylinder and #2 cylinder are made rich side cylinders. Due to this, the combustion air-fuel ratio at each cylinder is no longer fixed to the rich air-fuel ratio, therefore it is possible to keep carbon from depositing on the spark plug 10 at each cylinder.

Further, in the present embodiment, the ignition timing at the rich side cylinders in the inter-cylinder air-fuel ratio control is retarded from the ignition timing at the lean side cylinders. In general, at the rich side cylinders, the combustion pressure becomes higher and the torque becomes larger, while at the lean side cylinders, the combustion pressure becomes lower and the torque becomes smaller. For this reason, the torque difference between the rich side cylinders and the lean side cylinders sometimes causes vibration at the internal combustion engine.

As opposed to this, in the present embodiment, the ignition timing at a rich side cylinder is relatively retarded, therefore the torque which is generated due to combustion falls at a rich side cylinder. On the other hand, in the present embodiment, the ignition timing at a lean side cylinder is relatively advanced, therefore the torque which is generated due to combustion increases at a lean side cylinder. As a result, it is possible to make the torques which are generated due to combustion uniform between cylinders and possible to suppress vibration of the internal combustion engine.

Note that, the control in the present embodiment can be applied to an exhaust purification system according to the first to sixth embodiments.

Although this invention has been described by way of the specific embodiments, this invention is not limited to the above embodiments. It is possible for a person skilled in the art to modify or alter the above embodiments in various manners within the technical scope of the present invention.

What is claimed is:

1. An exhaust purification system of an internal combustion engine which has a plurality of cylinders comprising:
   an exhaust purification catalyst which is arranged in an engine exhaust passage and which can store oxygen;
   a downstream side air-fuel ratio sensor which is arranged at a downstream side of the exhaust purification catalyst in a direction of flow of exhaust; and
   a control device which is to control combustion air-fuel ratios when combustion is performed in the cylinders,
   wherein the control device is configured to:
   perform average air-fuel ratio control which alternately controls an average air-fuel ratio of an average of the combustion air-fuel ratios of all cylinders between a rich air-fuel ratio which is richer than a stoichiometric air-fuel ratio and a lean air-fuel ratio which is leaner than the stoichiometric air-fuel ratio and
   inter-cylinder air-fuel ratio control which controls the combustion air-fuel ratios of the cylinders so that the combustion air-fuel ratio becomes the rich air-fuel ratio at least at one cylinder among the plurality of cylinders even if the average air-fuel ratio is controlled to the lean air-fuel ratio by the average air-fuel ratio control; and
   control the average air-fuel ratio in the average air-fuel ratio control so that a lean shift amount of a difference between the average air-fuel ratio and stoichiometric air-fuel ratio when controlling the average air-fuel ratio to a lean air-fuel ratio becomes smaller than a rich shift amount of a difference between the average air-fuel ratio and stoichiometric air-fuel ratio when controlling the average air-fuel ratio to a rich air-fuel ratio.

2. The exhaust purification system of an internal combustion engine according to claim 1,
wherein the control device is further configured to control the combustion air-fuel ratios of the cylinders in the inter-cylinder air-fuel ratio control including when the average air-fuel ratio is controlled to the rich air-fuel ratio by the average air-fuel ratio control, so that the combustion air-fuel ratio becomes the lean air-fuel ratio at least at one cylinder among the plurality of cylinders.

3. The exhaust purification system of an internal combustion engine according to claim 1,
wherein the control device is further configured to control the combustion air-fuel ratios of the cylinders without performing the inter-cylinder air-fuel ratio control when the average air-fuel ratio is controlled to the rich air-fuel ratio, so that the combustion air-fuel ratios become the rich air-fuel ratio at all of the plurality of cylinders.

4. The exhaust purification system of an internal combustion engine according to claim 1,
wherein the control device is further configured to control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders, and
wherein a difference between the combustion air-fuel ratio of a cylinder which is made richer than the average air-fuel ratio and the average air-fuel ratio is equal to a difference between the combustion air-fuel ratio of a cylinder which is made leaner than the average air-fuel ratio and the average air-fuel ratio.

5. The exhaust purification system of an internal combustion engine according to claim 1,
wherein the control device is further configured to control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders, and
wherein a difference in the average air-fuel ratio control between a combustion air-fuel ratio of a cylinder which is made richer than the average air-fuel ratio and a combustion air-fuel ratio of a cylinder which is made leaner than the average air-fuel ratio when the inter-cylinder air-fuel ratio control is performed is larger than a total value of the rich shift amount and the lean shift amount.

6. The exhaust purification system of an internal combustion engine according to any one of claim 1,
wherein the control device is further configured to control the combustion air-fuel ratios of the cylinders without performing the inter-cylinder air-fuel ratio control when the temperature of the exhaust purification catalyst is lower than an activation temperature of the exhaust purification catalyst, so that the combustion air-fuel ratios become equal at all of the plurality of cylinder.

7. The exhaust purification system of an internal combustion engine according to claim 1,
wherein the control device is further configured to control the combustion air-fuel ratios of the cylinders without performing the inter-cylinder air-fuel ratio control when the temperature of the exhaust purification catalyst is higher than a predetermined upper limit temperature, so that the combustion air-fuel ratios become equal at all of the plurality of cylinders,
and wherein the upper limit temperature is higher than an activation temperature of the exhaust purification catalyst.

8. The exhaust purification system of an internal combustion engine according to claim 7,
wherein the control device is further configured to:
control the combustion air-fuel ratios of the cylinders without performing the inter-cylinder air-fuel ratio control including if the temperature of the exhaust purification catalyst becomes the upper limit temperature or less until reaching the predetermined switching temperature when the temperature of the exhaust purification catalyst falls from a temperature higher than the upper limit temperature, so that the combustion air-fuel ratios become equal at all of the plurality of cylinders; and
perform the inter-cylinder air-fuel ratio control when the temperature of the exhaust purification catalyst becomes the switching temperature or less,
and wherein the switching temperature is lower than the upper limit temperature and higher than the activation temperature.

9. The exhaust purification system of an internal combustion engine according to claim 1,
wherein the control device is further configured to:
control the combustion air-fuel ratios of the cylinders in the inter-cylinder air-fuel ratio control so that the combustion air-fuel ratio becomes leaner than the average air-fuel ratio at the first cylinder right after the average air-fuel ratio is switched from the rich air-fuel ratio to the lean air-fuel ratio by the average air-fuel ratio control; and
control the air-fuel ratios of the cylinders in the inter-cylinder air-fuel ratio control so that the combustion air-fuel ratio becomes richer than the average air-fuel ratio at the first cylinder right after the average air-fuel ratio is switched from the lean air-fuel ratio to the rich air-fuel ratio.

10. The exhaust purification system of an internal combustion engine according to claim 1,
wherein the control device is further configured to:
control the combustion air-fuel ratios of the cylinders in the inter-cylinder air-fuel ratio control so as to become richer than the average air-fuel ratio at part of the cylinders among the plurality of cylinders and so as to become leaner than the average air-fuel ratio at the remaining cylinders among the plurality of cylinders; and
control the combustion air-fuel ratios of the cylinders so as to become richer than the average air-fuel ratio in the cylinder at which fuel is fed first after start when starting the inter-cylinder air-fuel ratio control.

11. The exhaust purification system of an internal combustion engine according to claim 10,
wherein the control device is further configured to control the combustion air-fuel ratio so as to become leaner than the average air-fuel ratio at the cylinder where fuel is fed first after start when having performed control right before starting the inter-cylinder air-fuel ratio control, so that the air-fuel ratio of the exhaust gas which flows out from the exhaust purification catalyst becomes the rich air-fuel ratio, even when starting the inter-cylinder air-fuel ratio control.

12. The exhaust purification system of an internal combustion engine according to claim 1,
wherein the control device is further configured to:
switch the average air-fuel ratio to the lean air-fuel ratio in the average air-fuel ratio control if the output air-fuel ratio of the downstream side air-fuel ratio sensor becomes a rich judged air-fuel ratio richer than the stoichiometric air-fuel ratio or becomes less when controlling the average air-fuel ratio to the rich air-fuel ratio; and
switch the average air-fuel ratio to the rich air-fuel ratio in the average air-fuel ratio control if the output air-fuel ratio of the downstream side air-fuel ratio sensor becomes a lean judged air-fuel ratio leaner than the stoichiometric air-fuel ratio or becomes more when controlling the average air-fuel ratio to the lean air-fuel ratio.

13. The exhaust purification system of an internal combustion engine according to claim 1,
wherein the control device is further configured to:
switch the average air-fuel ratio to the lean air-fuel ratio in the average air-fuel ratio control if the output air-fuel ratio of the downstream side air-fuel ratio sensor becomes a rich judged air-fuel ratio richer than the stoichiometric air-fuel ratio or becomes less when controlling the average air-fuel ratio to the rich air-fuel ratio; and
switch the average air-fuel ratio to the rich air-fuel ratio in the average air-fuel ratio control if the oxygen storage amount of the exhaust purification catalyst from when starting control of the average air-fuel ratio to the lean air-fuel ratio reaches a predetermined switching reference storage amount smaller than the maximum storage oxygen amount of the exhaust purification catalyst.

14. The exhaust purification system of an internal combustion engine according to claim 1,
wherein the control device is further configured to control the average air-fuel ratio to a lean air-fuel ratio with a larger lean degree than when the output air-fuel ratio is larger than the rich judged air-fuel ratio in the average air-fuel ratio control, at least when the output air-fuel ratio of the downstream side air-fuel ratio sensor is a rich judged air-fuel ratio which is richer than the stoichiometric air-fuel ratio or is less.

15. The exhaust purification system of an internal combustion engine according to claim 14,
wherein the control device is further configured to control the combustion air-fuel ratios of the cylinders without performing the inter-cylinder air-fuel ratio control when the output air-fuel ratio of the downstream side air-fuel ratio sensor is the rich judged air-fuel ratio or less, so that the combustion air-fuel ratios become equal at all cylinders.

16. The exhaust purification system of an internal combustion engine according to claim 1,
wherein the control device is further configured to control the average air-fuel ratio to a rich air-fuel ratio with a larger rich degree than when the output air-fuel ratio is smaller than the lean judged air-fuel ratio in the average air-fuel ratio control, at least when the output air-fuel ratio of the downstream side air-fuel ratio sensor is equal to or greater than a lean judged air-fuel ratio which is leaner than the stoichiometric air-fuel ratio.

17. The exhaust purification system of an internal combustion engine according to claim 16,
wherein the control device is further configured to control the combustion air-fuel ratios of the cylinders without performing the inter-cylinder air-fuel ratio control when the output air-fuel ratio of the downstream side air-fuel ratio sensor is the lean judged air-fuel ratio or more, so that the combustion air-fuel ratios become equal at all cylinders.

18. The exhaust purification system of an internal combustion engine according to claim 1,
wherein the control device is further configured to:
control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and
decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the degree of deterioration of the exhaust purification catalyst increases.

19. The exhaust purification system of an internal combustion engine according to claim 1,
wherein the control device is further configured to decrease the rich shift amount and the lean shift amount in the average air-fuel ratio control as the degree of deterioration of the exhaust purification catalyst increases.

20. The exhaust purification system of an internal combustion engine according to claim 1,
wherein the control device is further configured to:
control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and
decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the amount of intake air which is fed to a combustion chamber increases.

21. The exhaust purification system of an internal combustion engine according to claim 1,
wherein the control device is further configured to decrease the rich shift amount and the lean shift amount in the average air-fuel ratio control as the amount of intake air which is supplied to a combustion chamber increases.

22. The exhaust purification system of an internal combustion engine according to claim 1,
wherein the control device is further configured to:
control the combustion air-fuel ratios of the cylinders in the inter-cylinder air-fuel ratio control so as to become richer than the average air-fuel ratio at least at one cylinder among the plurality of cylinders and so as to become leaner than the average air-fuel ratio at least at one cylinder among the plurality of cylinders; and
decrease a difference in the inter-cylinder air-fuel ratio control between an air-fuel ratio of a cylinder which is made richer than the average air-fuel ratio and an air-fuel ratio of a cylinder which is made leaner than the average air-fuel ratio as the temperature of the exhaust purification catalyst increases.

* * * * *